(12) United States Patent
Itagaki et al.

(10) Patent No.: US 10,868,894 B2
(45) Date of Patent: *Dec. 15, 2020

(54) INFORMATION PROCESSING APPARATUS AND INFORMATION PROCESSING METHOD

(71) Applicant: SONY CORPORATION, Tokyo (JP)

(72) Inventors: Takeshi Itagaki, Saitama (JP); Tomoya Yamaura, Tokyo (JP); Kazuyuki Sakoda, Chiba (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,790

(22) Filed: Dec. 28, 2018

(65) Prior Publication Data
US 2019/0158636 A1 May 23, 2019

Related U.S. Application Data

(63) Continuation of application No. 15/308,752, filed as application No. PCT/JP2015/002922 on Jun. 11, 2015, now Pat. No. 10,200,512.

(30) Foreign Application Priority Data

Jul. 11, 2014 (JP) .................................. 2014-142949
Jan. 8, 2015 (JP) .................................. 2015-002477

(51) Int. Cl.
*H04L 29/08* (2006.01)
*H04W 28/06* (2009.01)
(Continued)

(52) U.S. Cl.
CPC .......... *H04L 69/323* (2013.01); *H04L 1/0079* (2013.01); *H04L 27/2602* (2013.01);
(Continued)

(58) Field of Classification Search
None
See application file for complete search history.

(56) References Cited

U.S. PATENT DOCUMENTS

2006/0252443 A1* 11/2006 Sammour ............... H04W 4/08
455/518
2007/0047538 A1 3/2007 Rosner et al.
(Continued)

FOREIGN PATENT DOCUMENTS

| JP | 2007-142722 A | 6/2007 |
| JP | 2012-501590 A | 1/2012 |

(Continued)

OTHER PUBLICATIONS

Machine translation to English for CN105338631, CN105338631 being a foreign priority application for US20150351107 (Year: 2014).*

(Continued)

*Primary Examiner* — Andre Tacdiran
(74) *Attorney, Agent, or Firm* — Xsensus LLP

(57) ABSTRACT

An electronic device including circuitry configured to perform control in a manner that a Physical Layer Convergence Protocol (PLCP) header format is selected from a plurality of PLCP header formats; and append the selected PLCP header to a physical layer packet for transmission.

19 Claims, 50 Drawing Sheets

(51) Int. Cl.
  *H04L 1/00* (2006.01)
  *H04L 29/06* (2006.01)
  *H04L 27/26* (2006.01)
  *H04W 80/02* (2009.01)
  *H04W 84/12* (2009.01)
(52) U.S. Cl.
  CPC .............. *H04L 29/06* (2013.01); *H04L 69/22* (2013.01); *H04L 69/24* (2013.01); *H04W 28/06* (2013.01); *H04W 80/02* (2013.01); *H04W 84/12* (2013.01)

(56) References Cited

U.S. PATENT DOCUMENTS

| | | | |
|---|---|---|---|
| 2010/0226322 A1 | 9/2010 | Choi | H04W 68/08 370/329 |
| 2011/0014910 A1 | 1/2011 | Yonge, III | H04W 74/0808 455/434 |
| 2011/0044271 A1* | 2/2011 | Hong | H04W 28/06 370/329 |
| 2011/0075759 A1* | 3/2011 | Seok | H04W 80/02 375/295 |
| 2011/0158096 A1* | 6/2011 | Leung | H04L 47/35 370/232 |
| 2012/0054584 A1 | 3/2012 | Roh et al. | |
| 2012/0207139 A1* | 8/2012 | Husted | H04L 69/08 370/338 |
| 2012/0252509 A1 | 10/2012 | Wen | H04B 7/2606 455/500 |
| 2012/0314741 A1 | 12/2012 | Arita | H04L 1/0061 375/219 |
| 2013/0044028 A1* | 2/2013 | Lea | H01Q 21/24 342/359 |
| 2013/0315342 A1 | 11/2013 | Um et al. | |
| 2014/0064180 A1* | 3/2014 | Kotecha | H04L 69/04 370/328 |
| 2014/0064262 A1 | 3/2014 | Roh et al. | |
| 2014/0247838 A1* | 9/2014 | Seok | H04L 1/0003 370/476 |
| 2014/0286203 A1* | 9/2014 | Jindal | H04J 11/0026 370/278 |
| 2014/0286356 A1 | 9/2014 | You et al. | |
| 2014/0313911 A1 | 10/2014 | Kim | H04W 24/02 370/252 |
| 2015/0063203 A1* | 3/2015 | Kim | H04B 7/18513 370/326 |
| 2015/0110093 A1* | 4/2015 | Asterjadhi | H04W 74/08 370/338 |
| 2015/0131555 A1* | 5/2015 | Lee | H04W 76/30 370/329 |
| 2015/0195326 A1 | 7/2015 | Suryavanshi | H04L 65/608 709/231 |
| 2015/0351107 A1* | 12/2015 | Li | H04B 15/00 370/252 |
| 2015/0358904 A1* | 12/2015 | Kwon | H04W 52/0206 370/252 |
| 2016/0043949 A1* | 2/2016 | Lee | H04W 84/12 370/328 |
| 2016/0353370 A1* | 12/2016 | Choi | H04L 27/2613 |
| 2017/0127352 A1* | 5/2017 | Park | H04W 84/12 |
| 2017/0208546 A1* | 7/2017 | Park | H04W 84/12 |
| 2018/0014279 A1 | 1/2018 | Xia | H04W 74/0833 |

FOREIGN PATENT DOCUMENTS

| | | |
|---|---|---|
| JP | 2012-523732 A | 10/2012 |
| WO | WO 2013/069918 A1 | 5/2013 |
| WO | WO 2014/071308 A1 | 5/2014 |

OTHER PUBLICATIONS

Office Action dated May 22, 2018 in corresponding Japanese Patent Application No. 2015-002477, 15 pages.
Office Action dated Dec. 5, 2017 in corresponding Japanese Patent Application No. 2015-002477, 8 pages.
Graham Smith, Dynamic Sensitivity Control Implementation [online], IEEE 802.11-14/0635r1, IEEE, Retrieved from the Internet: <URL: https://mentor.ieee.org/802.11/dcn/14/11-14-0635-01-00ax-dsc-implementation.pptx>, May 2014, 9 pages.
Sean Coffey, A Protocol Framework for Dynamic CCA [online], IEEE 802.11-14/0872r0, IEEE, Retrieved from the Internet: <URL: https://mentor.ieee.org/802.11/dcn/14/11-14-0872-00-00ax-a-protocol-framework-for-dynamic-cca.pptx>, Jul. 2014, 16 pages.
Graham Smith, Dynamic Sensitivity Control Practical Usage [online], IEEE 802.11-14/0779r0, IEEE, Retrieved from the Internet: <URL: https://mentor.ieee.org/802.11/dcn/14/11-14-0799-00-00ax-dsc-practical-usage.pptx>, Jun. 2014, 24 pages.
Singaporean Search Report and Written Opinion dated Aug. 21, 2017 in Patent Application No. 11201609273U.
International Search Report dated Sep. 30, 2015 in PCT/JP2015/002922 filed Jun. 11, 2015.

* cited by examiner

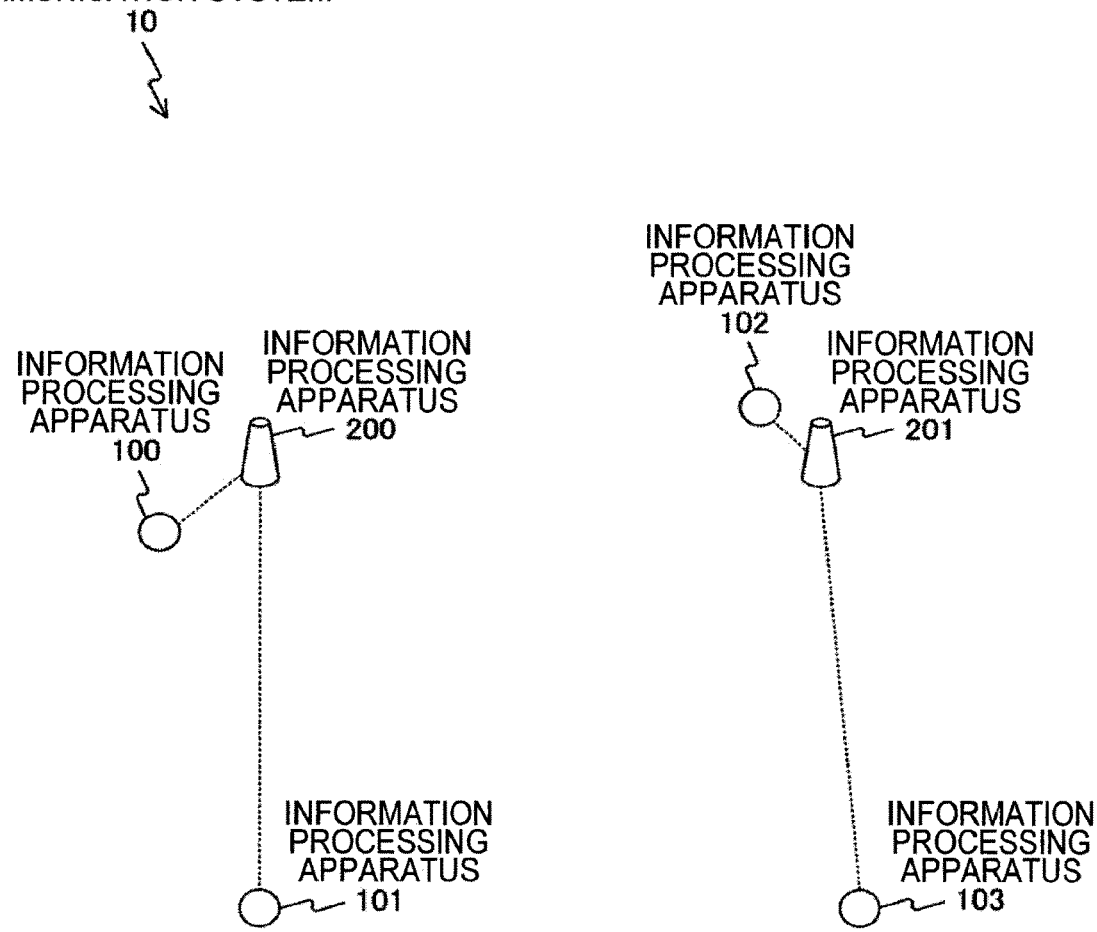
[Fig. 1]

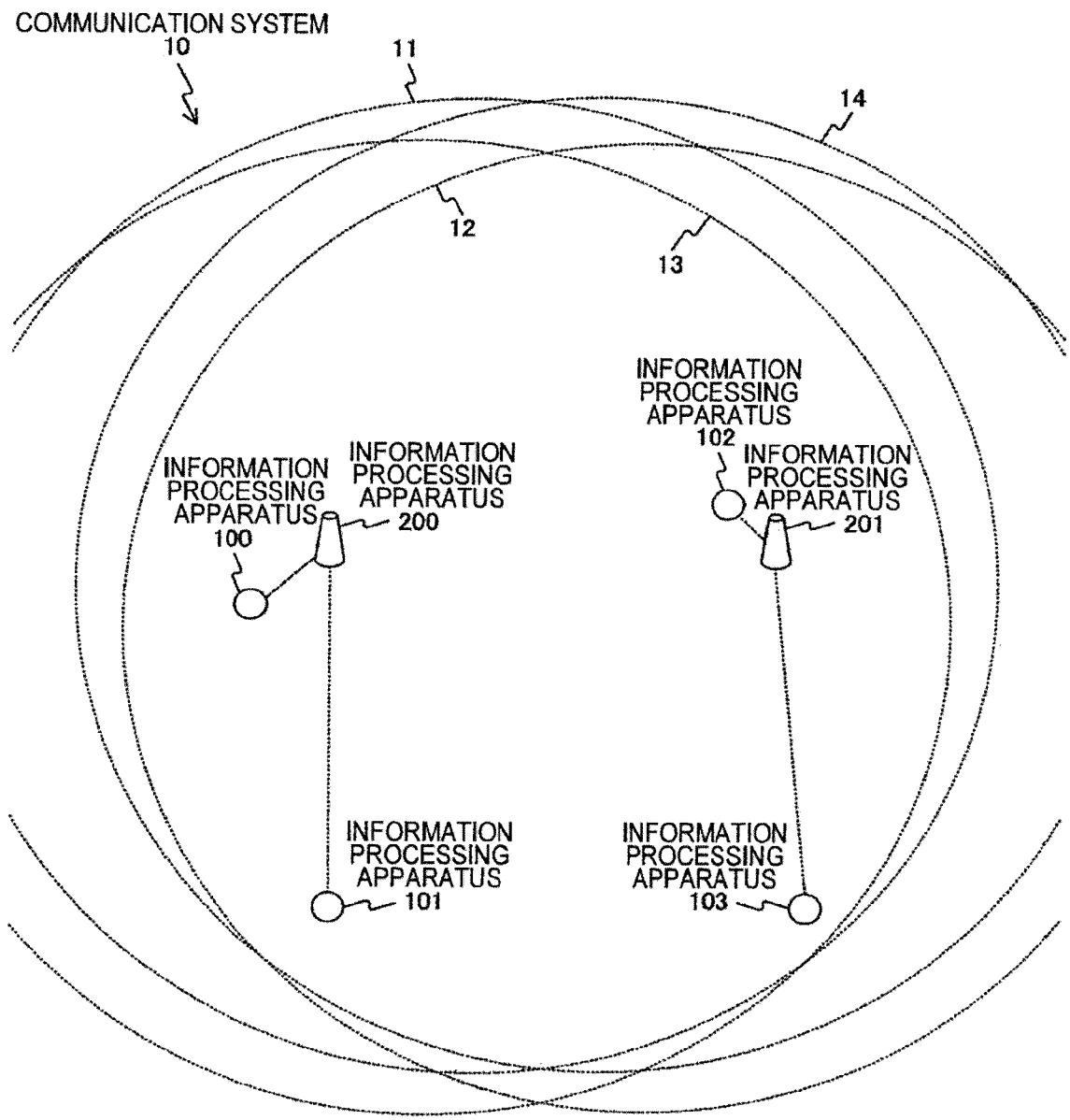
[Fig. 2]

[Fig. 3]
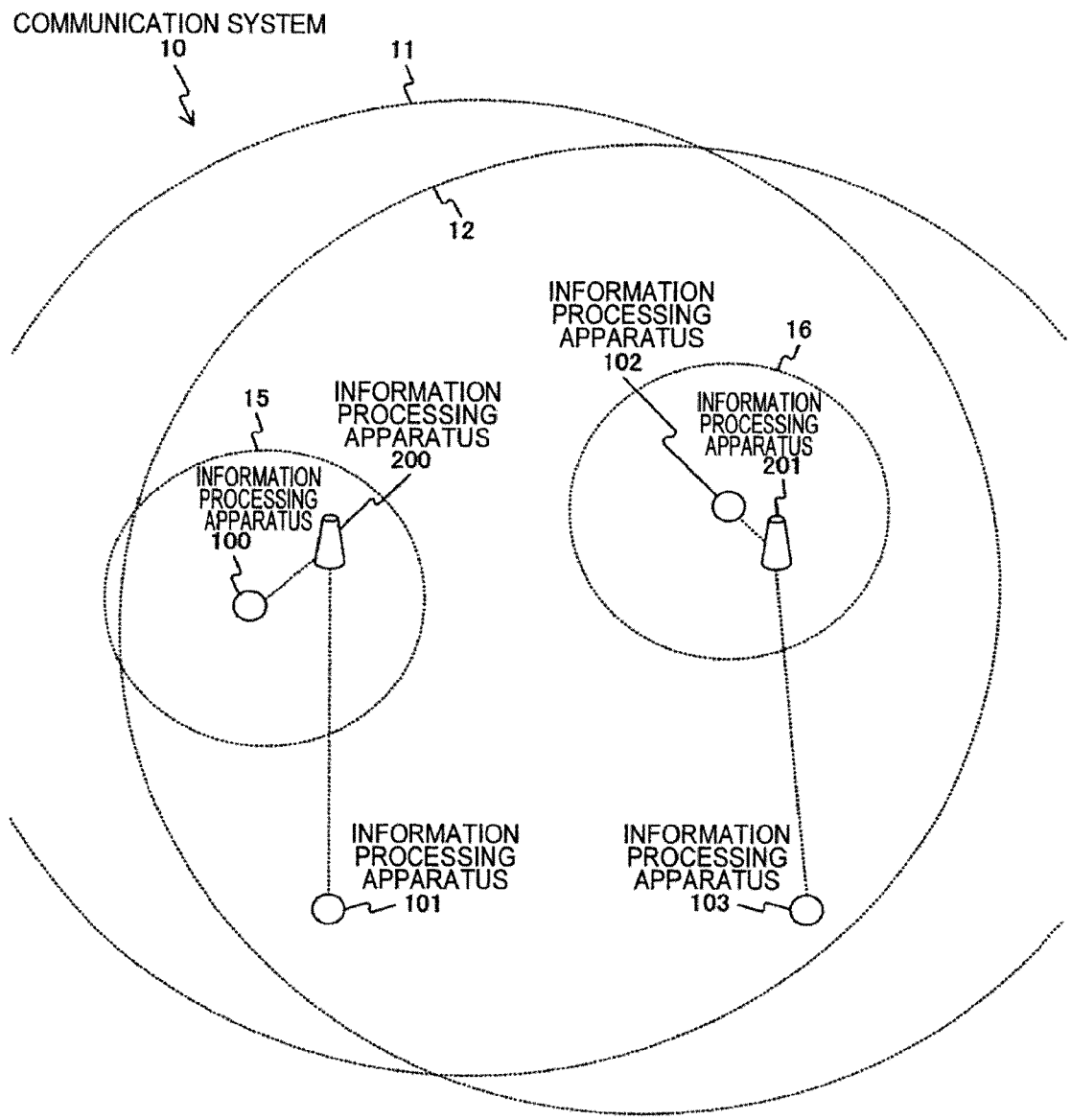

[Fig. 4]
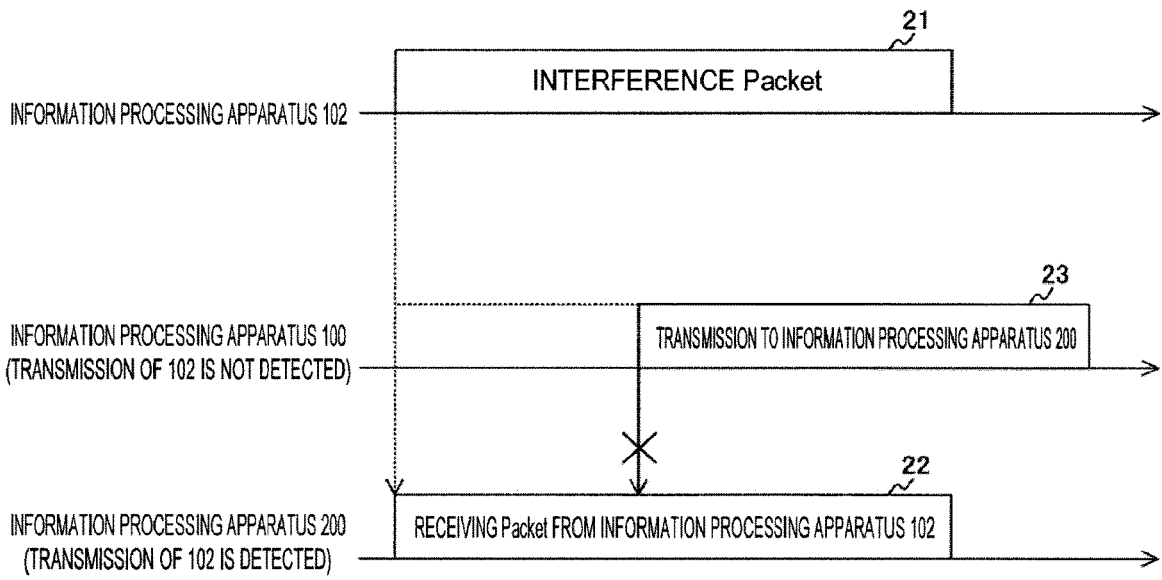
[Fig. 5]
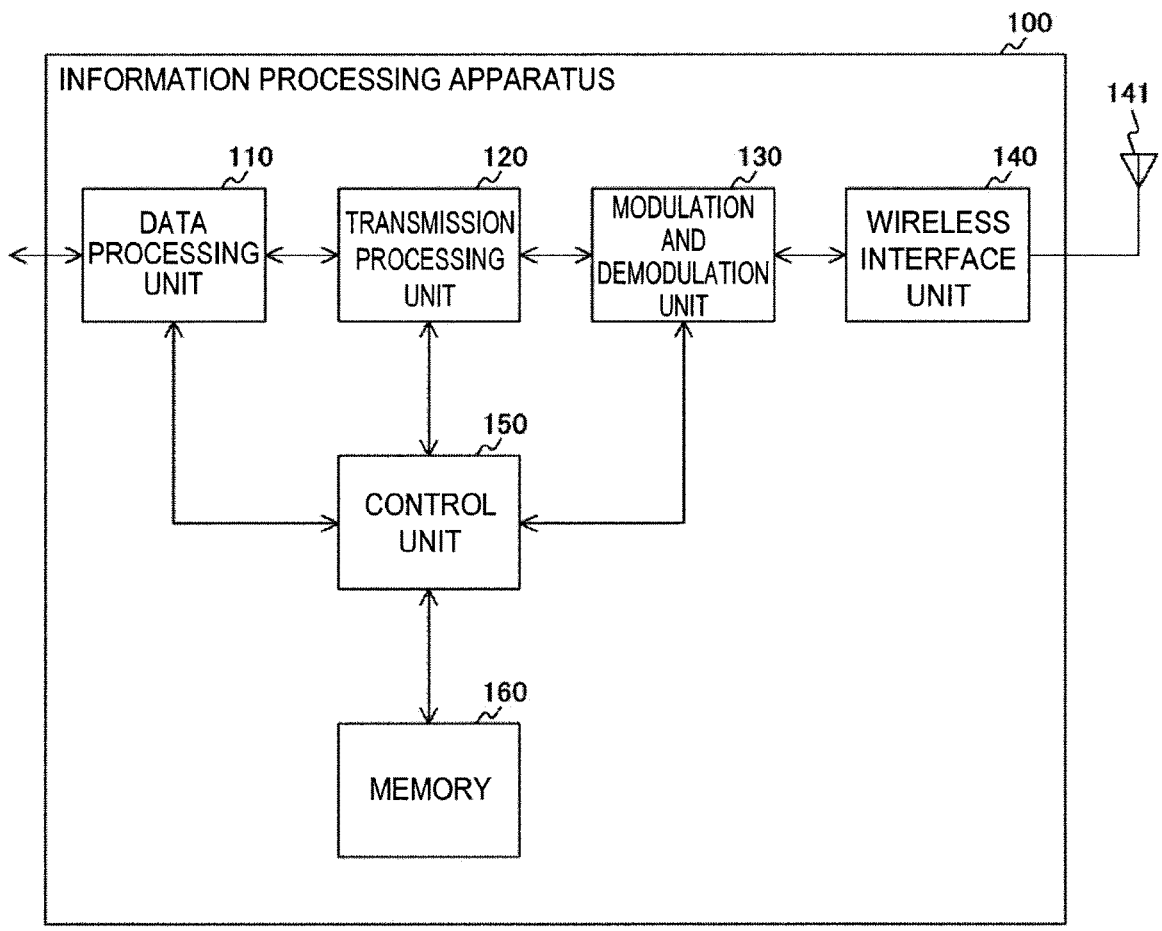

[Fig. 6]
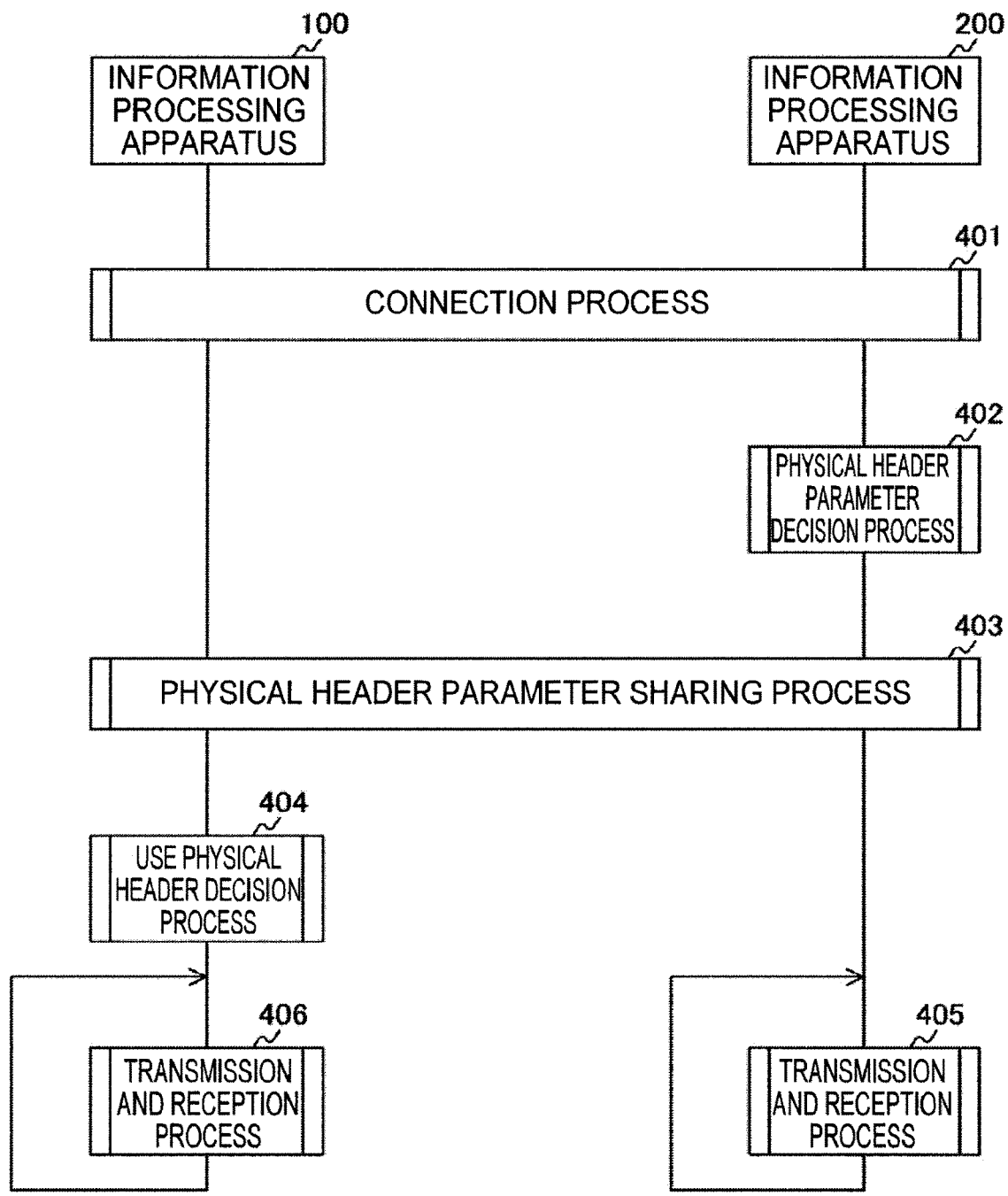

[Fig. 7]
EXAMPLE OF SHORT-DISTANCE PHYSICAL HEADER
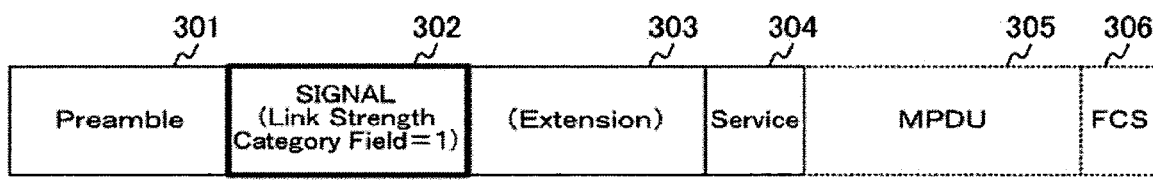
a
EXAMPLE OF LONG-DISTANCE PHYSICAL HEADER (INCLUDING LEGACY PHYSICAL HEADER)
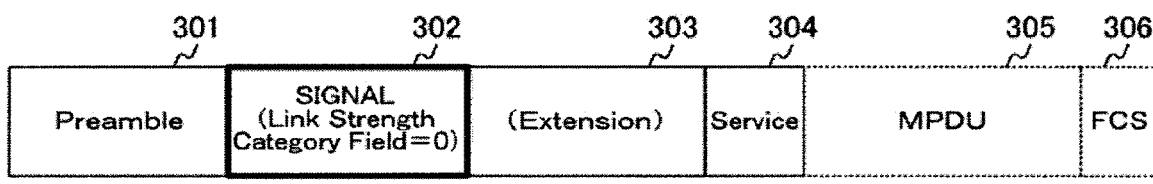
b
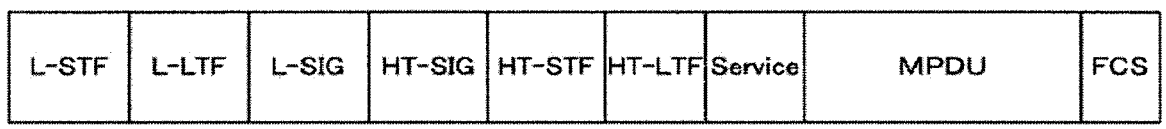
c

[Fig. 8]
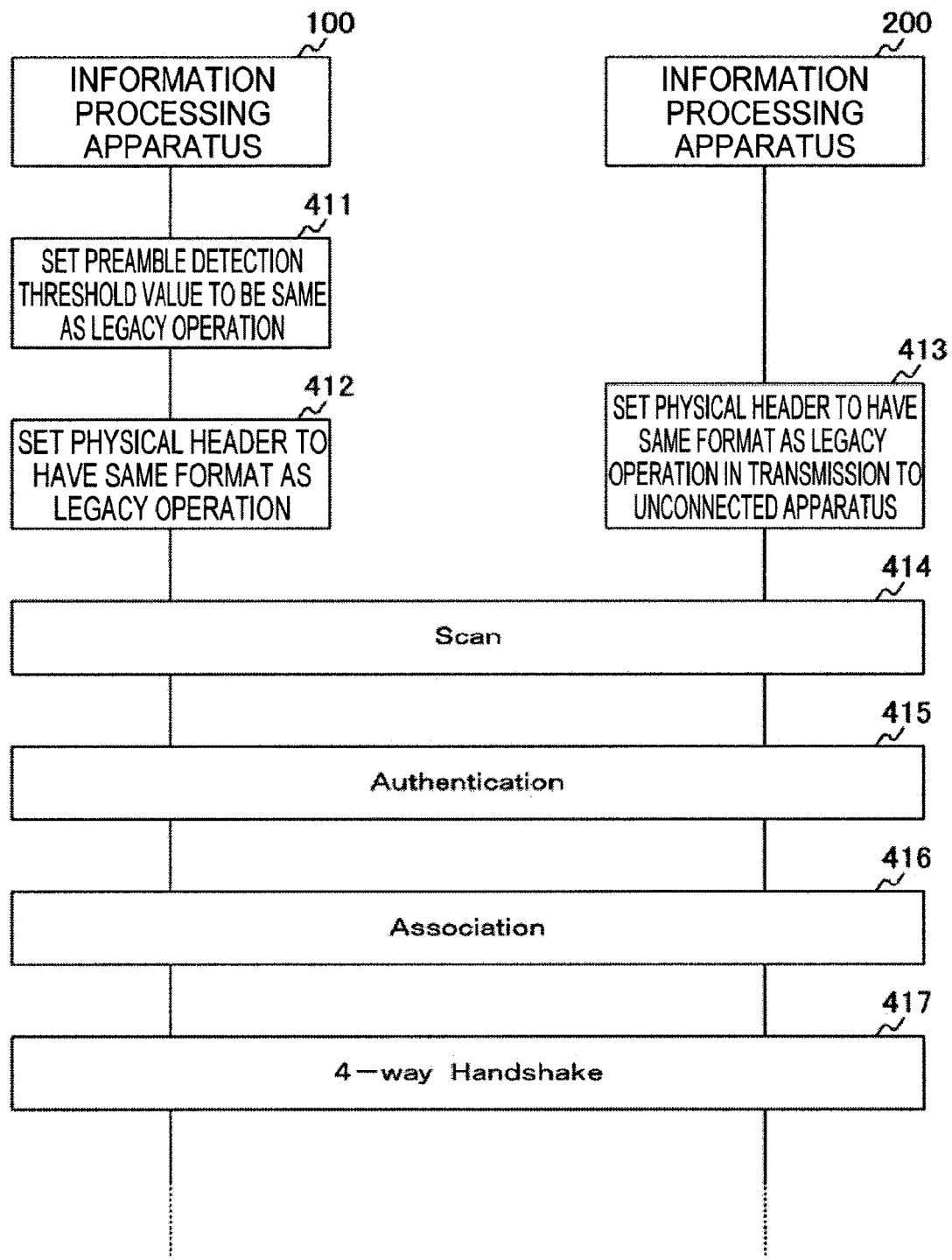

[Fig. 9]

SETTING INFORMATION LIST
161

| INDEX | DETECTION THRESHOLD VALUE (dBm) | APPLICATION LEVEL (dBm) |
|---|---|---|
| 0 | −65 | −40 |
| 1 | −80 | −99 |

[Fig. 10]
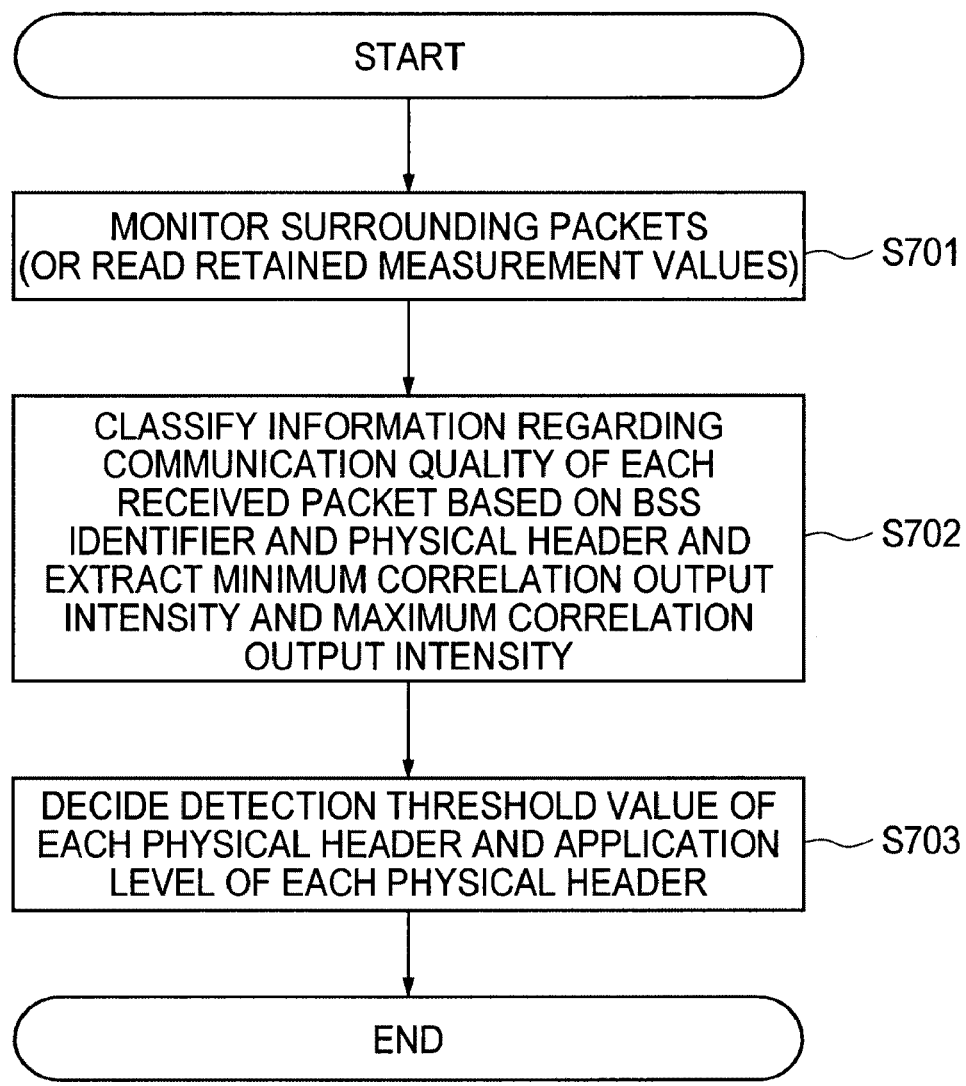

[Fig. 11]
CORRELATOR EXAMPLE (AUTOCORRELATION)
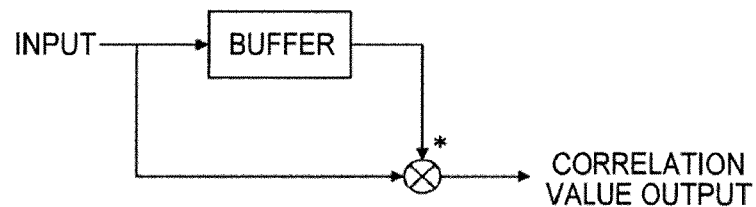
a
CORRELATOR EXAMPLE (CROSS-CORRELATION)
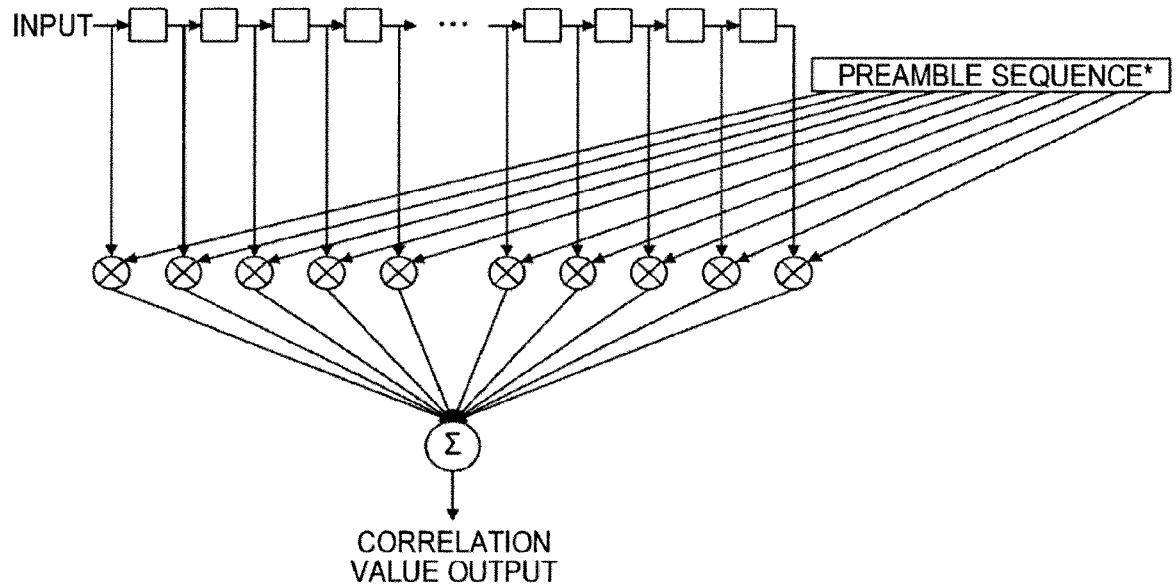
b

[Fig. 12]
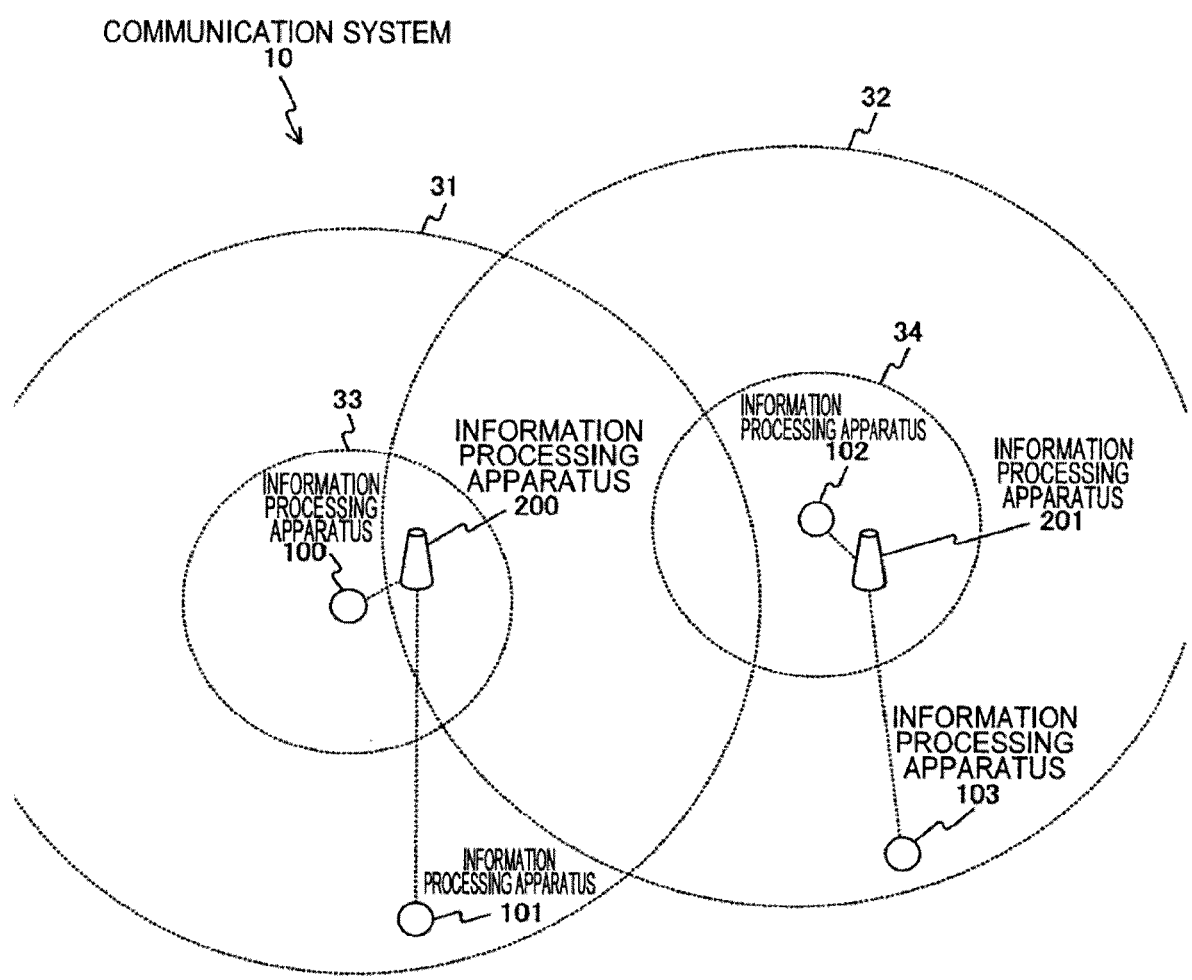

[Fig. 13]
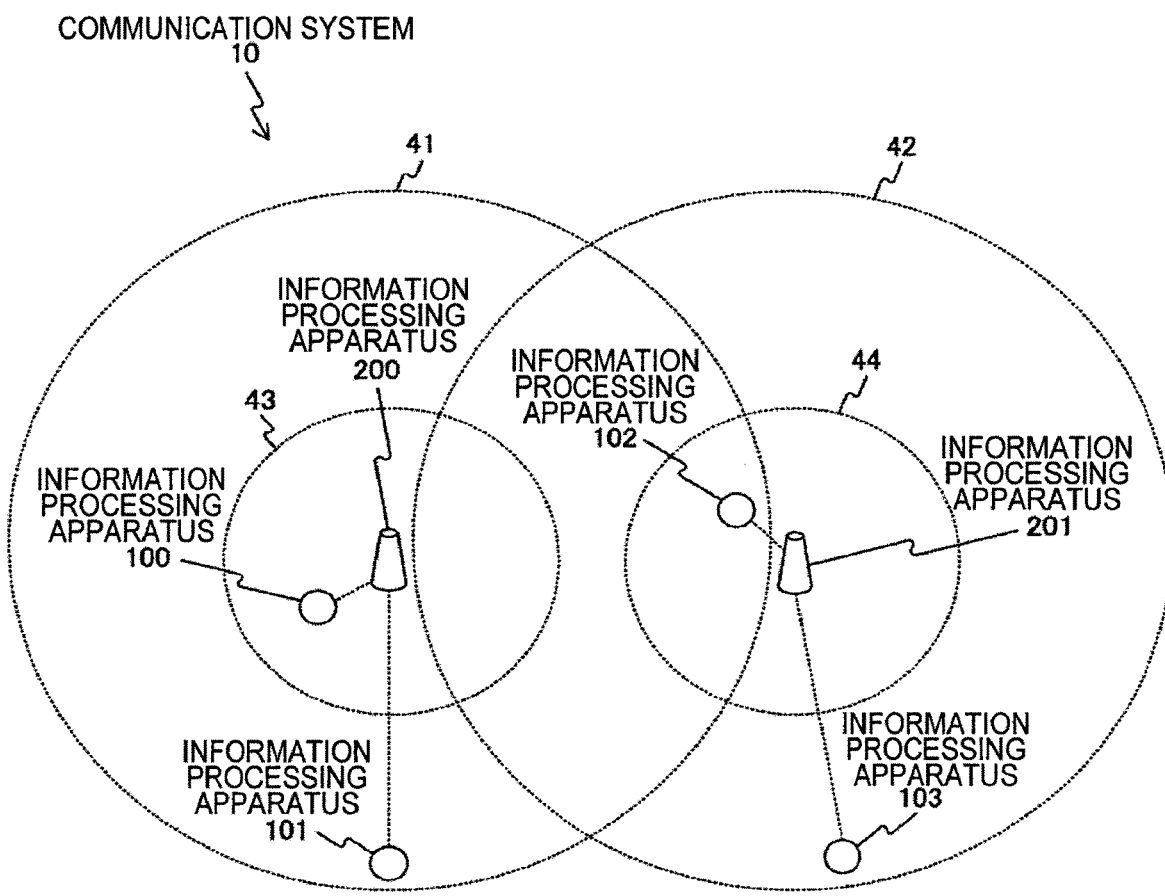

[Fig. 14]
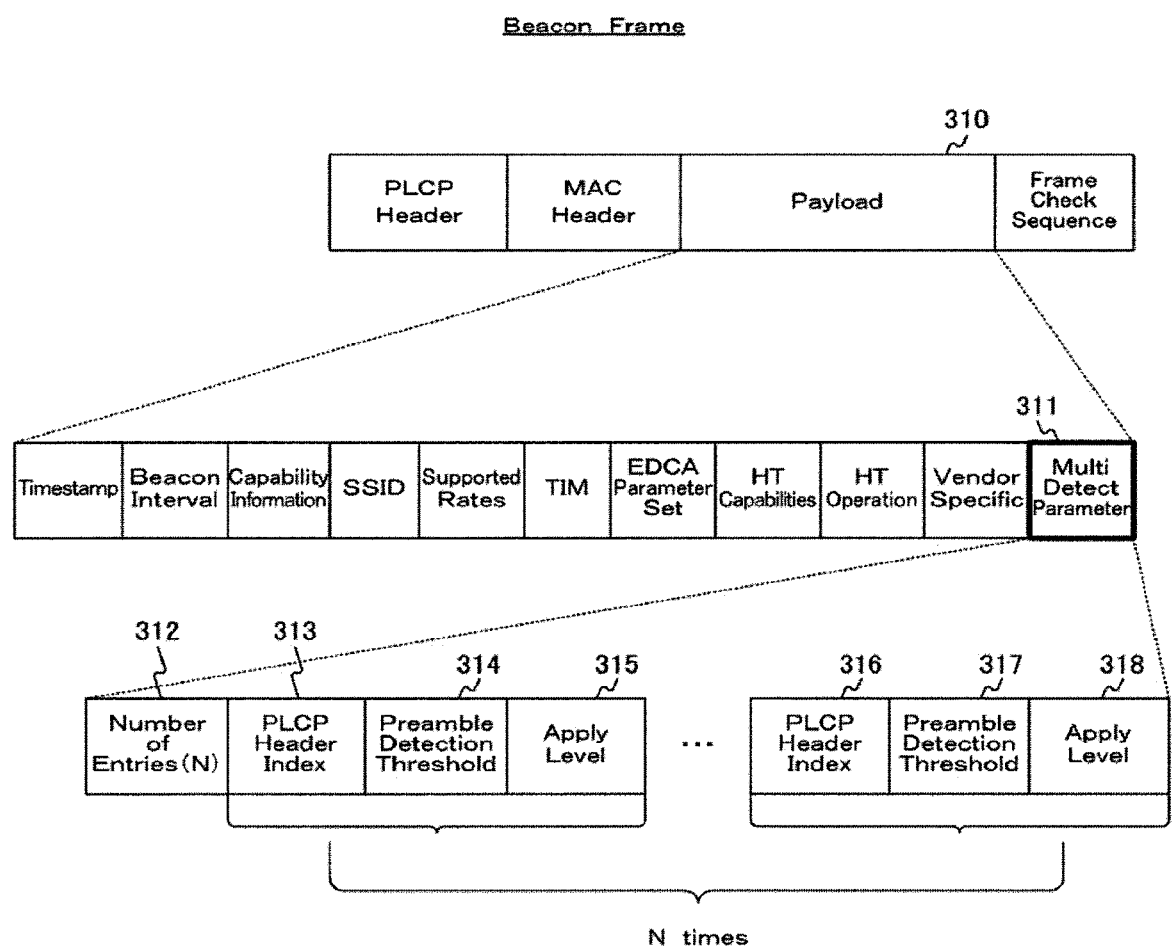

[Fig. 15]
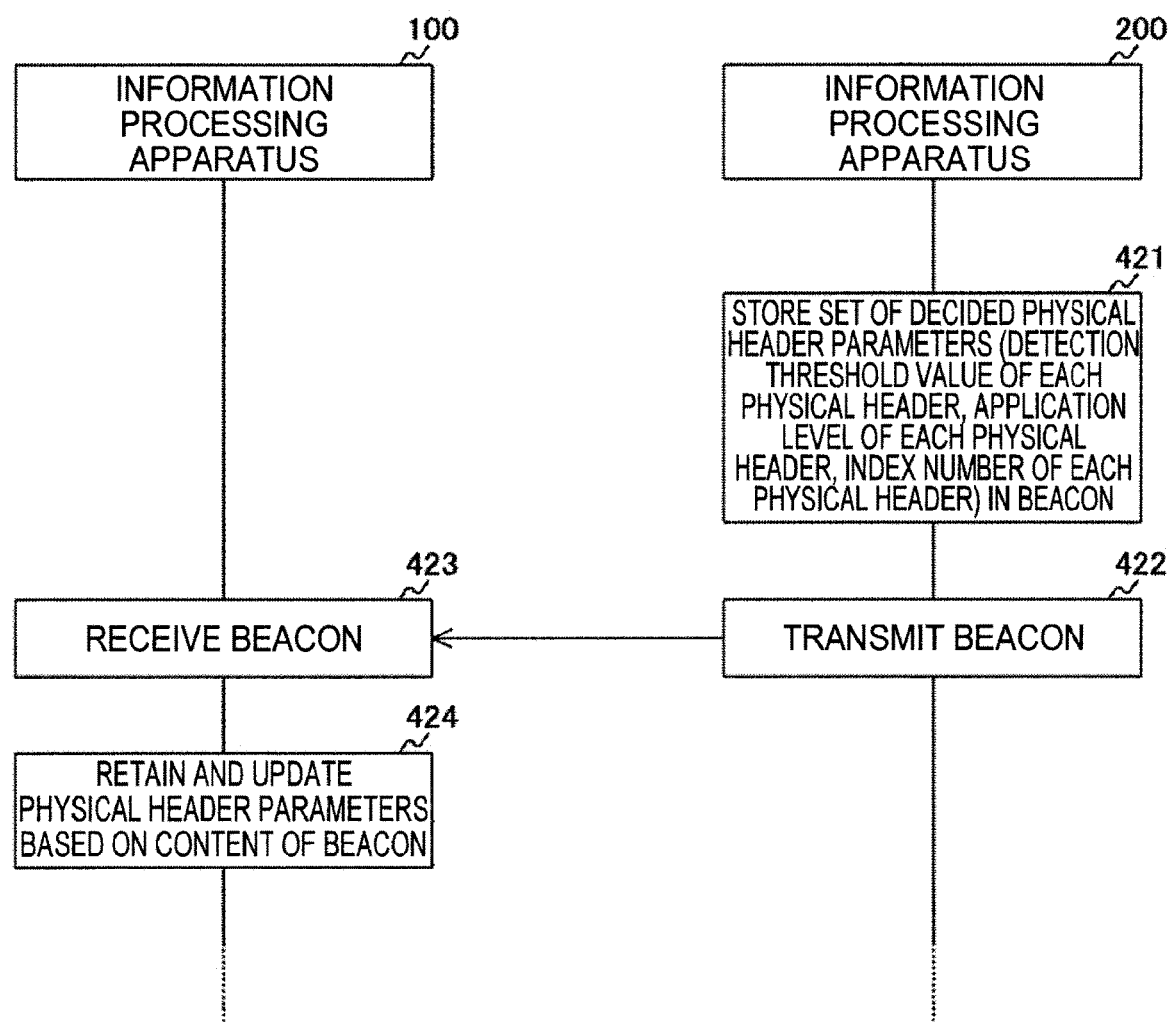

[Fig. 16]
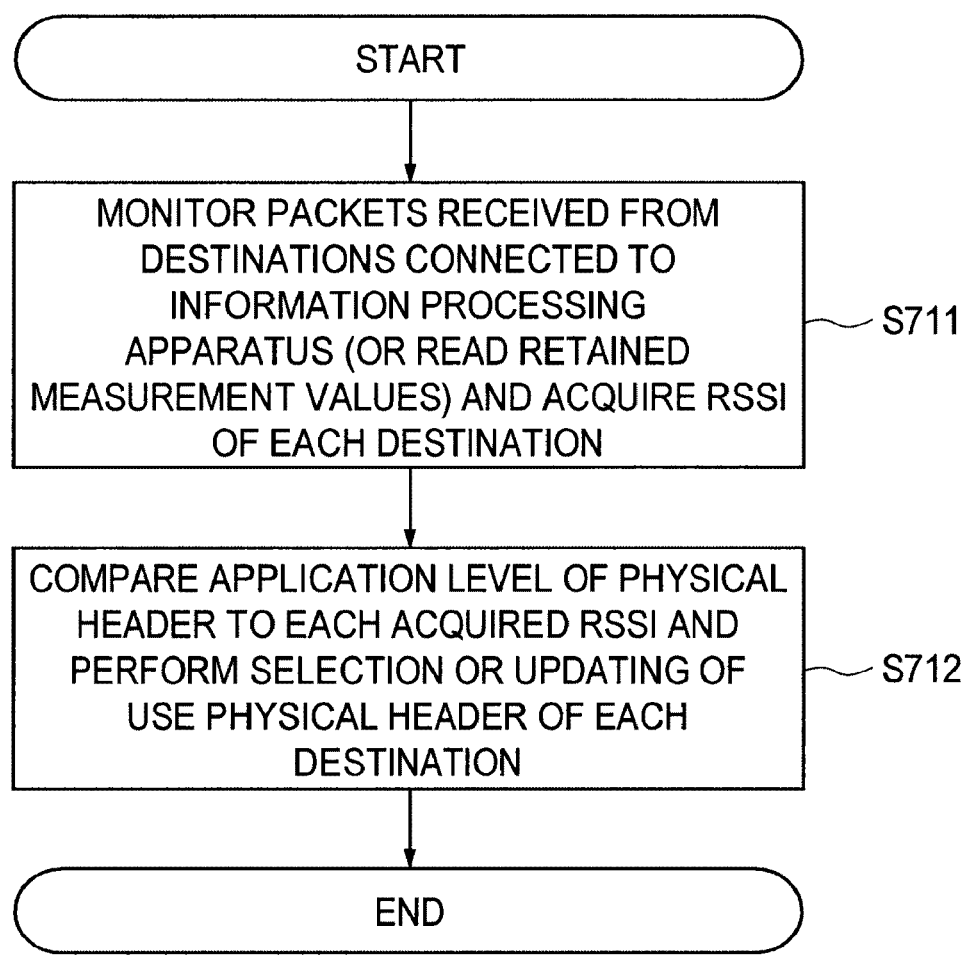

[Fig. 17]
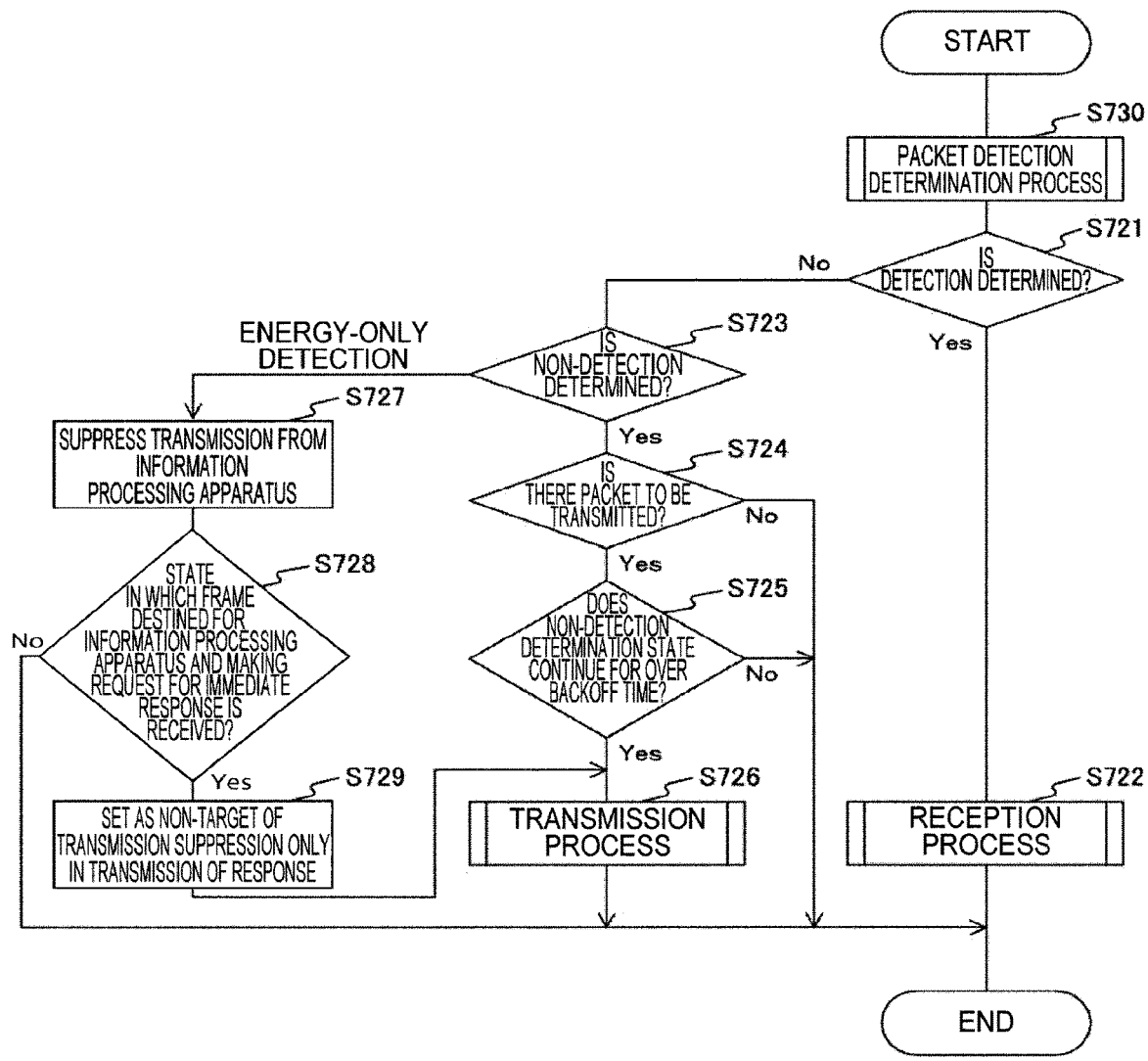

[Fig. 18]
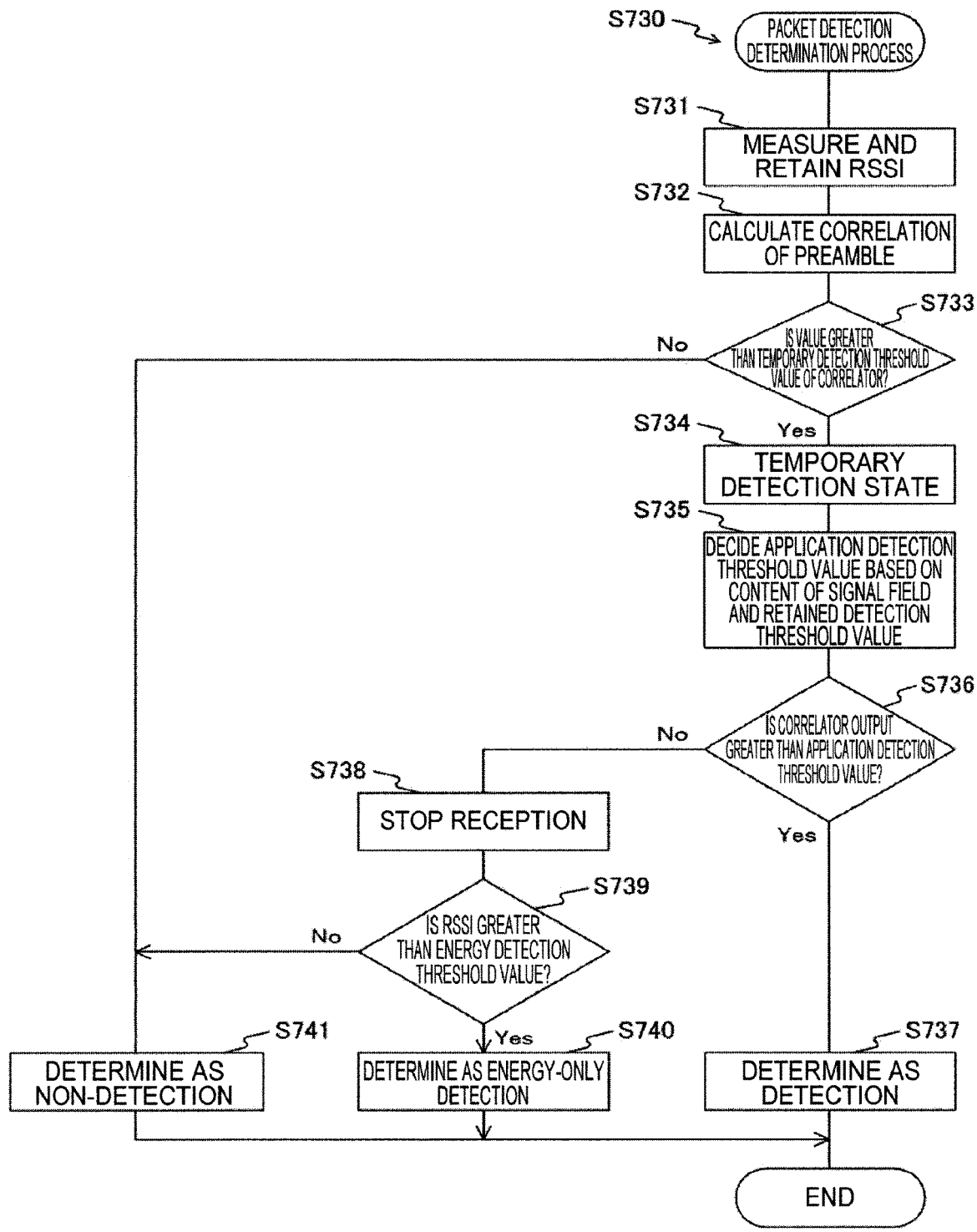

[Fig. 19]
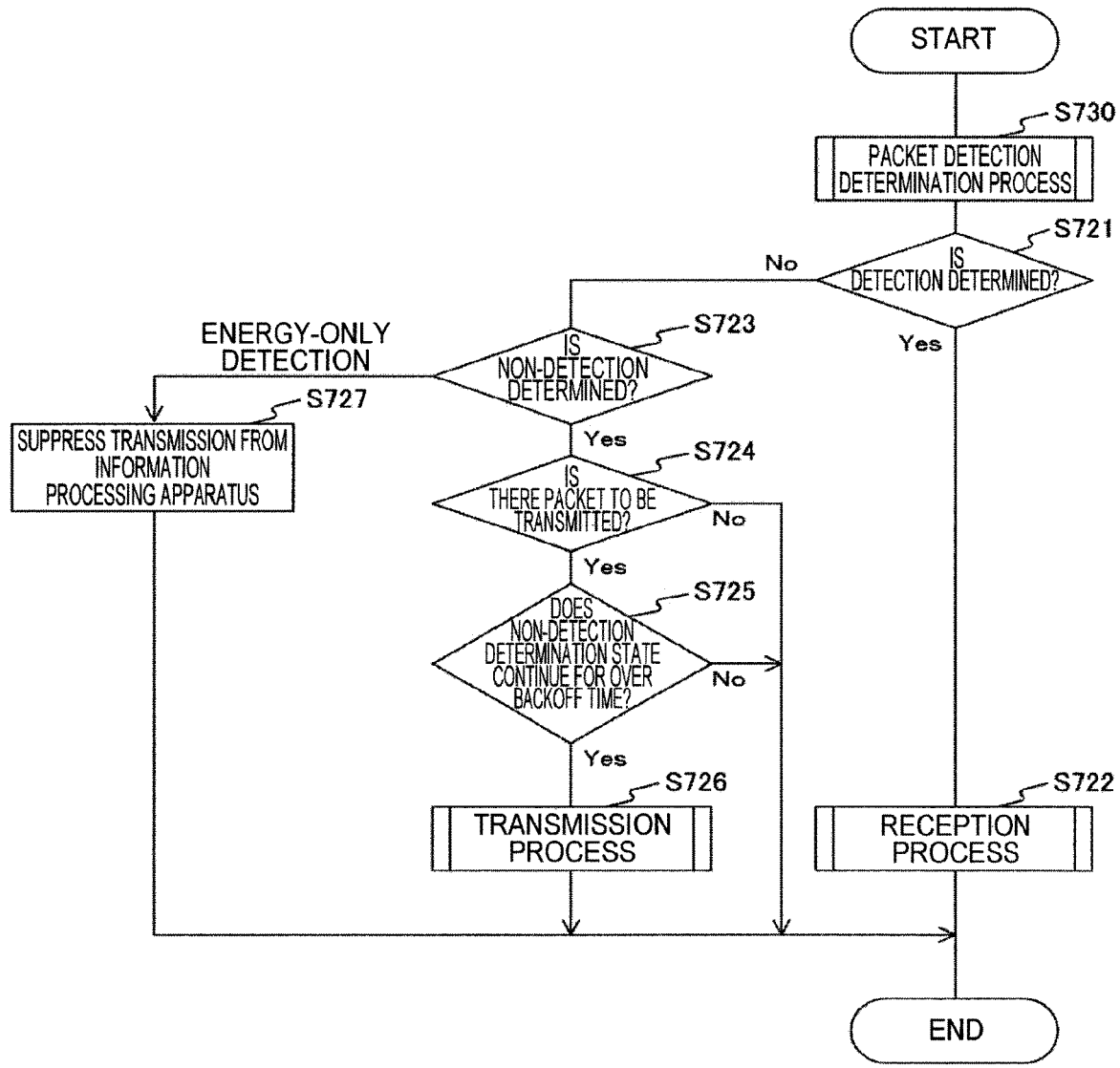

[Fig. 20]
EXAMPLE OF SHORT-DISTANCE PHYSICAL HEADER
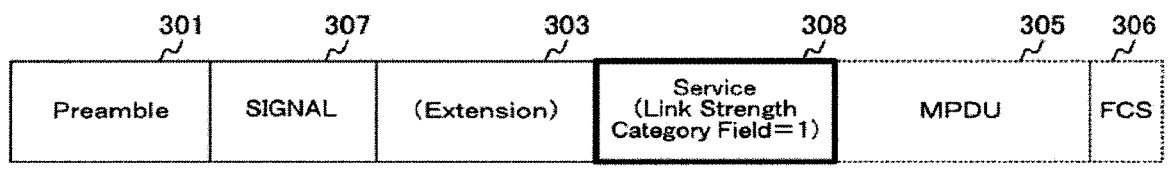
a
EXAMPLE OF LONG-DISTANCE PHYSICAL HEADER (INCLUDING LEGACY PHYSICAL HEADER)
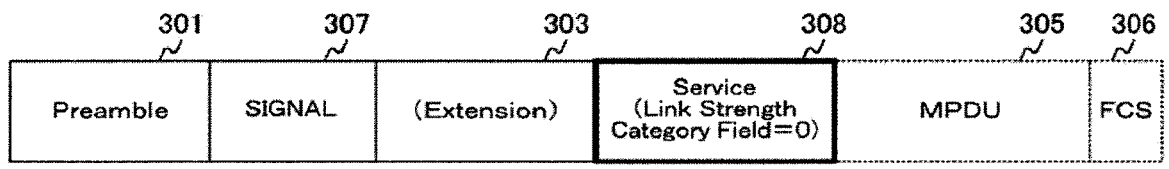
b
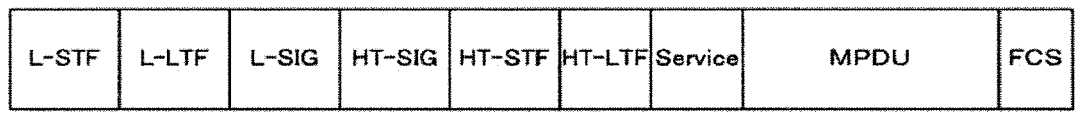
c

[Fig. 21]
EXAMPLE OF SHORT-DISTANCE PHYSICAL HEADER
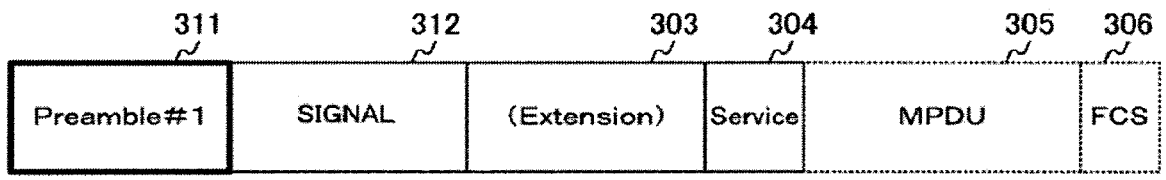
a
EXAMPLE OF LONG-DISTANCE PHYSICAL HEADER (INCLUDING LEGACY PHYSICAL HEADER)
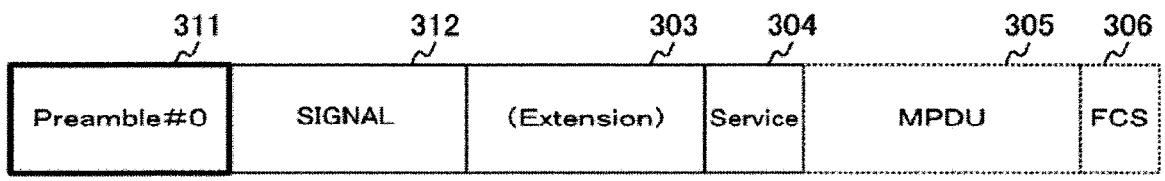
b
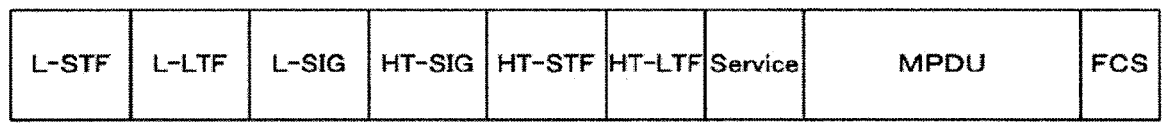
c

[Fig. 22]
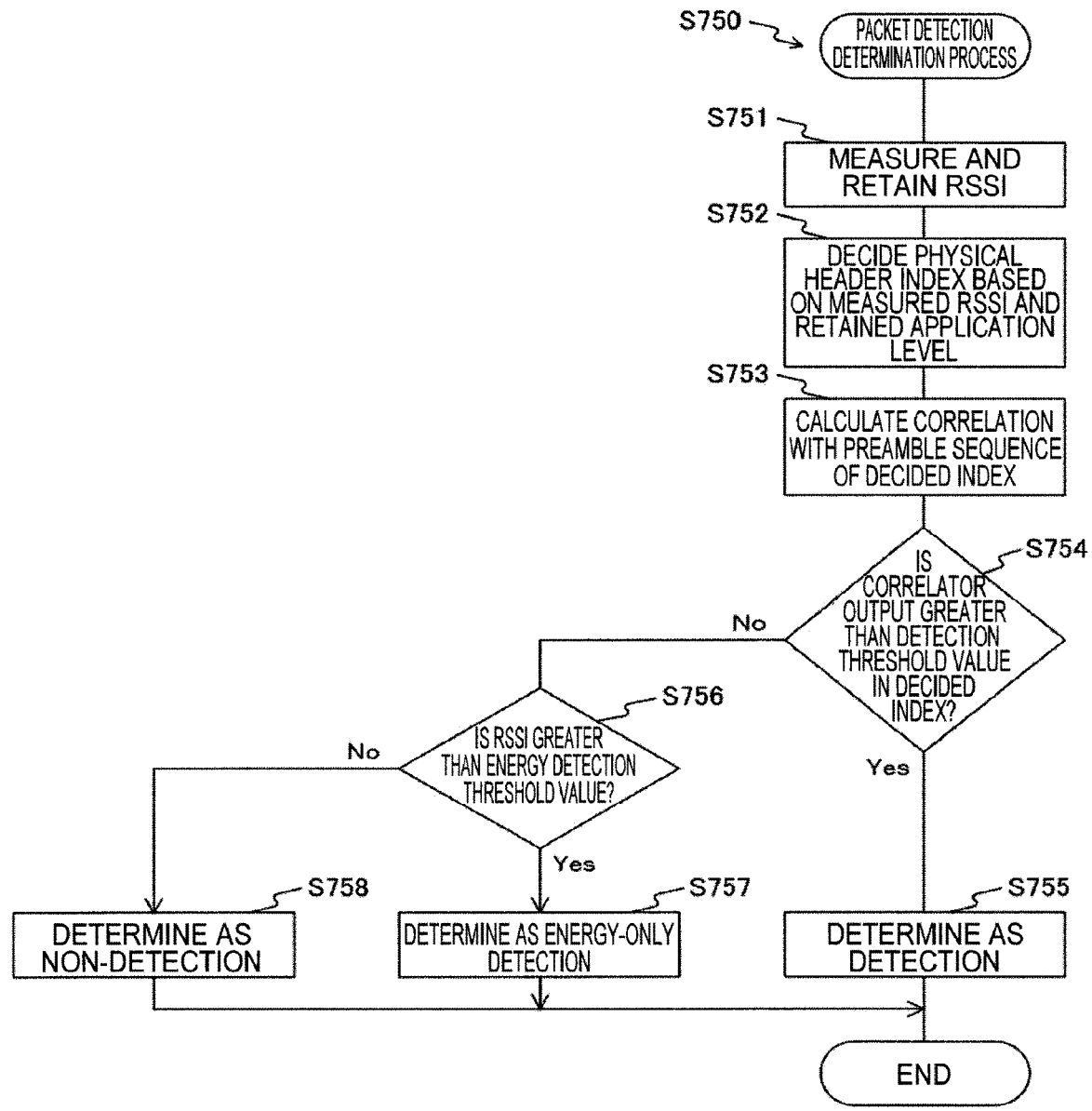

[Fig. 23]
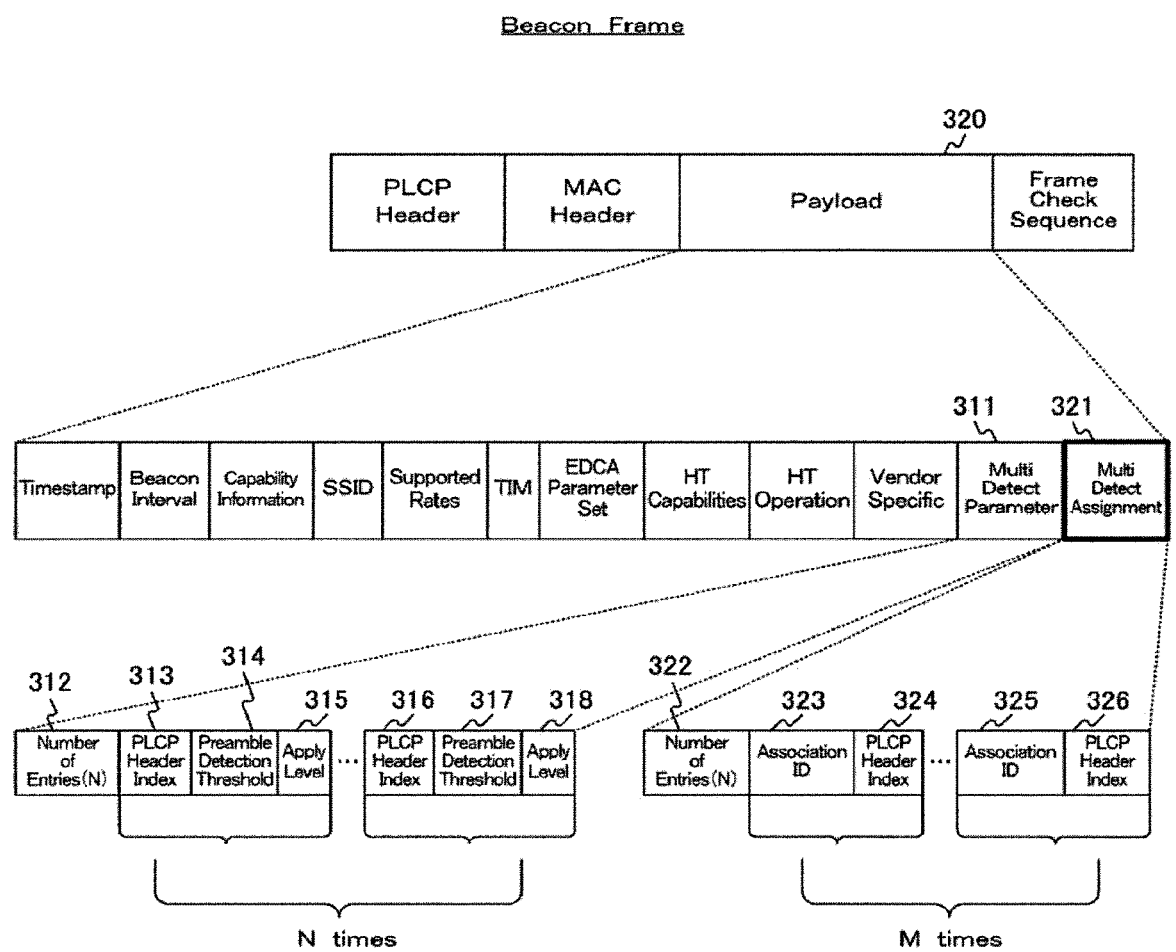

[Fig. 24]
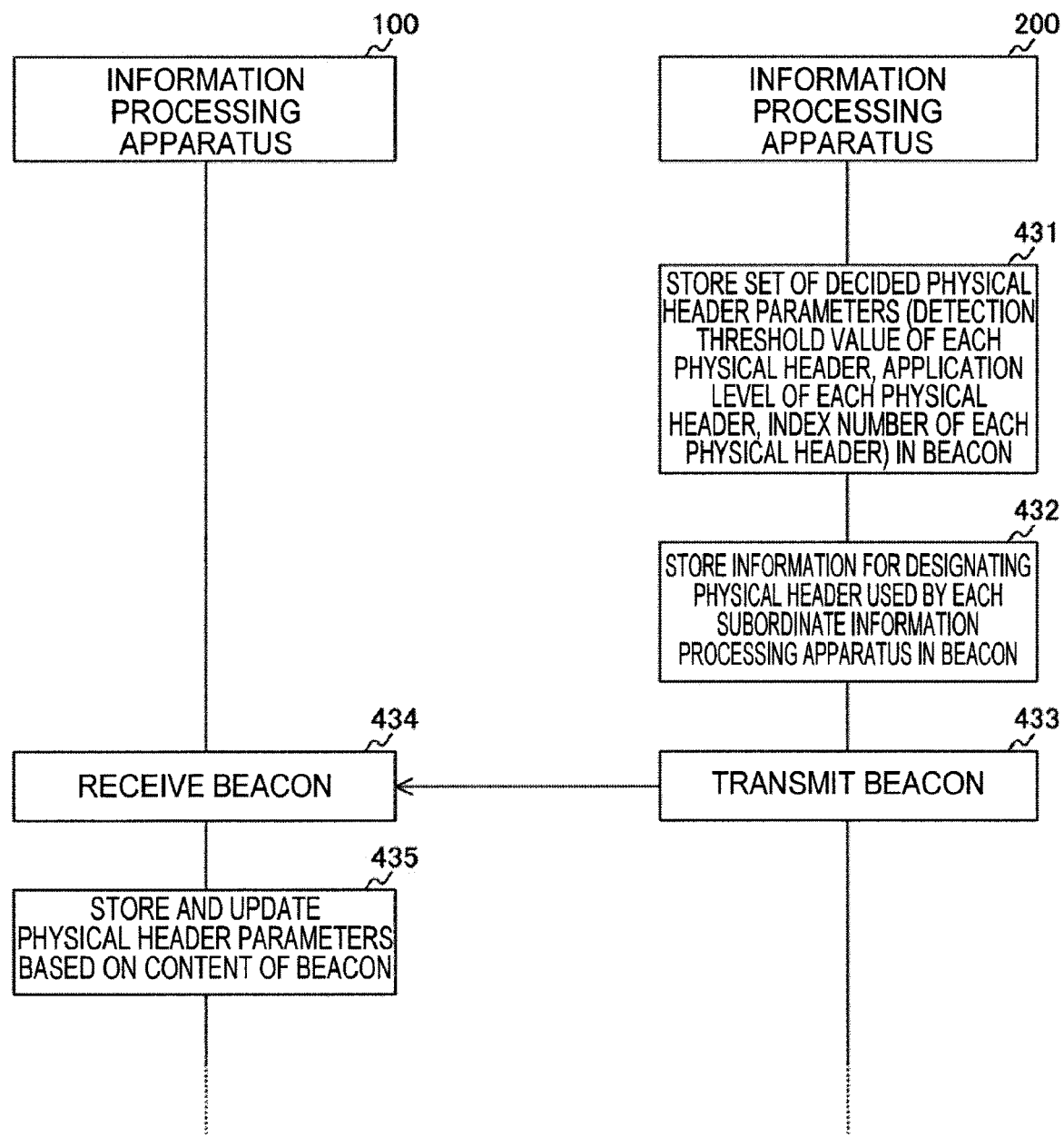

[Fig. 25]
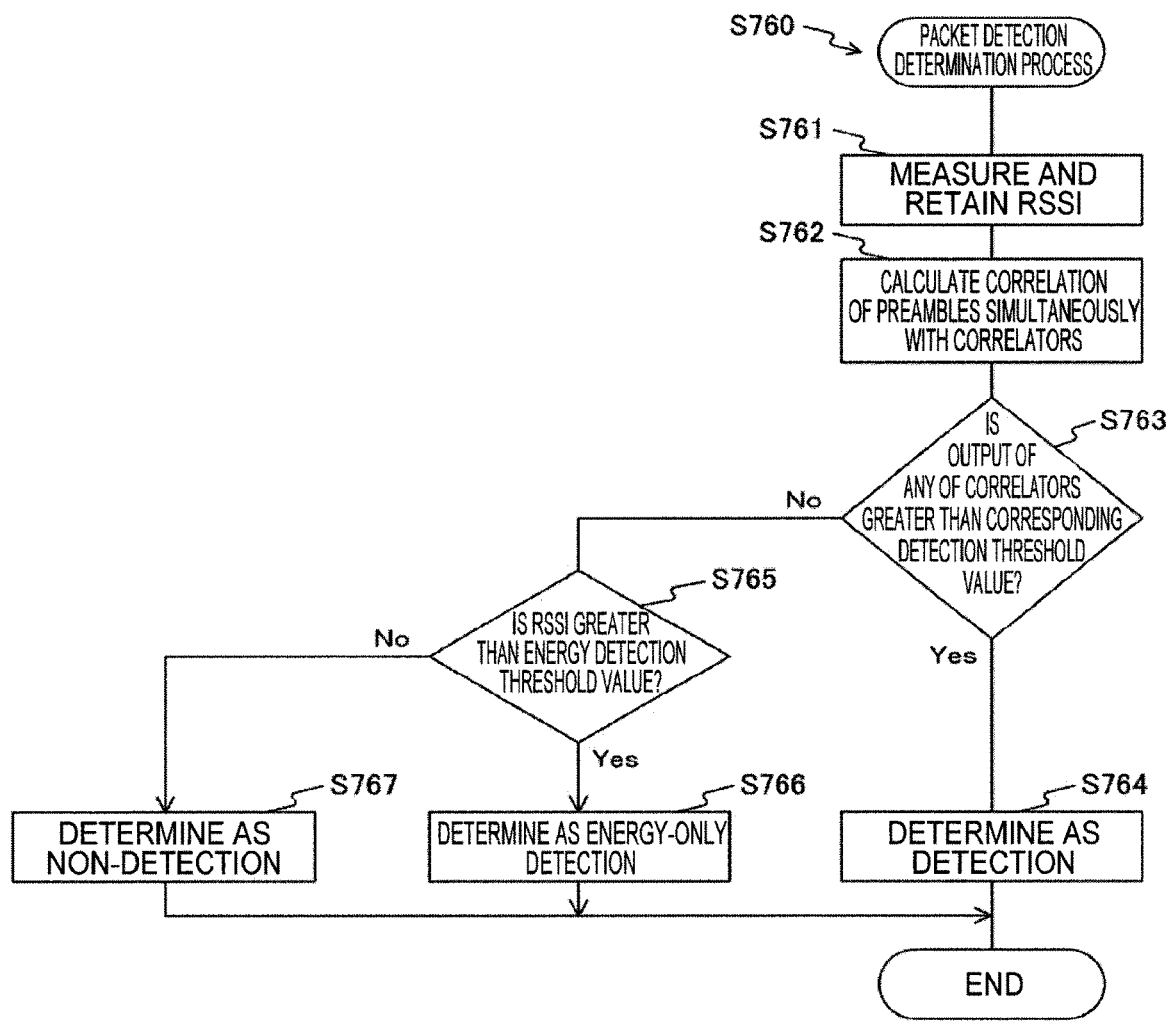

[Fig. 26]
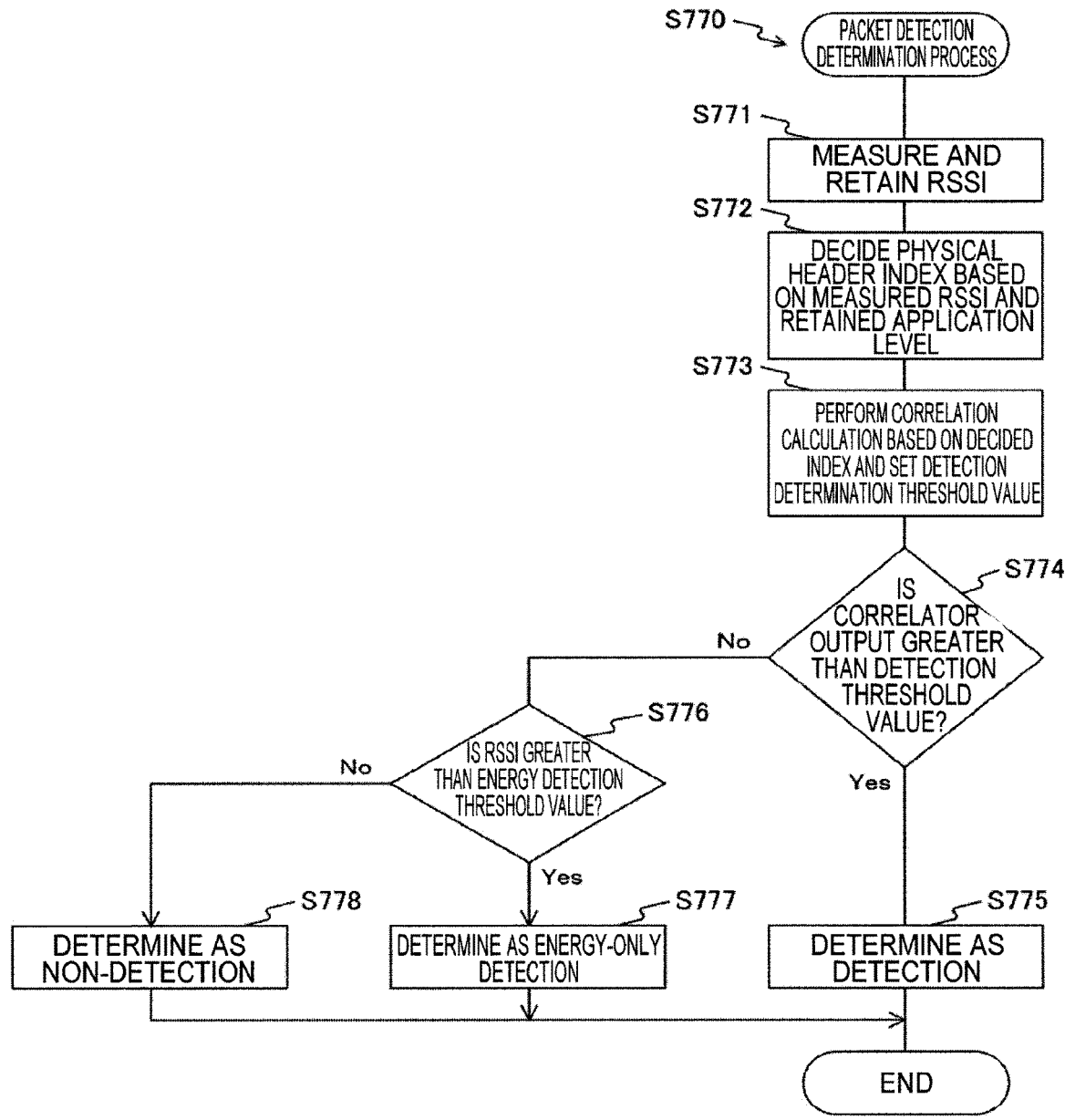

[Fig. 27]
CORRELATOR EXAMPLE (AUTOCORRELATION: PARTIAL PROCESSING WITH SWITCH)
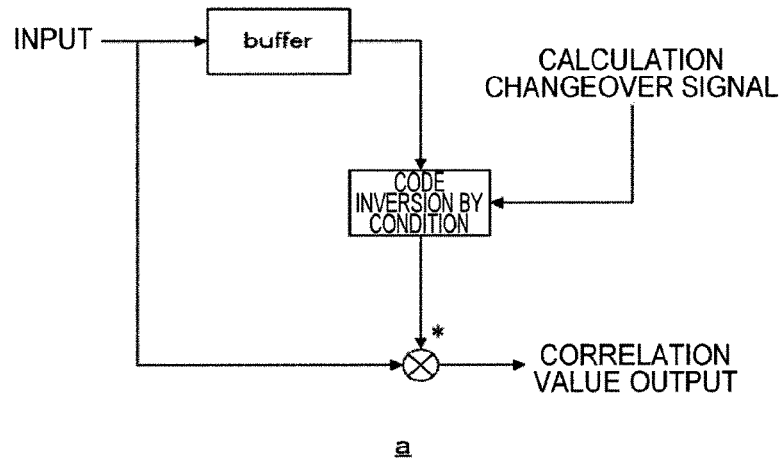
a
CORRELATOR EXAMPLE (CROSS-CORRELATION: PARTIAL PROCESSING)
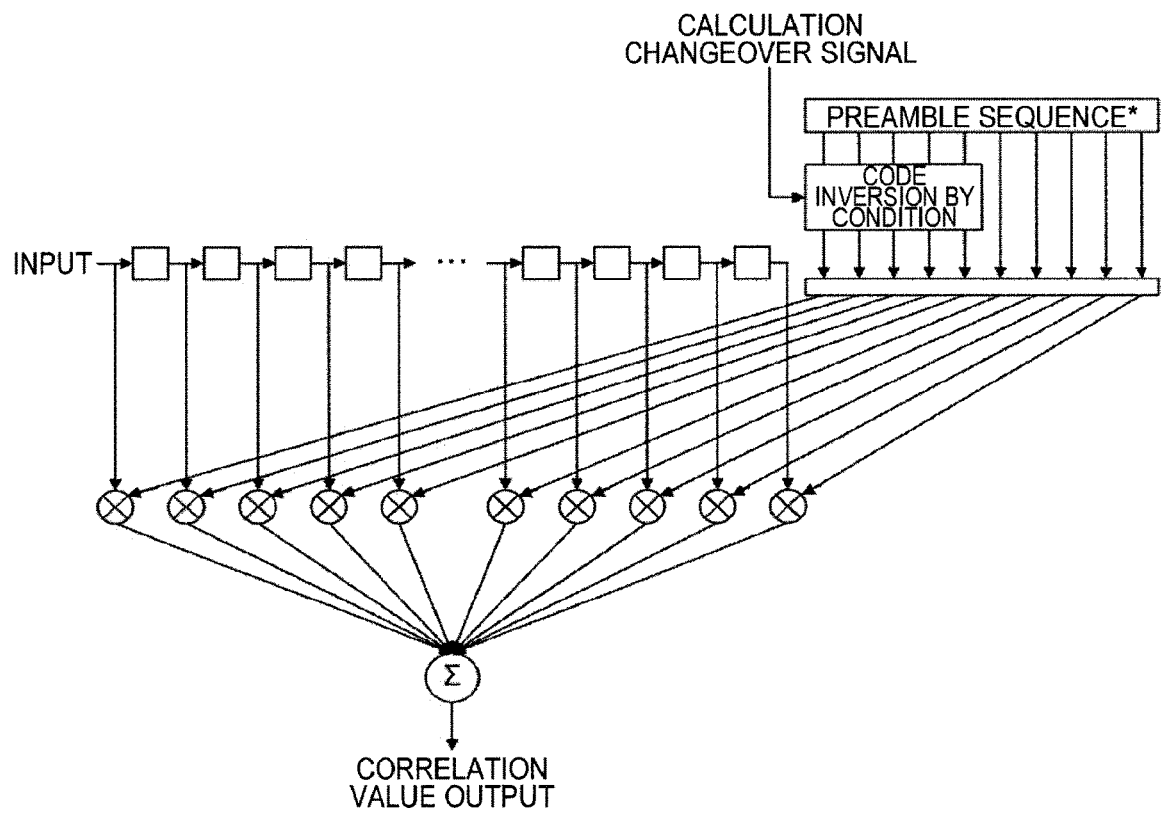
b

[Fig. 28]
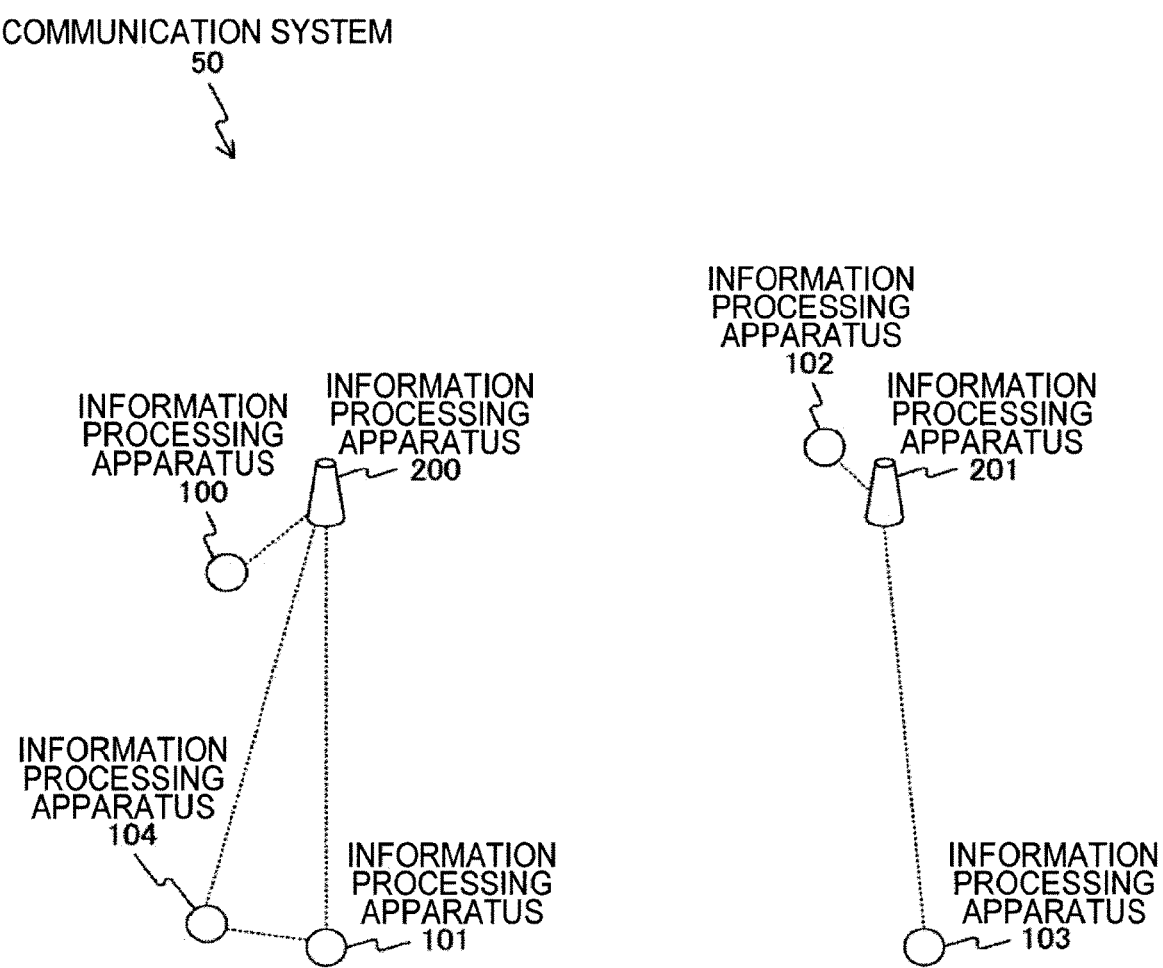

[Fig. 29]
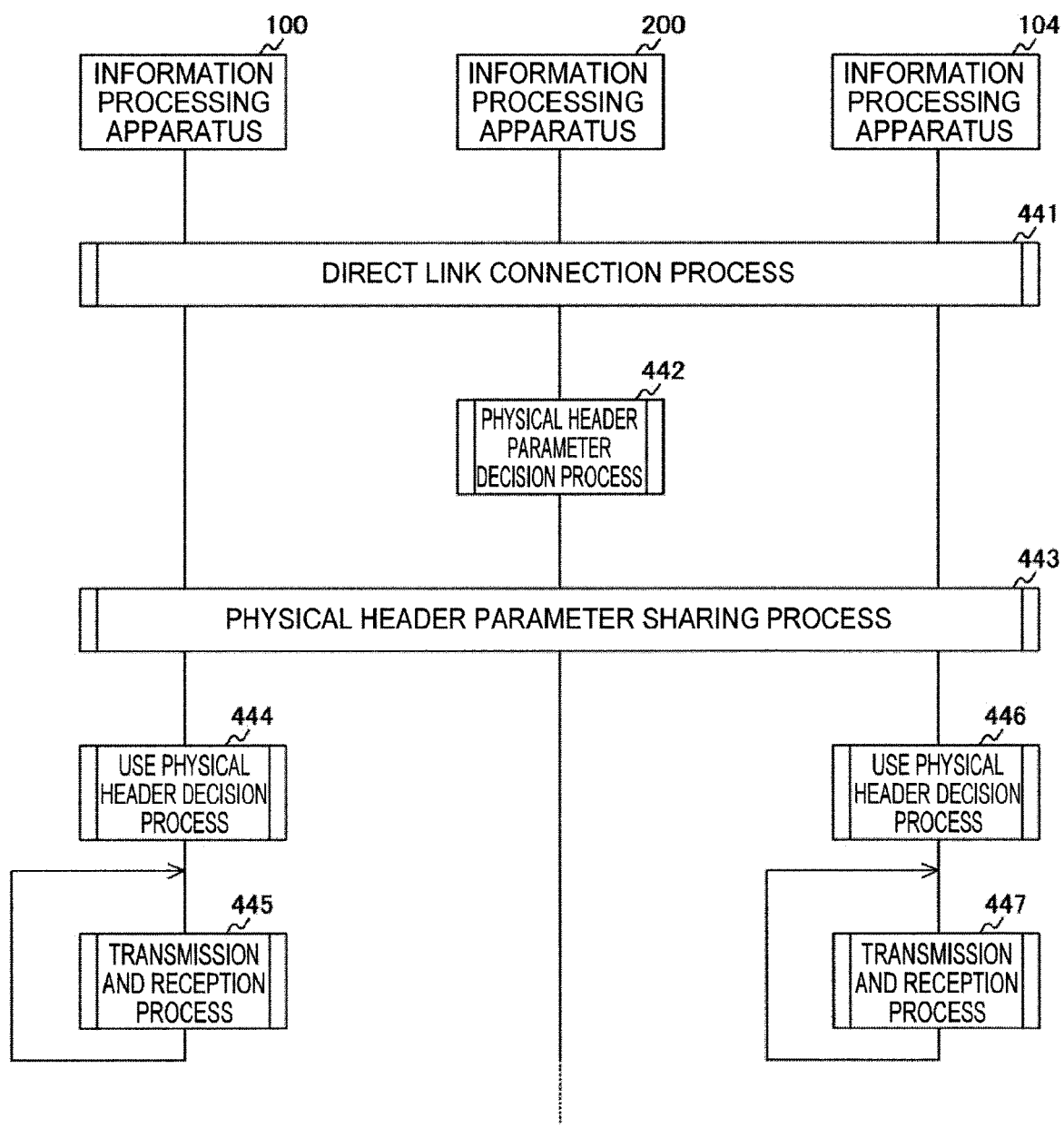

[Fig. 30]
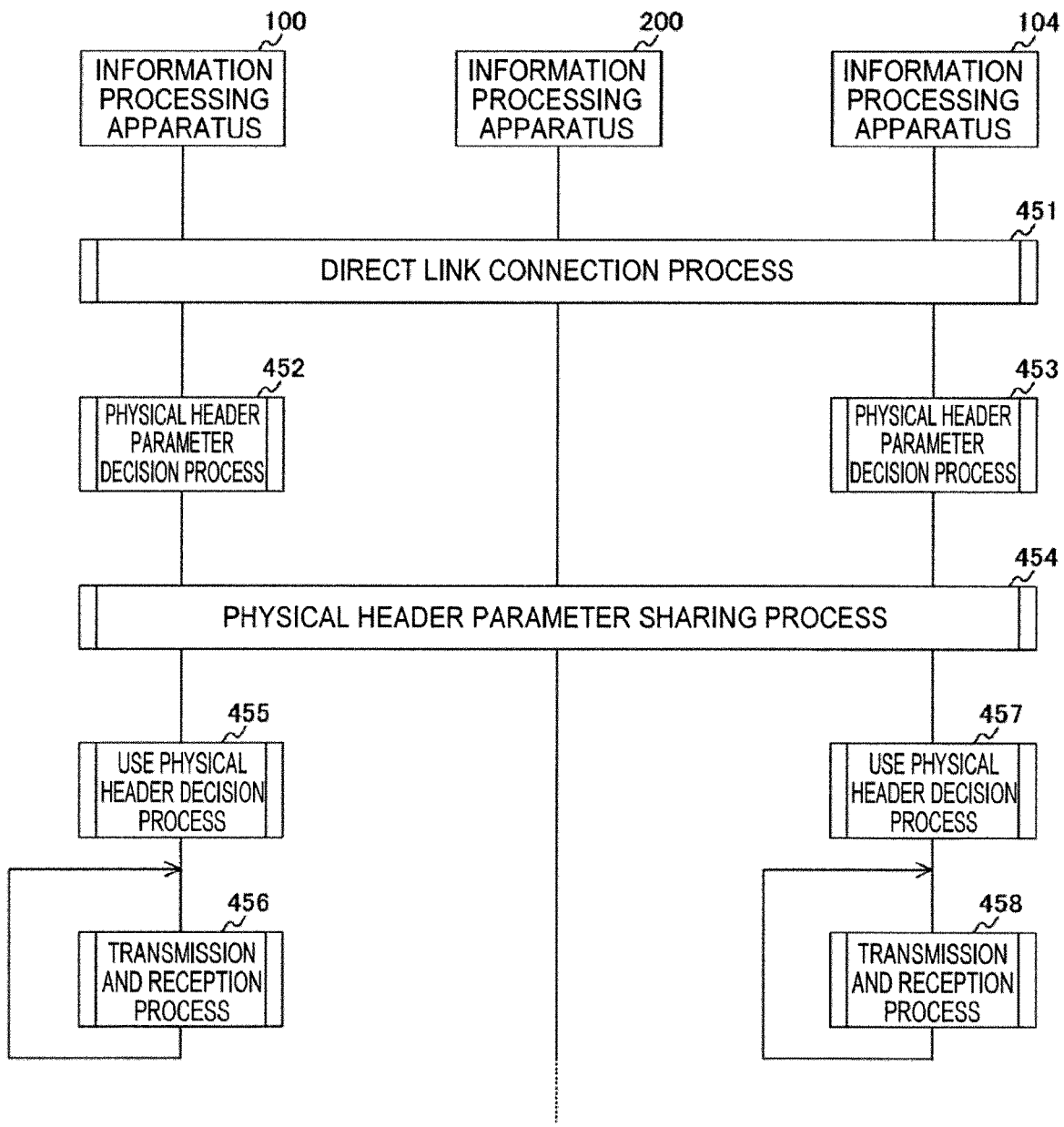

[Fig. 31]
EXAMPLE OF SHORT-DISTANCE PHYSICAL HEADER
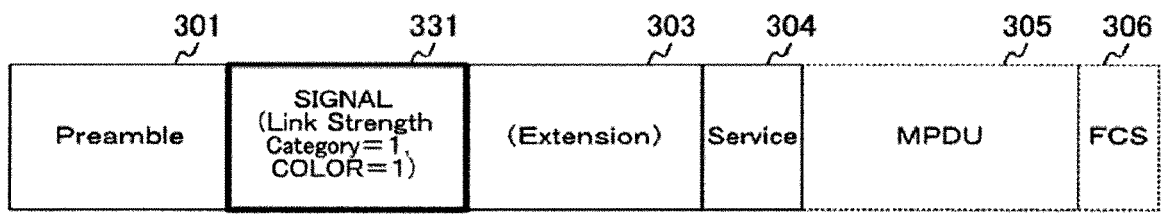
a
EXAMPLE OF LONG-DISTANCE PHYSICAL HEADER (INCLUDING LEGACY PHYSICAL HEADER)
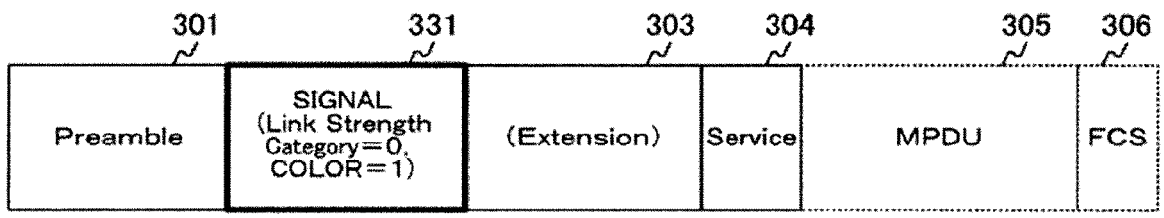
b
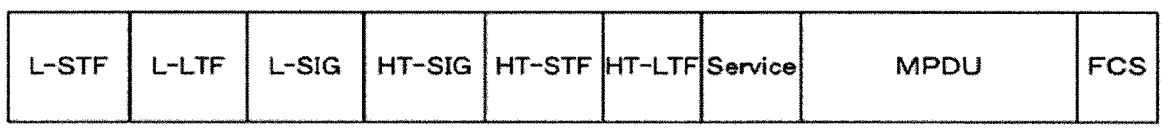
c

[Fig. 32]
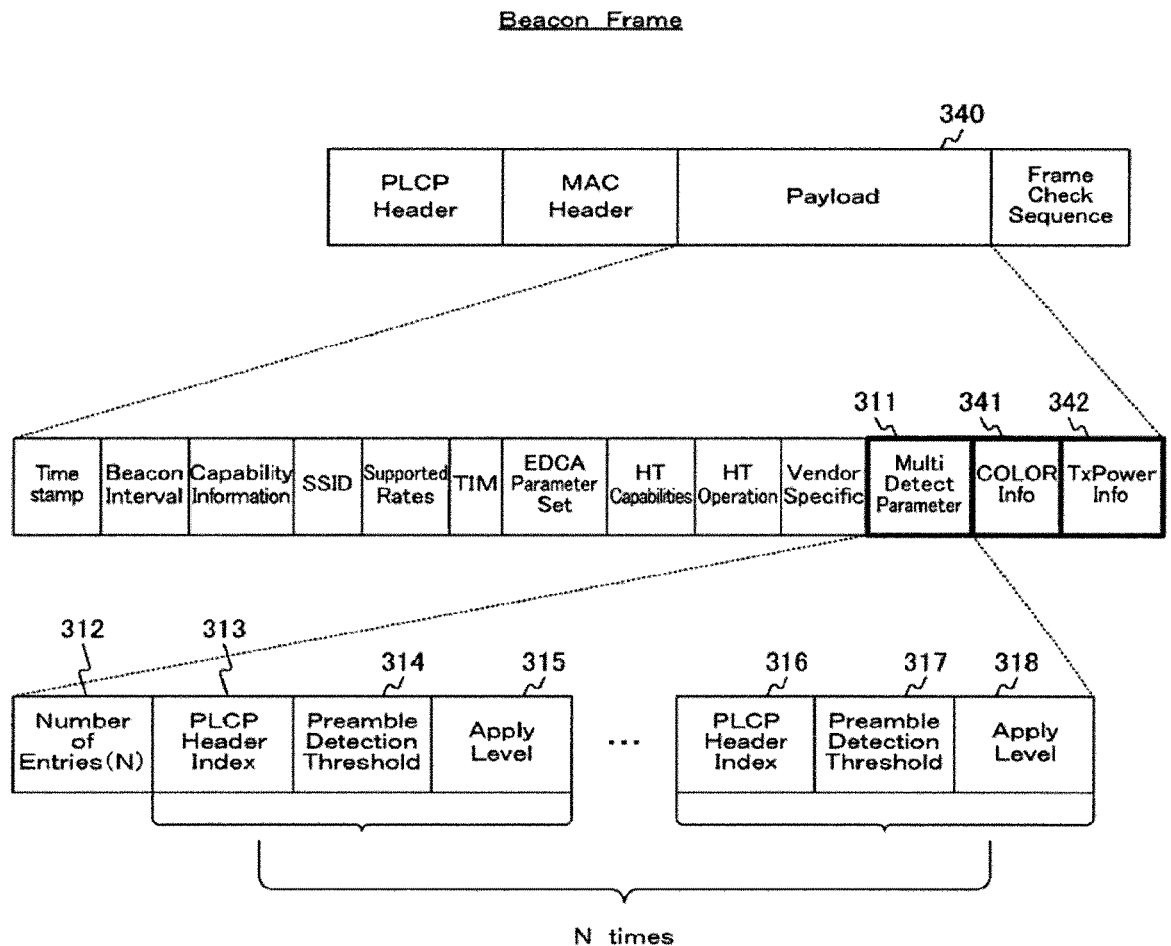
[Fig. 33]
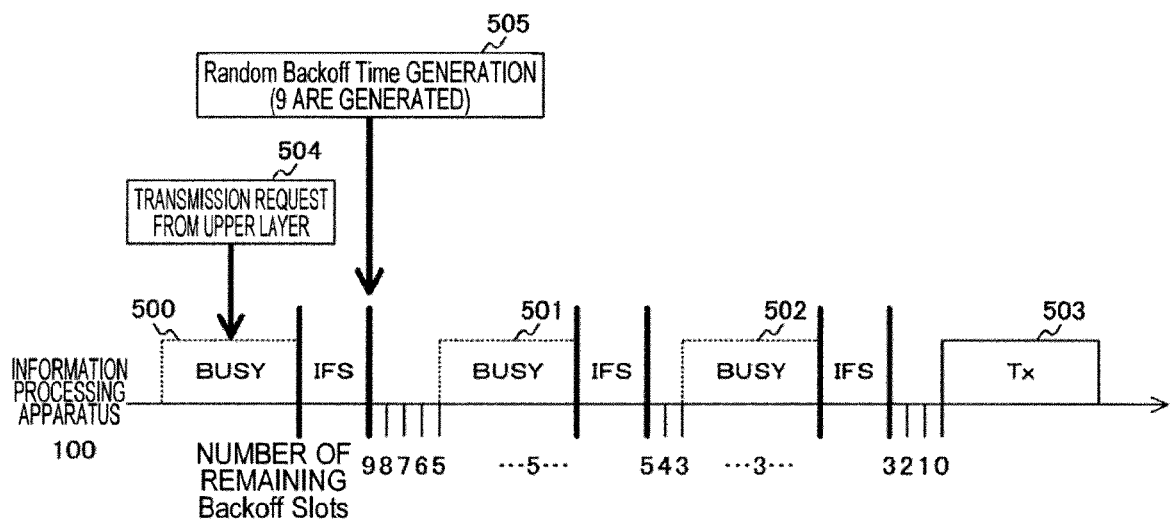

[Fig. 34]
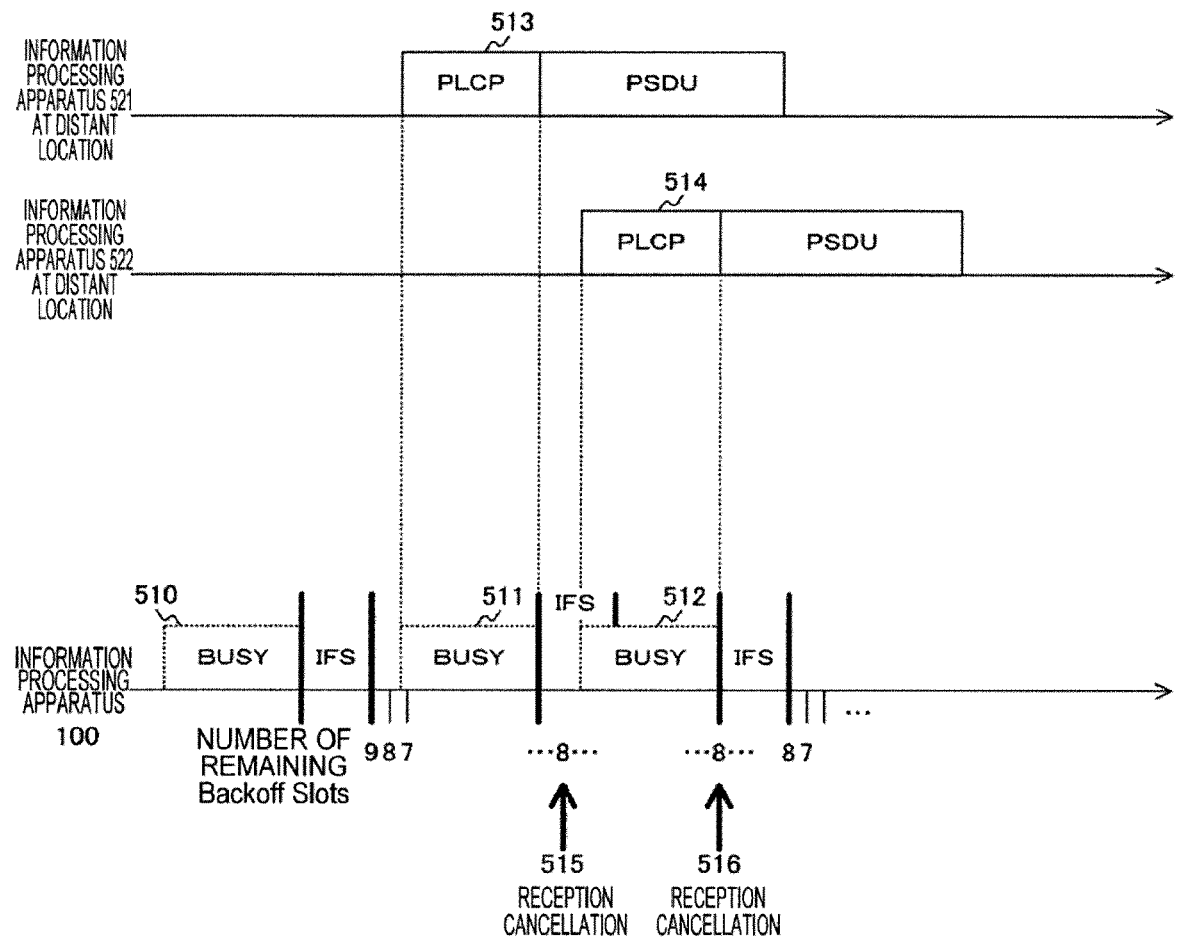

[Fig. 35]
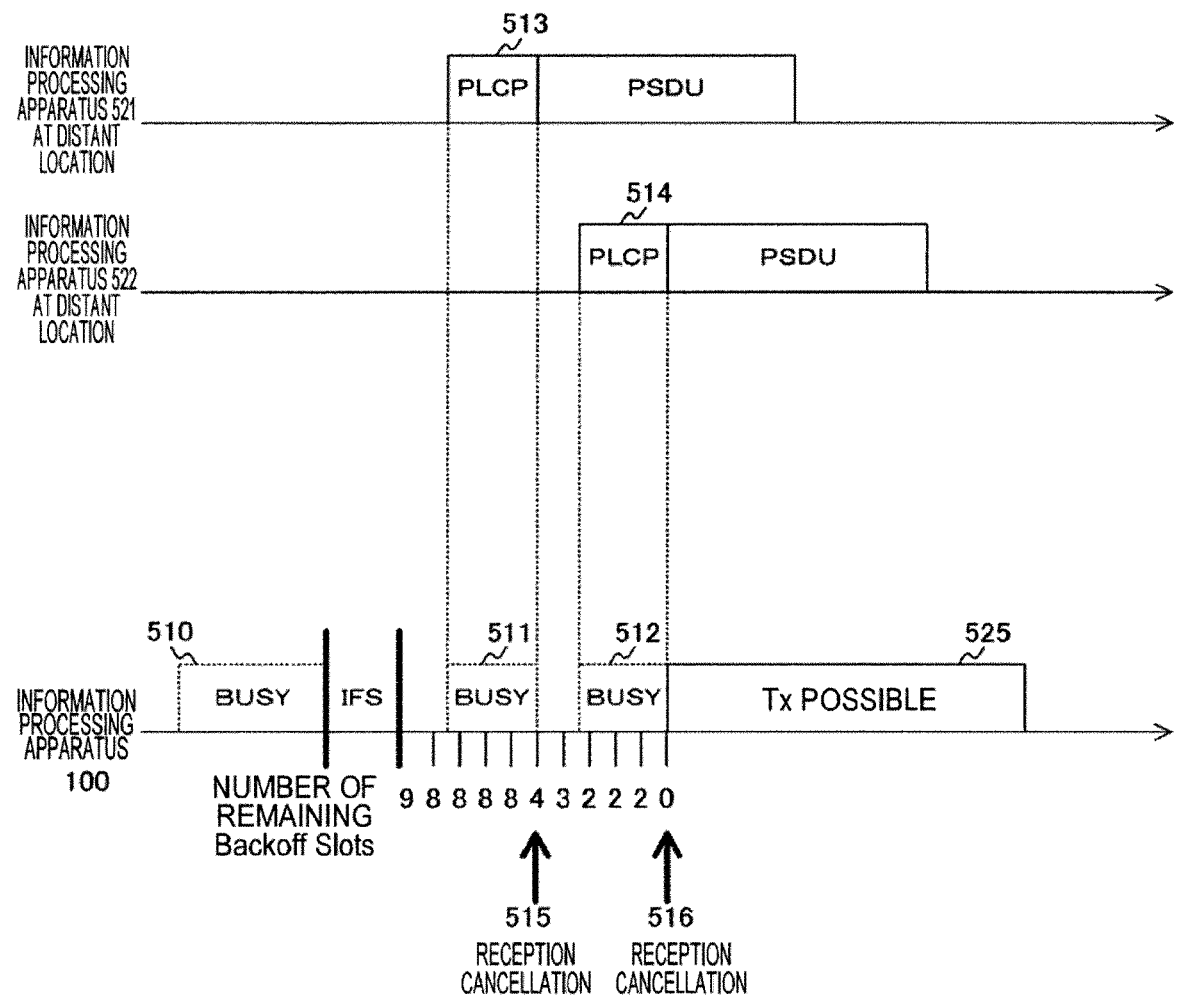

[Fig. 36]
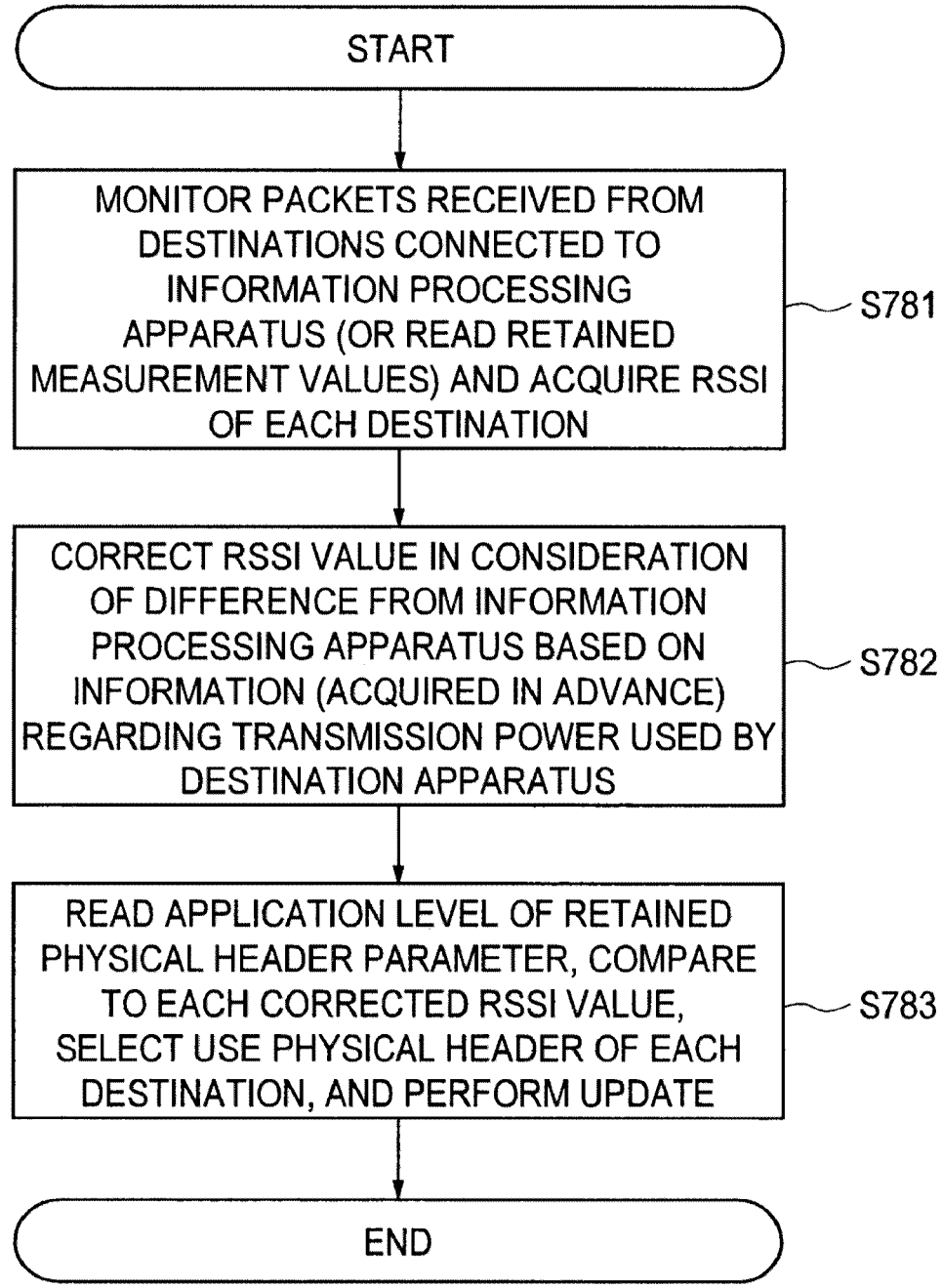

[Fig. 37]
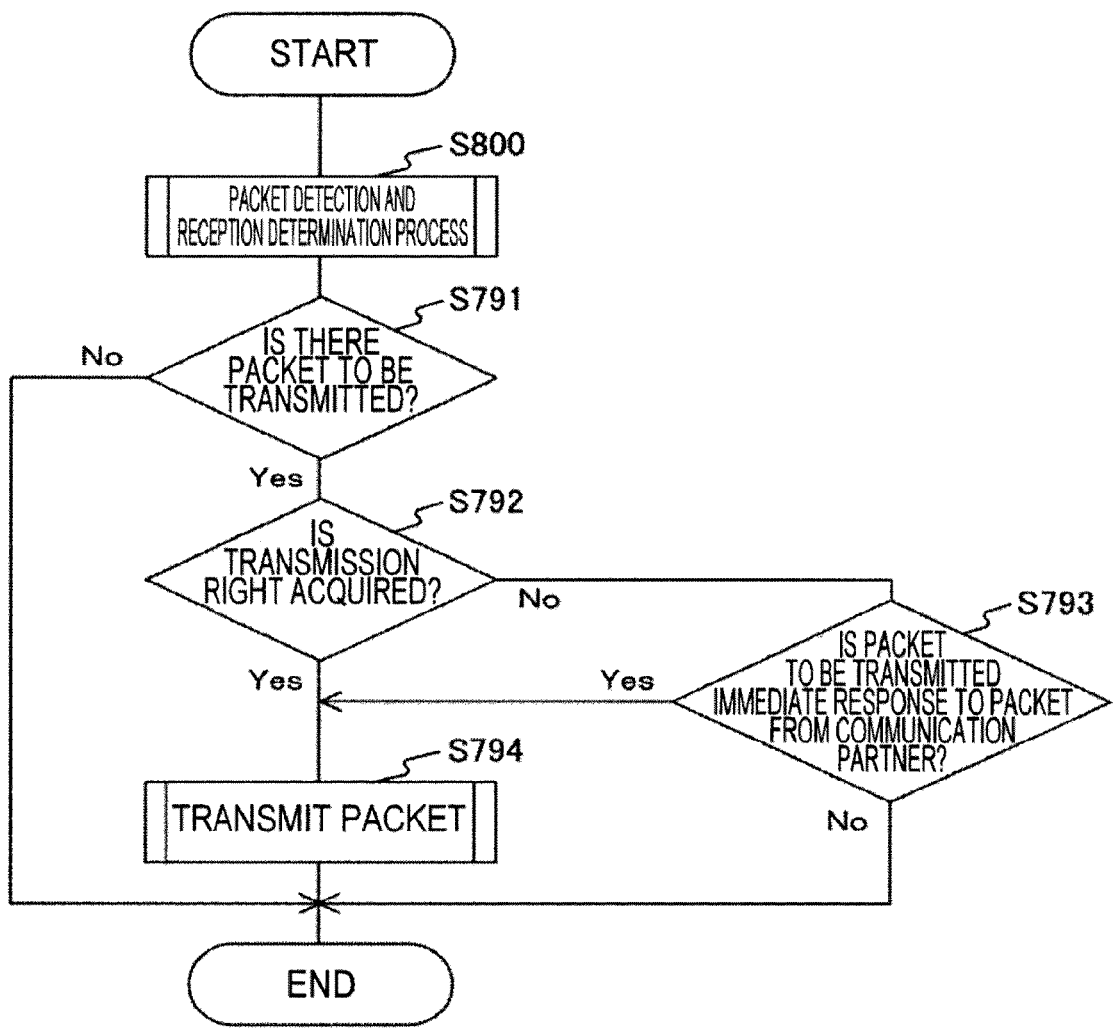

[Fig. 38]

PROCESS CLASSIFICATION TABLE

|  | NO ERROR IN CRC CALCULATION RESULT OF PHYSICAL HEADER | | | ERROR IN CRC CALCULATION RESULT OF PHYSICAL HEADER |
|---|---|---|---|---|
|  | COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| CORRELATOR OUTPUT INTENSITY IS LESS THAN DETECTION THRESHOLD VALUE CORRESPONDING TO Link Strength Category IN PHYSICAL HEADER | RECEPTION | RECEPTION TERMINATION (IDLE) | RECEPTION TERMINATION (IDLE) | RECEPTION TERMINATION (ERROR) ※IFS=EIFS |
| CORRELATOR OUTPUT INTENSITY IS EQUAL TO OR GREATER THAN DETECTION THRESHOLD VALUE CORRESPONDING TO Link Strength Category IN PHYSICAL HEADER | RECEPTION | RECEPTION TERMINATION (BUSY) | RECEPTION | |

[Fig. 39]
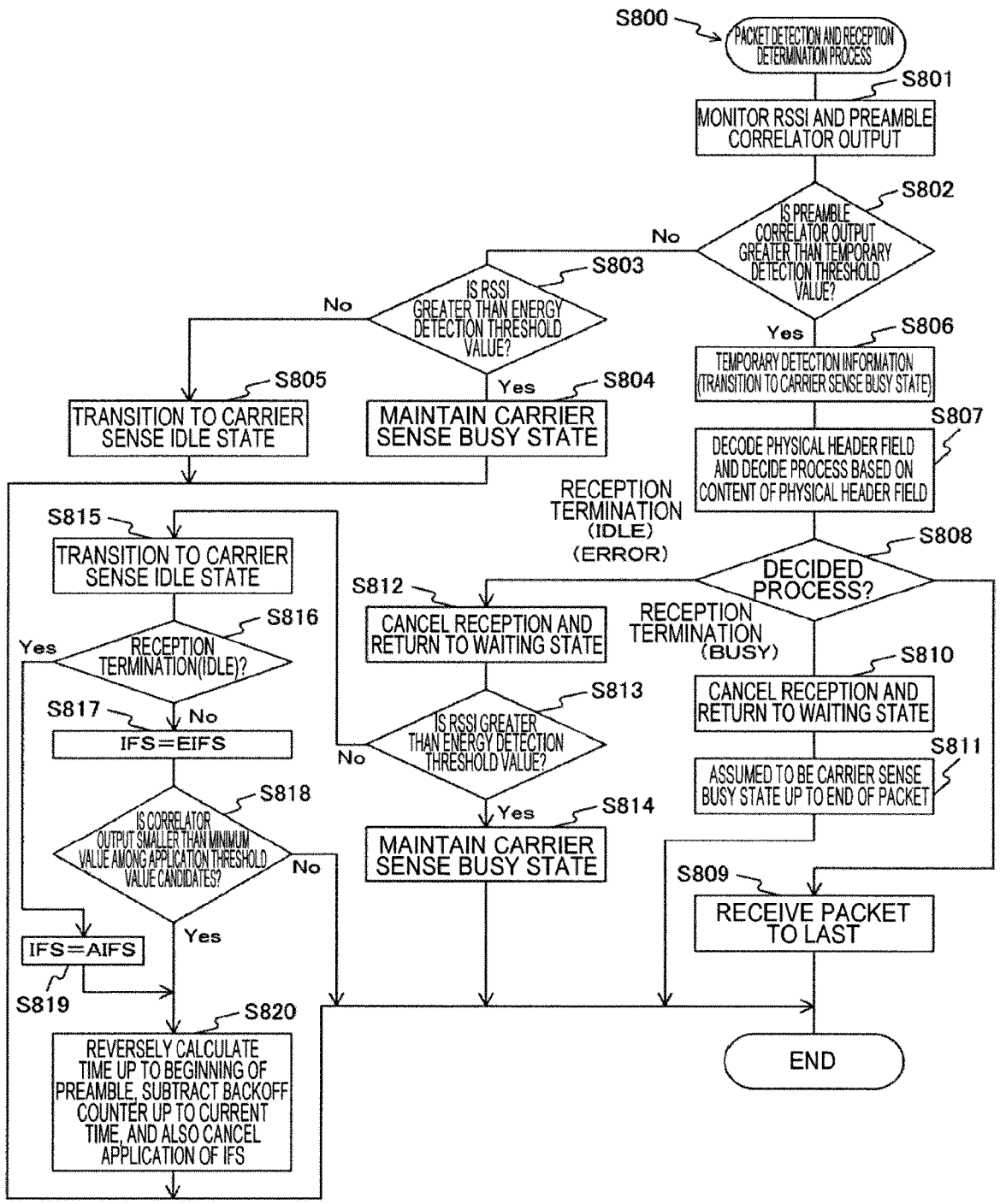

[Fig. 40]
EXAMPLE OF SHORT-DISTANCE PHYSICAL HEADER
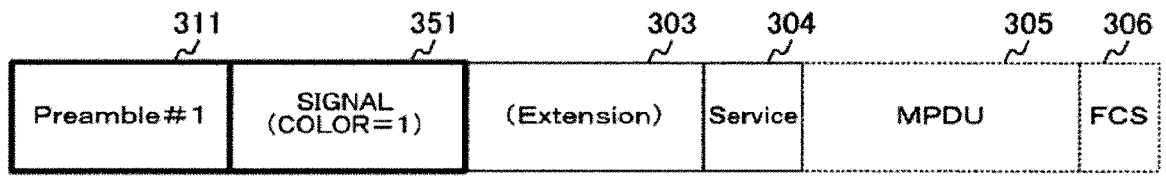
a
EXAMPLE OF LONG-DISTANCE PHYSICAL HEADER (INCLUDING LEGACY PHYSICAL HEADER)
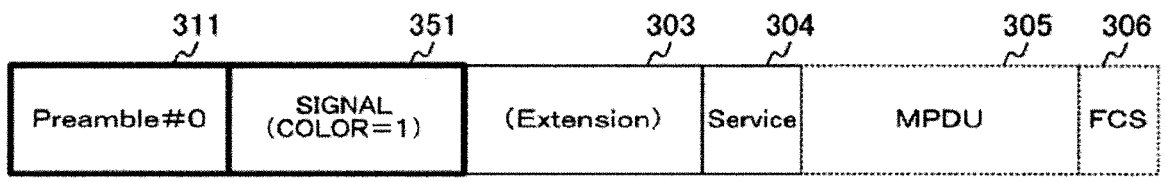
b
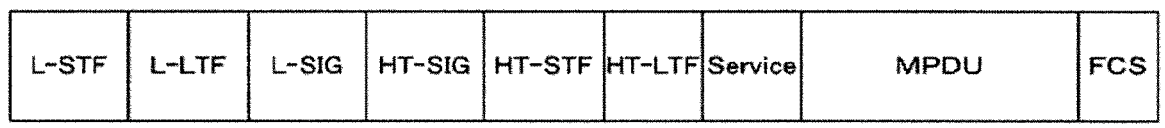
c

[Fig. 41]

PROCESS CLASSIFICATION TABLE

| NO ERROR IN CRC CALCULATION RESULT OF PHYSICAL HEADER | | | ERROR IN CRC CALCULATION RESULT OF PHYSICAL HEADER |
|---|---|---|---|
| COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| RECEPTION | RECEPTION TERMINATION (BUSY) | RECEPTION | RECEPTION TERMINATION (ERROR) ※IFS=EIFS |

[Fig. 42]
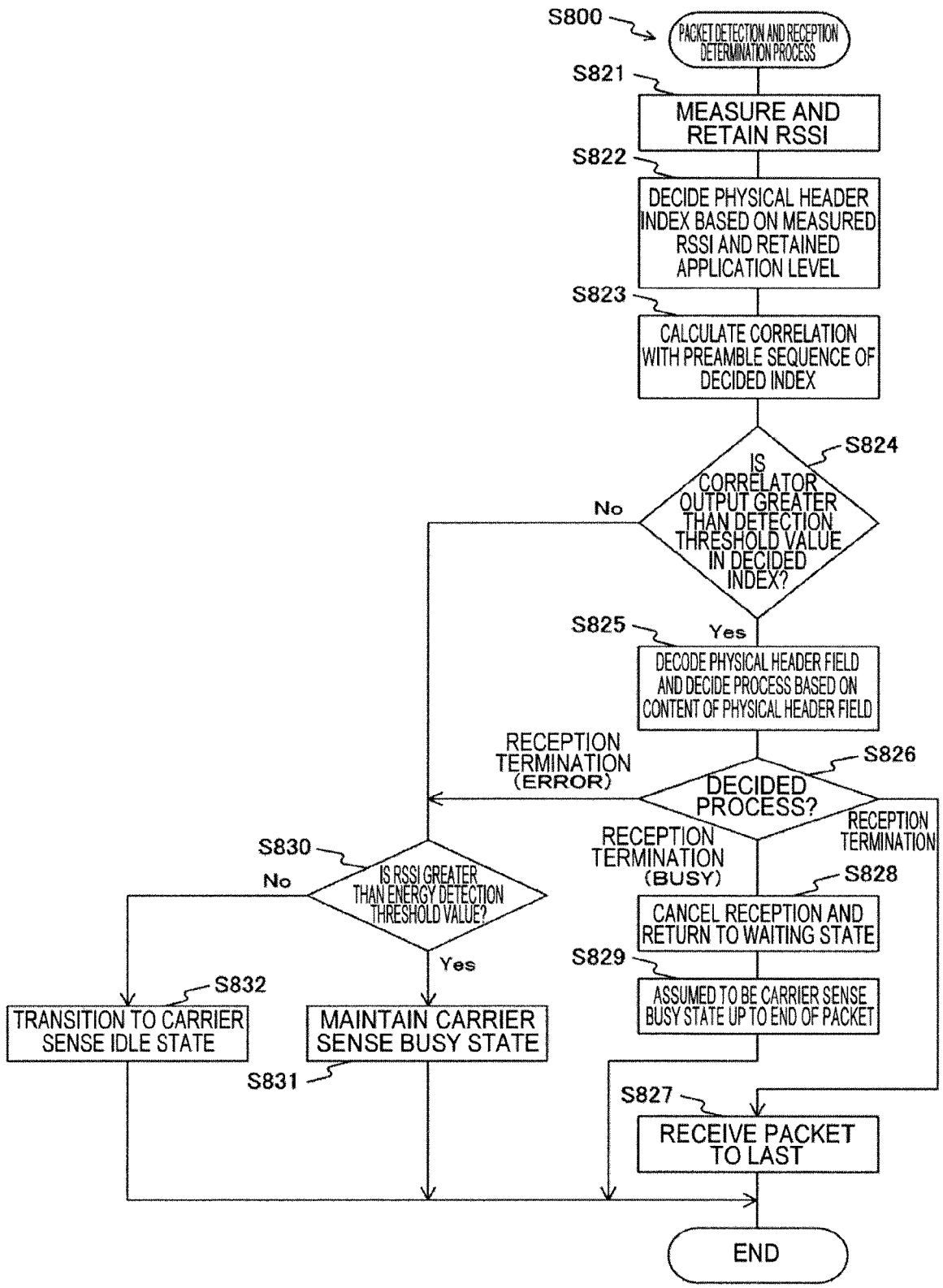

[Fig. 43]
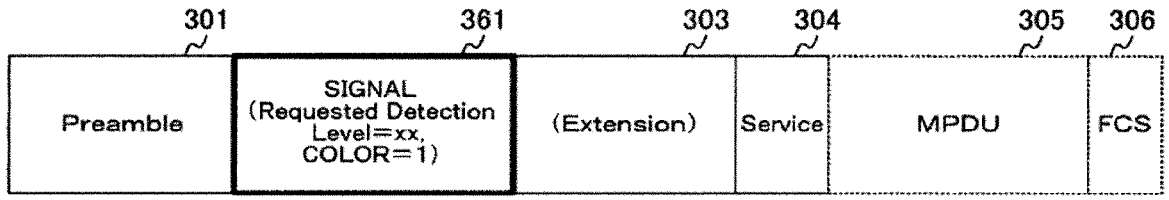
a
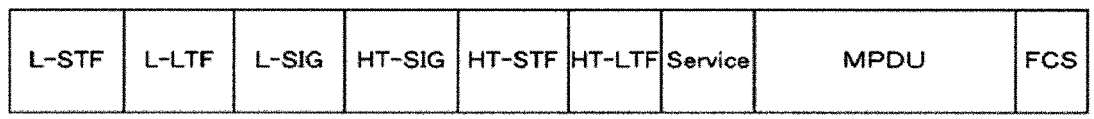
b
[Fig. 44]
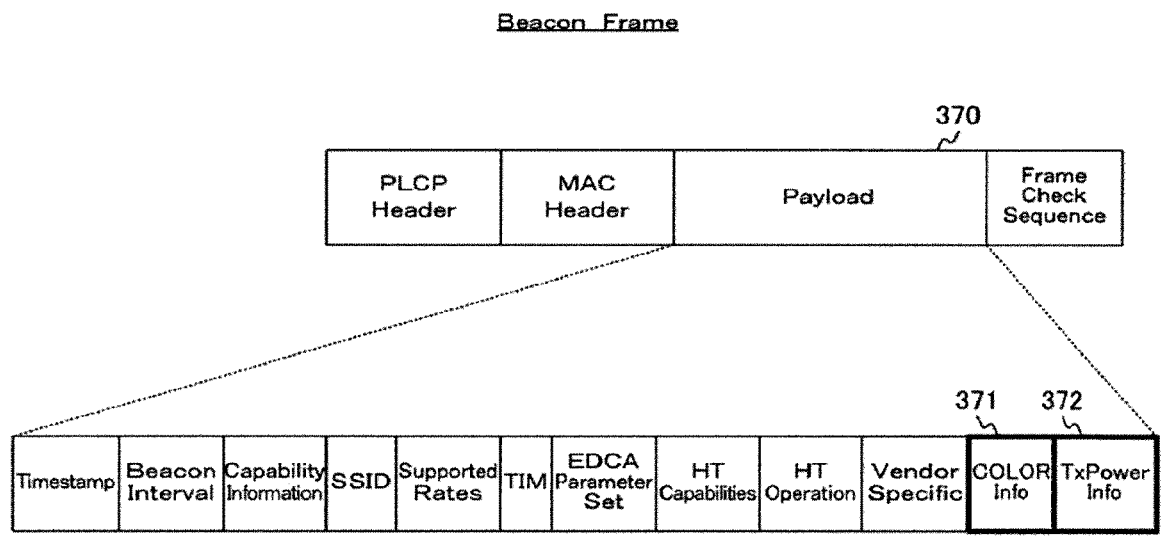

[Fig. 45]
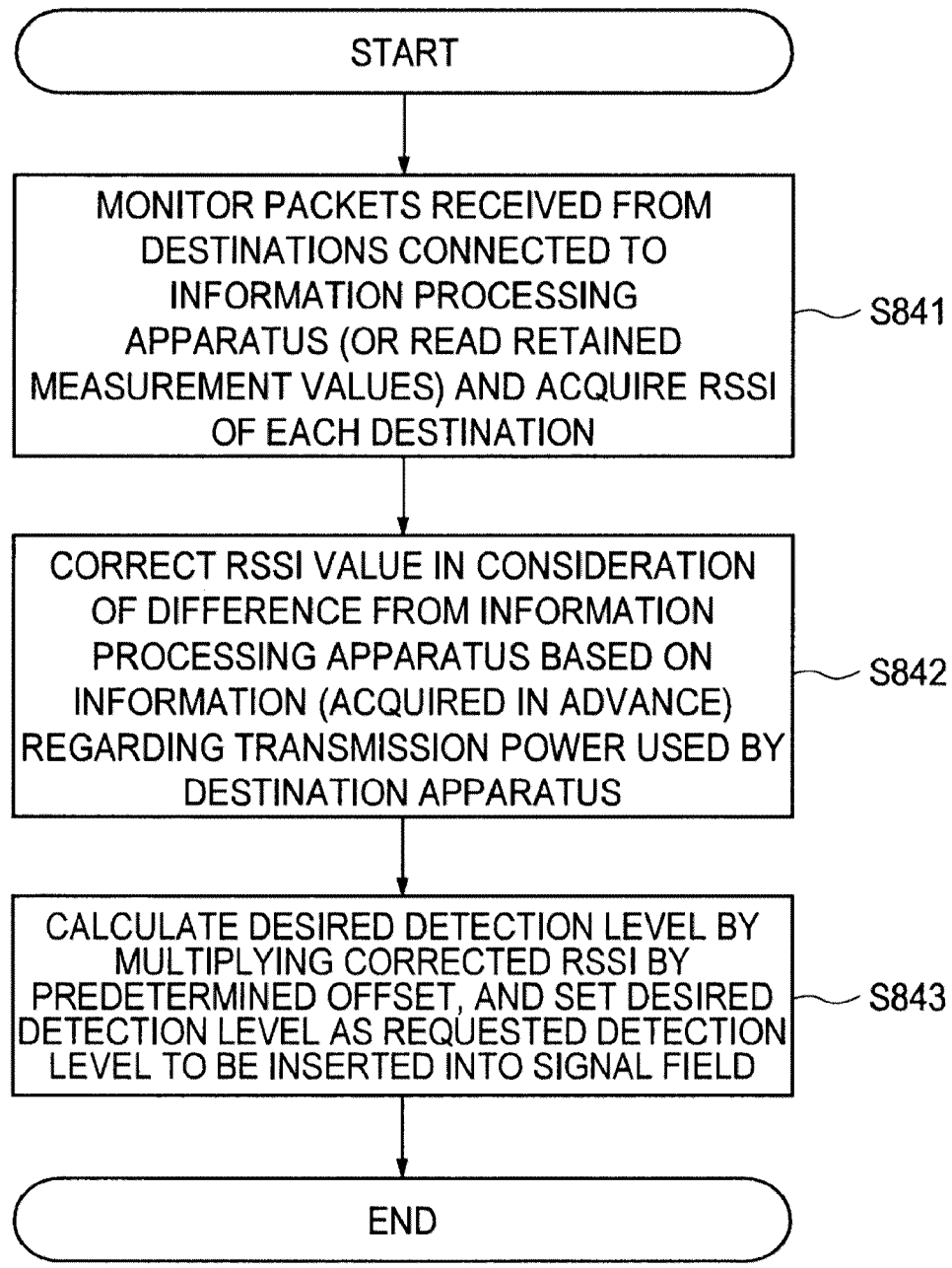

[Fig. 46]

PROCESS CLASSIFICATION TABLE

| | NO ERROR IN CRC CALCULATION RESULT OF PHYSICAL HEADER | | | ERROR IN CRC CALCULATION RESULT OF PHYSICAL HEADER |
|---|---|---|---|---|
| | COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| CORRELATOR OUTPUT INTENSITY IS LESS THAN Requested Detection Level IN PHYSICAL HEADER | RECEPTION | RECEPTION TERMINATION (IDLE) | RECEPTION TERMINATION (IDLE) | RECEPTION TERMINATION (ERROR) ※IFS=EIFS |
| CORRELATOR OUTPUT INTENSITY IS EQUAL TO OR GREATER THAN Requested Detection Level IN PHYSICAL HEADER | RECEPTION | RECEPTION TERMINATION (BUSY) | RECEPTION | |

[Fig. 47]
EXAMPLE OF PHYSICAL HEADER ACCORDING TO TWELFTH EMBODIMENT
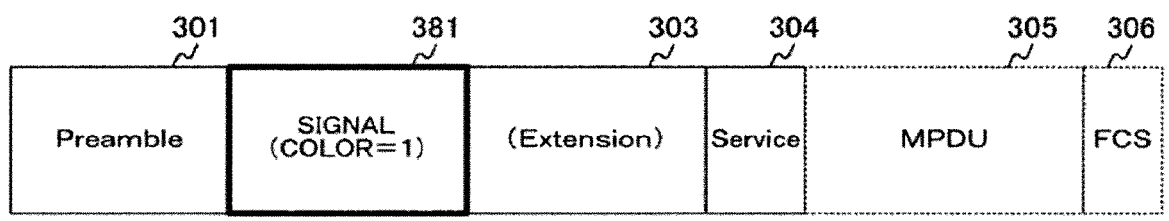
a
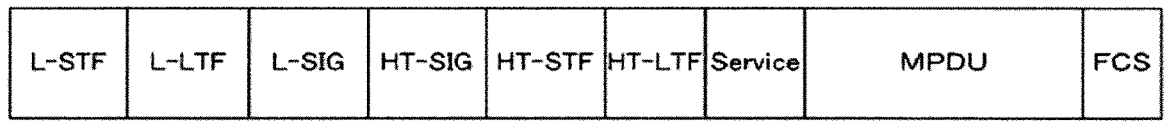
b

[Fig. 48]
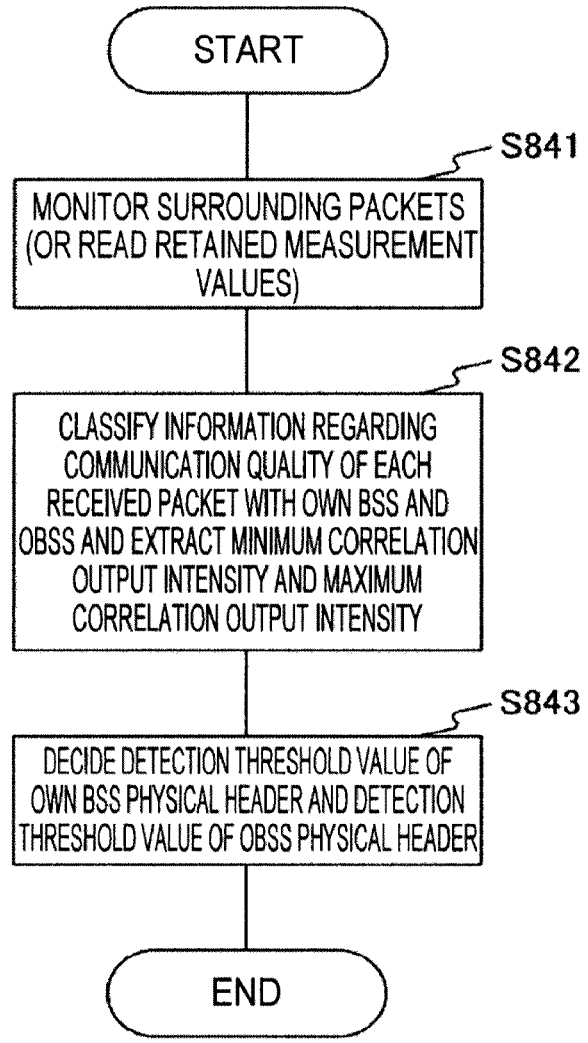

[Fig. 49]
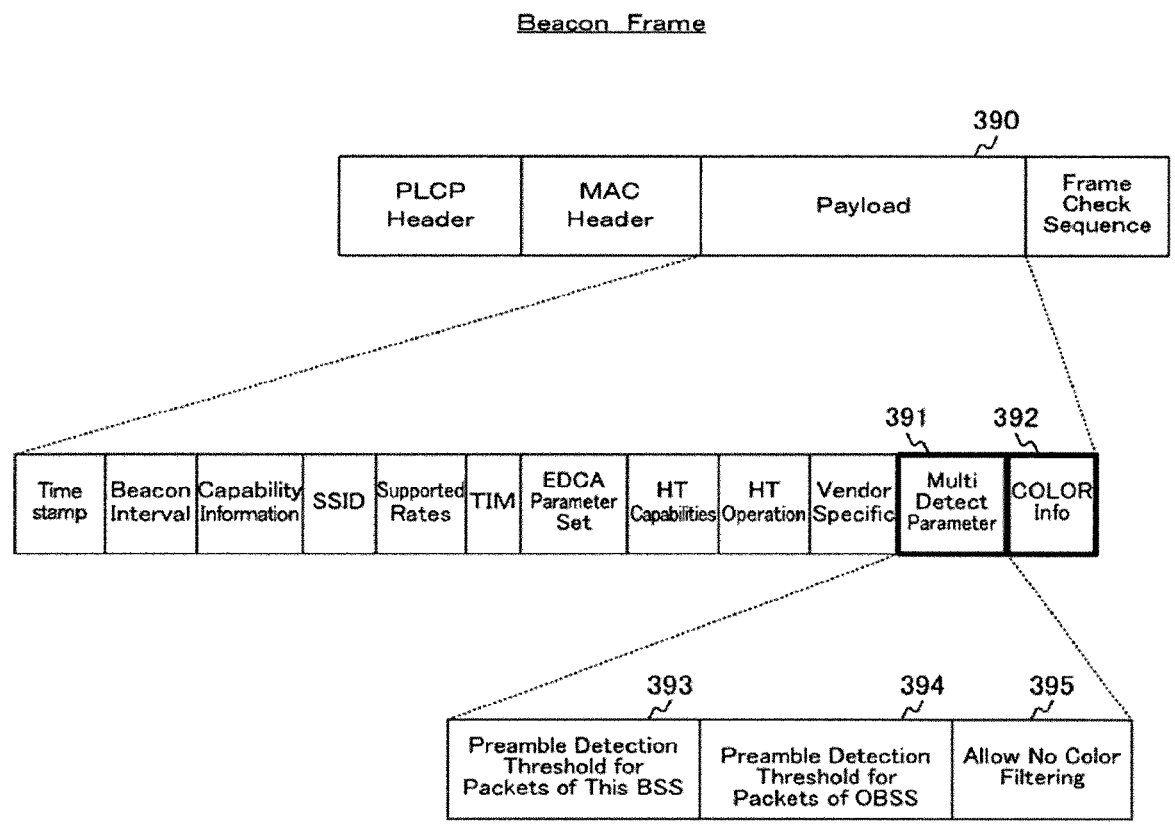

[Fig. 50]

PROCESS CLASSIFICATION TABLE

| | NO ERROR IN CRC CALCULATION RESULT OF PHYSICAL HEADER | | | ERROR IN CRC CALCULATION RESULT OF PHYSICAL HEADER |
|---|---|---|---|---|
| | COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| CORRELATOR OUTPUT INTENSITY IS LOW WITH REFERENCE TO DETECTION THRESHOLD VALUE CORRESPONDING TO OBSS PACKET | RECEPTION | RECEPTION TERMINATION (IDLE) | RECEIVED ONLY IN OTHER CASES OF RECEPTION TERMINATION (IDLE) WHEN RECEPTION TERMINATION IS PERMITTED INSIDE BBS | RECEPTION TERMINATION (ERROR) ※IFS=EIFS |
| CORRELATOR OUTPUT INTENSITY IS HIGH WITH REFERENCE TO DETECTION THRESHOLD VALUE CORRESPONDING TO OBSS PACKET | RECEPTION | REEPTION TERMINATION (BUSY) | RECEIVED ONLY IN OTHER CASES OF RECEPTION TERMINATION (BUSY) WHEN RECEPTION TERMINATION IS PERMITTED INSIDE BBS | |

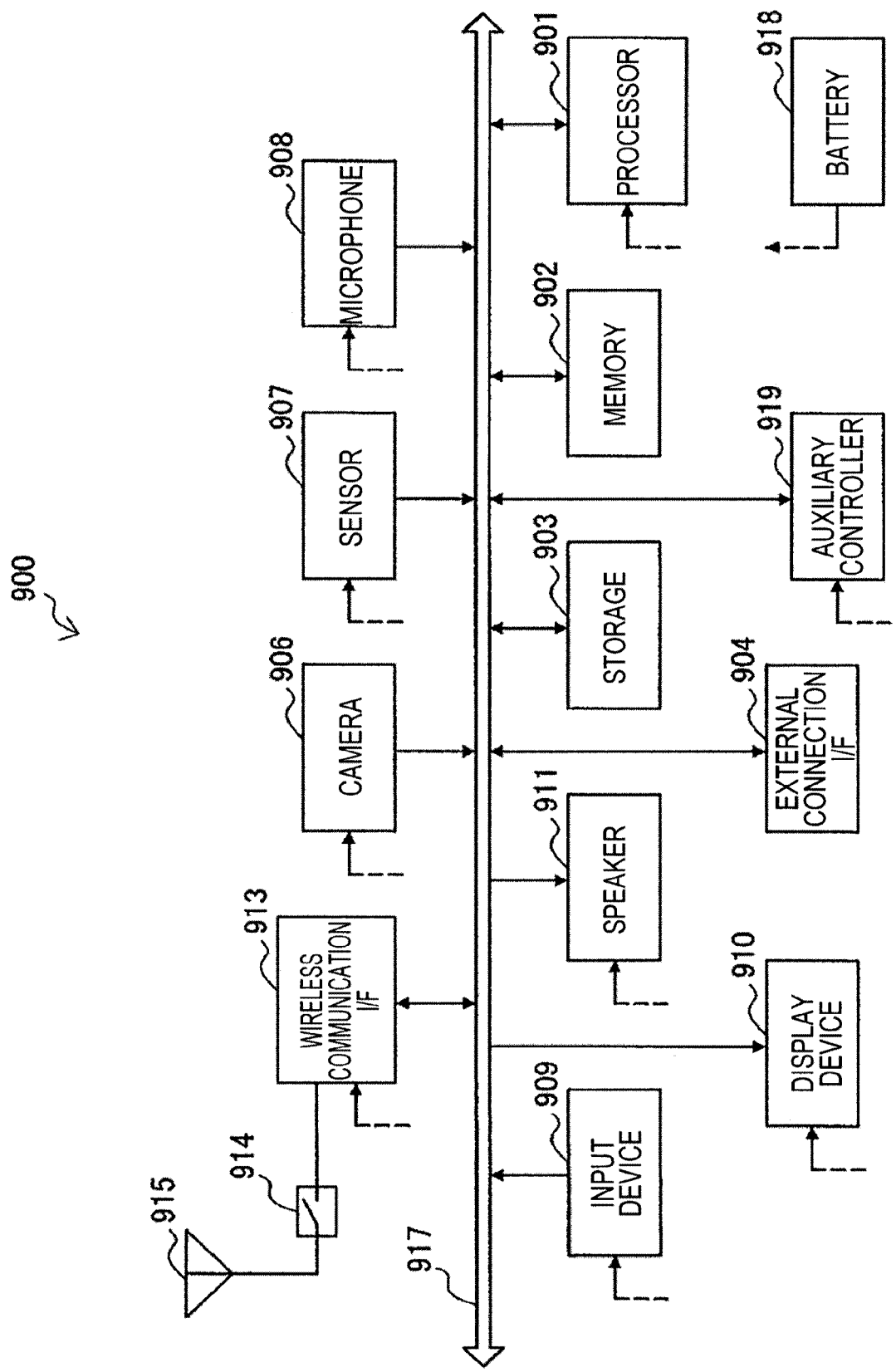
[Fig. 51]

[Fig. 52]
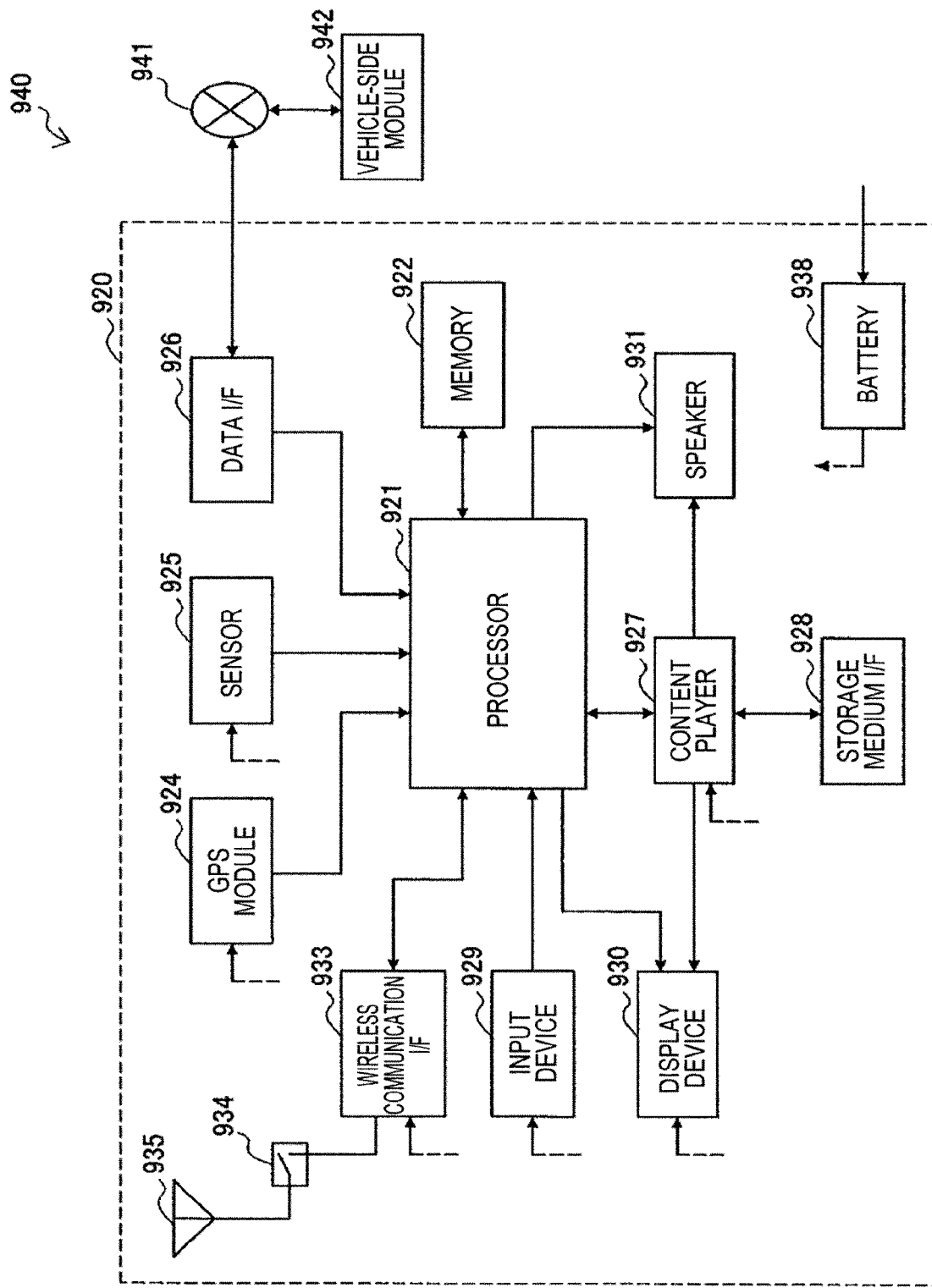

[Fig. 53]
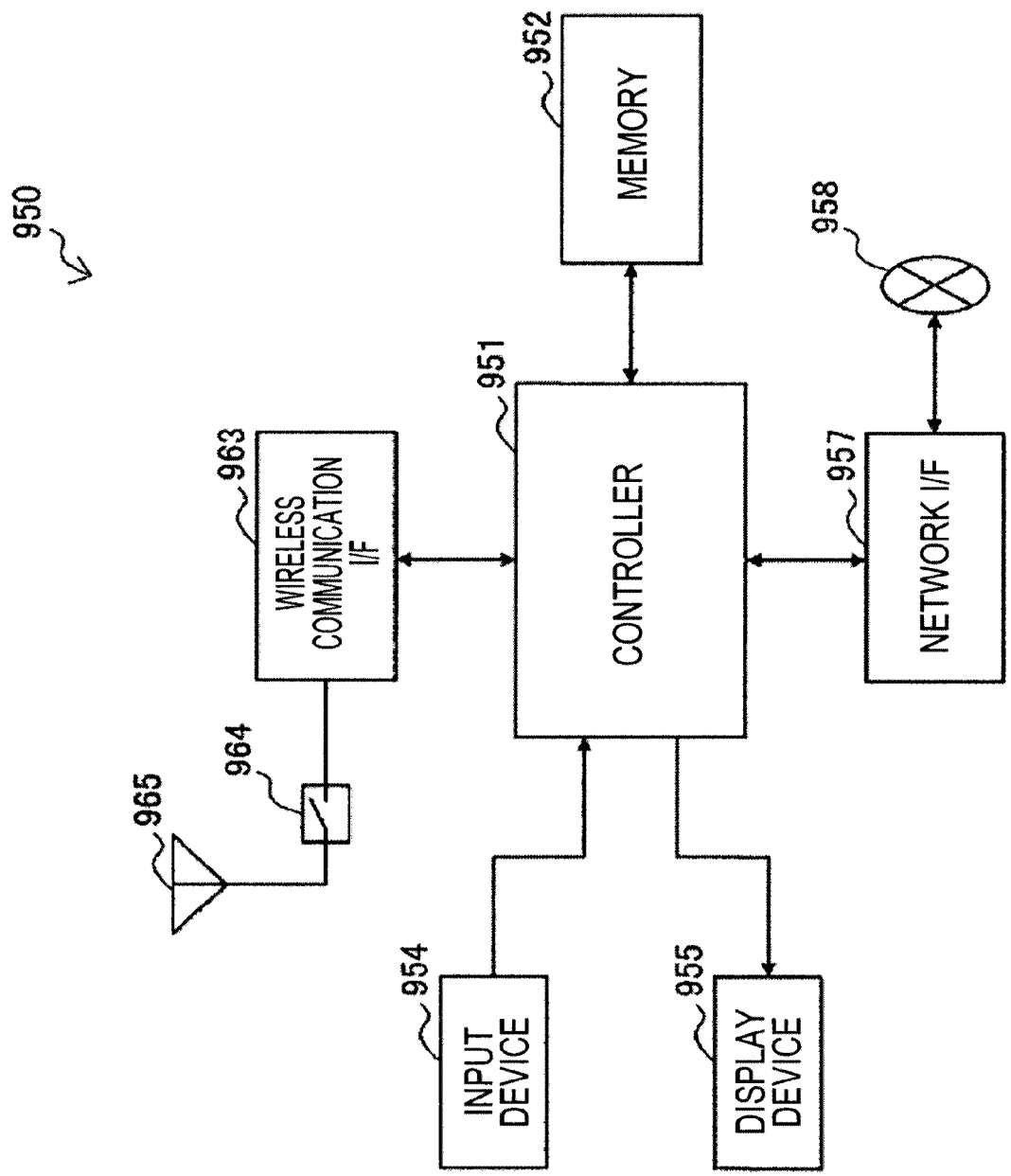

INFORMATION PROCESSING APPARATUS AND INFORMATION PROCESSING METHOD

CROSS REFERENCE TO RELATED APPLICATIONS

This application is a continuation of U.S. application Ser. No. 15/308,752, filed Nov. 3, 2016, which is a national stage entry of PCT/JP15/02922, filed Jun. 11, 2015, which claims the benefit of Japanese Priority Patent Application JP 2014-142949 filed Jul. 11, 2014, and Japanese Priority Patent Application JP 2015-002477 filed Jan. 8, 2015, the entire contents of each of which are incorporated herein by reference.

TECHNICAL FIELD

The present technology relates to an information processing apparatus, and specifically to, an information processing apparatus and an information processing method of exchanging information using wireless communication.

BACKGROUND ART

In the related art, there are wireless communication technologies for exchanging information using wireless communication. For example, communication methods (for example, autonomous distributed wireless networks) of performing mutual autonomous connection with nearby information processing apparatuses have been proposed. Using such communication methods, it is possible to exchange information between two information processing apparatuses using wireless communication even when the information processing apparatuses are not connected with a wired line.

In the autonomous distributed wireless networks, carrier sense is adopted as an arbitration method for avoiding packet collision at the time of communication between information processing apparatuses.

For example, a wireless communication apparatus that dynamically sets a carrier sense level threshold using desired wave power as a criterion to perform transmission suppression has been proposed (for example, see PTL 1).

CITATION LIST

Patent Literature

[PTL 1]
JP 2007-142722A

SUMMARY

In the above-described technology of the related art, even when a reception signal intensity is equal to or less than the carrier sense level threshold value and transmission is thus possible, the transmission may not avoid performing the transmission at the time of a ratio between the desired wave and interference power at which transmission error may occur.

However, when the number of information processing apparatuses forming a network increases, there is a concern that excessive transmission suppression may occur and transmission efficiency of the entire system may deteriorate.

Accordingly, it is important to maintain communication quality and efficiently use wireless resources.

It is desirable to effectively use wireless resources.

The present technology has been developed to solve the above problems. According to a first implementation of the present technology, there is provided an electronic device including: circuitry configured to perform control in a manner that a Physical Layer Convergence Protocol (PLCP) header format is selected from a plurality of PLCP header formats; and append the selected PLCP header to a physical layer packet for transmission.

According to the first implementation, there is provided a method including: selecting a Physical Layer Convergence Protocol (PLCP) header format from a plurality of PLCP header formats; and appending the selected PLCP header to a physical layer packet for transmission.

According to one or more of embodiments of the present technology, it is possible to obtain the good advantages in which wireless resources can be efficiently used. The advantages mentioned herein are not necessarily limited, but may be the advantages described in embodiments of the present disclosure.

BRIEF DESCRIPTION OF DRAWINGS

FIG. 1 is a diagram showing an example of a system configuration of a communication system 10 according to a first embodiment of the present technology.

FIG. 2 is a diagram showing an example of a system configuration of the communication system 10 according to the first embodiment of the present technology.

FIG. 3 is a diagram showing an example of a system configuration of the communication system 10 according to the first embodiment of the present technology.

FIG. 4 is a diagram showing an example of transmission and reception process chronologically performed by information processing apparatuses included in the communication system 10 according to the first embodiment of the present technology.

FIG. 5 is a block diagram showing an example of a functional configuration of an information processing apparatus 100 according to the first embodiment of the present technology.

FIG. 6 is a sequence chart showing an example of a communication process between apparatuses included in the communication system 10 according to the first embodiment of the present technology.

FIG. 7 is a diagram showing an example of the format of a PPDU exchanged between the apparatuses included in the communication system 10 according to the first embodiment of the present technology.

FIG. 8 is a sequence chart showing an example of a connection process between the apparatuses included in the communication system 10 according to the first embodiment of the present technology.

FIG. 9 is a diagram schematically showing an example of the content of a setting information list 161 stored in a memory of an information processing apparatus 200 according to the first embodiment of the present technology.

FIG. 10 is a flowchart showing an example of a processing procedure of a physical header parameter decision process by the information processing apparatus 200 according to the first embodiment of the present technology.

FIG. 11 is a diagram showing an example of the configuration of a correlator provided in the information processing apparatus 200 according to the first embodiment of the present technology.

FIG. 12 is a diagram showing an example of a system configuration of the communication system 10 according to the first embodiment of the present technology.

FIG. 13 is a diagram showing an example of the system configuration of the communication system 10 according to the first embodiment of the present technology.

FIG. 14 is a diagram showing an example of the format of a beacon frame exchanged between the apparatuses included in the communication system 10 according to the first embodiment of the present technology.

FIG. 15 is a sequence chart showing an example of a physical header parameter sharing process between the apparatuses included in the communication system 10 according to the first embodiment of the present technology.

FIG. 16 is a flowchart showing an example of a processing procedure of a use physical header decision process by the information processing apparatus 100 according to the first embodiment of the present technology.

FIG. 17 is a flowchart showing an example of a processing procedure of the transmission and reception process by the information processing apparatus 100 according to the first embodiment of the present technology.

FIG. 18 is a flowchart showing a packet detection determination process in the transmission and reception process by the information processing apparatus 100 according to the first embodiment of the present technology.

FIG. 19 is a flowchart showing an example of a processing procedure of a transmission and reception process by an information processing apparatus 100 according to a second embodiment of the present technology.

FIG. 20 is a diagram showing an example of a format of a PPDU exchanged between apparatuses included in a communication system 10 according to a third embodiment of the present technology.

FIG. 21 is a diagram showing an example of a format of a PPDU exchanged between apparatuses included in a communication system 10 according to a fourth embodiment of the present technology.

FIG. 22 is a flowchart showing a packet detection determination process in a transmission and reception process by an information processing apparatus 100 according to the fourth embodiment of the present technology.

FIG. 23 is a diagram showing an example of a format of a beacon frame exchanged between apparatuses included in a communication system 10 according to a fifth embodiment of the present technology.

FIG. 24 is a sequence chart showing an example of a connection process between the apparatuses included in the communication system 10 according to the fifth embodiment of the present technology.

FIG. 25 is a flowchart showing a packet detection determination process in a transmission and reception process by an information processing apparatus 100 according to the fifth embodiment of the present technology.

FIG. 26 is a flowchart showing a packet detection determination process in a transmission and reception process by an information processing apparatus 100 according to a sixth embodiment of the present technology.

FIG. 27 is a diagram showing an example of the configuration of a correlator provided in an information processing apparatus 100 according to a sixth embodiment of the present technology.

FIG. 28 is a diagram showing an example of a system configuration of a communication system 50 according to a seventh embodiment of the present technology.

FIG. 29 is a sequence chart showing an example of a communication process between apparatuses included in a communication system 50 according to a seventh embodiment of the present technology.

FIG. 30 is a sequence chart showing an example of a communication process between apparatuses included in a communication system 50 according to an eighth embodiment of the present technology.

FIG. 31 is a diagram showing an example of a format of a PPDU exchanged between apparatuses included in a communication system 10 according to a ninth embodiment of the present technology.

FIG. 32 is a diagram showing an example of a format of a beacon frame exchanged between apparatuses included in a communication system 10 according to the ninth embodiment of the present technology.

FIG. 33 is a diagram showing the flow of a backoff process in the IEEE 802.11 standard.

FIG. 34 is a diagram showing the flow of the backoff process by an information processing apparatus 100 according to the ninth embodiment of the present technology.

FIG. 35 is a diagram showing the flow of the backoff process by the information processing apparatus 100 according to the ninth embodiment of the present technology.

FIG. 36 is a flowchart showing an example of a processing procedure of a use physical header decision process by the information processing apparatus 100 according to the ninth embodiment of the present technology.

FIG. 37 is a flowchart showing an example of a processing procedure of a transmission and reception process by the information processing apparatus 100 according to the ninth embodiment of the present technology.

FIG. 38 is a diagram showing a relation example (process classification table) between a physical header and a process by the information processing apparatus 100 according to the ninth embodiment of the present technology.

FIG. 39 is a flowchart showing a packet detection and reception determination process in the transmission and reception process by the information processing apparatus 100 according to the ninth embodiment of the present technology.

FIG. 40 is a diagram showing an example of a format of a PPDU exchanged between apparatuses included in a communication system 10 according to a tenth embodiment of the present technology.

FIG. 41 is a diagram showing a relation example (process classification table) between a physical header and a process by an information processing apparatus 100 according to the tenth embodiment of the present technology.

FIG. 42 is a flowchart showing a packet detection and reception determination process in the transmission and reception process by the information processing apparatus 100 according to the tenth embodiment of the present technology.

FIG. 43 is a diagram showing an example of a format of a PPDU exchanged between apparatuses included in a communication system 10 according to an eleventh embodiment of the present technology.

FIG. 44 is a diagram showing an example of a format of a beacon frame exchanged between the apparatuses included in the communication system 10 according to the eleventh embodiment of the present technology.

FIG. 45 is a flowchart showing an example of a processing procedure of a use physical header decision process by an information processing apparatus 100 according to the eleventh embodiment of the present technology.

FIG. 46 is a diagram showing a relation example (process classification table) between a physical header and a process by an information processing apparatus 100 according to the eleventh embodiment of the present technology.

FIG. 47 is a diagram showing an example of the format of a PPDU exchanged between apparatuses included in a communication system 10 according to a twelfth embodiment of the present technology.

FIG. 48 is a flowchart showing an example of a processing procedure of a physical header parameter decision process by an information processing apparatus 200 according to the twelfth embodiment of the present technology.

FIG. 49 is a diagram showing an example of the format of a beacon frame exchanged between the apparatuses included in the communication system 10 according to the twelfth embodiment of the present technology.

FIG. 50 is a diagram showing a relation example (process classification table) between a physical header and a process performed by the information processing apparatus 100 according to the twelfth embodiment of the present technology.

FIG. 51 is a block diagram showing an example of a schematic configuration of a smartphone.

FIG. 52 is a block diagram showing an example of a schematic configuration of a car navigation device.

FIG. 53 is a block diagram showing an example of a schematic configuration of a wireless access point.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes for carrying out the present technology (hereinafter referred to as embodiments) will be described. The description will be made in the following order.

1. First embodiment (example in which Link Strength Category field is provided in SIGNAL field of IEEE 802.11 standard and packet detection condition is set according to information processing apparatus)

2. Second embodiment (example in which packet detection determination result is energy-only detection and no transmission is performed when transmission suppression is set)

3. Third embodiment (example in which Link Strength Category field is provided in Service field of IEEE 802.11 standard)

4. Fourth embodiment (example in which plurality of preamble sequences with different detection threshold values are used on transmission side and preamble correlation detector applied to RSSI is switched on reception side)

5. Fifth embodiment (example in which selection of physical header used by subordinate information processing apparatus is performed on master station side)

6. Sixth embodiment (example in which plurality of PLCP preambles for distinction are generated by processing some of original sequence rather than completely different sequence)

7. Seventh embodiment (example in which direct communication is performed between slave stations)

8. Eighth embodiment (example in which physical header parameters used in direct link are decided by slave station)

9. Ninth embodiment (example in which information regarding identifier of BSS is stored in SIGNAL field of IEEE 802.11 standard)

10. Tenth embodiment (example in which plurality of sequences of preambles are defined and COLOR information is used together)

11. Eleventh embodiment (example in which process of deciding physical header parameters is omitted)

12. Twelfth embodiment (example in which field storing information regarding identifier of BSS is provided in SIGNAL field of IEEE 802.11 standard)

13. Application examples

1. First Embodiment (Example of Configuration of Communication System)
Detailed Description of the Drawings FIG. 1 is a diagram showing an example of a system configuration of a communication system 10 according to a first embodiment of the present technology.

The communication system 10 is configured to include information processing apparatuses 100 to 103 and information processing apparatuses 200 and 201.

The information processing apparatuses 100 to 103 are, for example, portable information processing apparatuses having a wireless communication function. Here, the portable information processing apparatuses are, for example, information processing apparatuses such as smartphones, mobile phones, or tablet terminals. The information processing apparatuses 100 to 103 are assumed to have, for example, a communication function in conformity to the wireless Local Area Network (LAN) standard of Institute of Electrical and Electronic Engineers (IEEE) 802.11. As the wireless LAN, for example, Wireless Fidelity (Wi-Fi), Wi-Fi Direct, or Wi-Fi CERTIFIED Miracast specification (technical specification title: Wi-Fi Display) can be used. Wireless communication using another communication scheme may be performed.

The information processing apparatuses 200 and 201 are, for example, fixed information processing apparatuses having a wireless communication function. Here, the fixed information processing apparatuses are, for example, information processing apparatuses such as access points or base stations. The information processing apparatuses 200 and 201 are assumed to have a communication function in conformity to, for example, the wireless LAN standard of IEEE 802.11, as the information processing apparatuses 100 to 103. Wireless communication using another communication scheme may be performed.

The information processing apparatuses 200 and 201 are assumed to function as master stations and the information processing apparatuses 100 to 103 are assumed to function as slave stations. That is, in the first embodiment of the present technology, in a star topology configured by a master station and slave stations subordinate to the master station, a communication example between the master station and the slave stations will be described. In the first embodiment of the present technology, a communication example in which a destination of transmission of the subordinate slave stations is confined to the master station will be described.

The information processing apparatuses 100 and 102 and the information processing apparatuses 200 and 201 are assumed to have specific functions (specific functions described in embodiments of the present technology). On the other hand, the information processing apparatuses 101 and 103 are assumed to have no specific function. Thus, the information processing apparatuses having no specific function are referred to as legacy apparatuses. The specific functions will be described in the embodiments of the present technology. The legacy apparatus can be assumed to be an information processing apparatus having a communication function in conformity to a wireless LAN standard such as IEEE 802.11a, IEEE 802.11g, IEEE 802.11n, or IEEE 802.11ac.

In the first embodiment of the present technology, a communication example between the apparatuses when the information processing apparatuses 100 and 101 are connected and the information processing apparatuses 201 and 102 are connected will be described.

In FIG. 1, an example in which the communication system 10 is configured by the four slave stations (the information processing apparatuses 100 to 103) is shown, but the number of slave stations (information processing apparatuses) is not limited to four. That is, an embodiment of the present technology can also be applied to a communication system configured by three slave stations or five or more slave stations (information processing apparatuses).

In a relation between two information processing apparatuses performing communication, one of the information processing apparatuses may be set as a master station and the other information processing apparatus may be set as a slave station. Connection between two information processing apparatuses may be configured as connection for direct communication between slave stations.

Here, in an autonomous distributed wireless network, a scheme called carrier sense is generally adopted as an arbitration structure for avoiding packet collision. The carrier sense is a scheme of monitoring a surrounding wireless status during a definite period of time before the transmission and confirming whether another information processing apparatus performing transmission is present. When reception power equal to or greater than a threshold value is detected during the confirmation, a wireless state is determined to be a busy state, a transmission operation stops, and the transmission is not performed.

In regard to the carrier sense, there are two types of detection algorithms for preamble detection of performing detection through power comparison of a correlator output of a specific preamble and for energy detection of performing detection through power comparison of a received signal. In general, the two types of detection algorithms are used together. Hereinafter, the two types of detection algorithms will be described collectively with the carrier sense unless otherwise stated.

As described above, when the number of information processing apparatuses in a network increases, in the above-described carrier sense scheme, there is a concern that a situation in which excessive transmission suppression occurs and transmission efficiency of the entire system deteriorates may occur.

Herein, an example of a positional relation causing such a situation will be described with reference to FIG. 1. In FIG. 1, two master stations (the information processing apparatuses 200 and 201) and four slave stations (the information processing apparatuses 100 to 103) are present. In FIG. 1, it is assumed that the information processing apparatuses 100 and 101 are connected to the information processing apparatus 200, and the information processing apparatuses 102 and 103 are connected to the information processing apparatus 201 so that communication can be mutually performed. In FIG. 1, the connection relations between the apparatuses are schematically indicated by dotted lines.

In FIG. 1, the information processing apparatuses 100 to 103, 200, and 201 are assumed to be present in a positional relation in which transmission from all the information processing apparatuses can be detected mutually by the carrier sense.

Here, for example, a case in which the information processing apparatus 100 performs transmission to the information processing apparatus 200 and the information processing apparatus 102 performs transmission to the information processing apparatus 201 will be assumed.

(Example of Carrier Sense Detection Range)

FIGS. 2 and 3 are diagrams showing an example of a system configuration of the communication system 10 according to the first embodiment of the present technology. In FIGS. 2 and 3, an example in which the carrier sense detection ranges of the information processing apparatuses overlap each other in the example shown in FIG. 1 is shown.

In FIGS. 2 and 3, carrier sense detection ranges 11 to 16 of the information processing apparatuses 100, 102, 200, and 201 are schematically indicated by dotted circles.

Specifically, in FIGS. 2 and 3, the carrier sense detection range 11 refers to the carrier sense detection range of the information processing apparatus 200 and the carrier sense detection range 12 refers to the carrier sense detection range of the information processing apparatus 201.

In FIG. 2, the carrier sense detection range 13 refers to the carrier sense detection range of the information processing apparatus 100 and the carrier sense detection range 14 refers to the carrier sense detection range of the information processing apparatus 102.

In FIG. 3, the carrier sense detection range 15 refers to the carrier sense detection range of the information processing apparatus 100 after the carrier sense detection range 13 shown in FIG. 2 is changed. The carrier sense detection range 16 refers to the carrier sense detection range of the information processing apparatus 102 after the carrier sense detection range 14 shown in FIG. 2 is changed.

As described above, the carrier sense is an example of the arbitration structure for avoiding packet collision and is configured to perform transmission suppression depending on whether another information processing apparatus performing transmission is present. The carrier sense detection range is decided in correspondence to a threshold value used at the time of detection of a transmitted signal from another information processing apparatus.

Here, for example, a case in which the information processing apparatus 100 performs the carrier sense to perform transmission while the information processing apparatus 102 performs transmission to the information processing apparatus 201 is assumed. For example, when the information processing apparatus 100 detects the transmission of the information processing apparatus 102, the transmission is suppressed. Thus, the information processing apparatus 100 may not perform transmission until the transmission of the information processing apparatus 102 ends.

However, even when the information processing apparatus 100 performs transmission to the information processing apparatus 200 during the transmission of the information processing apparatus 102, the information processing apparatuses 200 and 201 which are reception sides can also perform reception depending on a ratio between a desired wave and an interference wave. The desired wave is a radio wave from the information processing apparatus 100 to the information processing apparatus 200 and is a radio wave from the information processing apparatus 102 to the information processing apparatus 201. The interference wave is a radio wave from the information processing apparatus 100 to the information processing apparatus 201 and is a radio wave from the information processing apparatus 102 to the information processing apparatus 200.

For example, as shown in FIG. 1, when the distance between the information processing apparatuses 102 and 200 is greater than the distance between the information processing apparatuses 100 and 200, a reception probability is assumed to be higher. Thus, when collision avoidance is ensured and an improvement is potentially achieved, it is important to improve efficiency of a carrier sense mechanism suppressing transmission.

For example, as shown in FIG. 3, a case in which the carrier sense detection threshold values of the information processing apparatuses 100 and 102 are changed and set to be higher to the extent that the transmitted radio waves may not detected mutually is assumed. In this case, since the information processing apparatus 100 does not detect the transmission from the information processing apparatus 102, the information processing apparatuses 100 and 102 can each perform the transmission simultaneously and can each use wireless resources simultaneously.

However, when the information processing apparatuses which are the reception sides do not correctly wait transmission opportunities despite an increase in the transmission opportunities of the information processing apparatuses which are the transmission sides, a case in which the transmission may not succeed and gains are not obtained is also assumed. This example is shown in FIG. 4.

FIG. 4 is a diagram showing an example of transmission and reception process performed chronologically by the information processing apparatuses included in the communication system 10 according to the first embodiment of the present technology.

In FIG. 4, an example of a case in which the information processing apparatus 100 performs the transmission to the information processing apparatus 200 while the information processing apparatus 102 performs the transmission to the information processing apparatus 201 in the example shown in FIG. 1 is shown.

For example, as shown in FIG. 3, the information processing apparatus 102 is present within the carrier sense detection range 11 of the information processing apparatus 200. For this reason, when the information processing apparatus 200 first detects transmission (21) of the information processing apparatus 102 and starts reception of an interference side (22), the information processing apparatus 200 may not receive transmission (23) from the information processing apparatus 100 newly obtaining a transmission opportunity (22). Thus, even when a ratio of a signal wave to an interference wave is sufficiently high, there is a concern that reception may fail.

Accordingly, for example, increasing the carrier sense detection threshold value of the information processing apparatus 200 may be considered. However, the master station necessarily waits while subordinating a plurality of information processing apparatuses. Therefore, when the master station increases the carrier sense detection threshold values uniformly, there is a concern that communication to be received from the subordinate information processing apparatuses may not be appropriately detected. Therefore, cases in which the carrier sense detection threshold value is changed are preferably limited to, for example, a case in which the change in the carrier sense detection threshold value is actually necessary and a case in which an improvement is certain.

Accordingly, in an embodiment of the present technology, an example in which wireless resources are appropriately reused when an improvement is achieved while suppressing side effects occurring due to the increase in the carrier sense detection threshold value to a minimum will be described. In this case, a reception level of a packet transmitted or received from a third party is set as an observation target.

Specifically, in an embodiment of the present technology, an information processing apparatus which is a transmission side is configured to change the content of a Physical Layer Convergence Protocol (PLCP) header according to communication quality (for example, a propagation attenuation amount) with a destination. Further, an information processing apparatus which is a reception side is configured to change a packet detection threshold value to be applied using part of the received content of the PLCP header and detect only a desired packet.

Here, the PLCP means a protocol for encapsulating a MAC frame to transmit a portion to be necessarily received in common by modulation of a constant rate irrespective of a transmission rate and transmit a data portion following the portion in various methods depending on a device and a situation at that time.

For example, a PLCP preamble is used to detect a packet or estimate the gain of a propagation path. Further, the PLCP header is used to transmit information regarding modulation of a data portion, the length of a frame, or the like.

(Example of Configuration of Information Processing Apparatus)

FIG. 5 is a block diagram showing an example of a functional configuration of the information processing apparatus 100 according to the first embodiment of the present technology. Since the functional configurations (functional configurations relevant to wireless communication) of the information processing apparatuses 101 to 103, 200, and 201 are substantially the same as that of the information processing apparatus 100, the description thereof will be omitted here.

The information processing apparatus 100 includes a data processing unit 110, a transmission processing unit 120, a modulation and demodulation unit 130, a wireless interface unit 140, an antenna 141, a control unit 150, and a memory 160.

The data processing unit 110 processes various kinds of data under the control of the control unit 150. For example, the data processing unit 110 generates body texts such as various data frames and data packets. For example, when a transmission operation is performed, the data processing unit 110 generates various data frames and data packets in response to a request from a higher layer and supplies the data frames and data packets to the transmission processing unit 120. For example, when a reception operation is performed, the data processing unit 110 processes and analyzes the various data frames and data packets supplied from the transmission processing unit 120.

The transmission processing unit 120 performs various transmission processes under the control of the control unit 150. For example, when a transmission operation is performed, the transmission processing unit 120 performs a process, such as addition of an error detection code or addition of a header for media access control, on the packets generated by the data processing unit 110. For example, the transmission processing unit 120 performs a process, such as addition of a MAC header or addition of an error detection code for Media Access Control address (MAC), on the packets generated by the data processing unit 110. Then, the transmission processing unit 120 supplies the processed data to the modulation and demodulation unit 130.

When the carrier sense is used, the transmission processing unit 120 performs calculation of Network Allocation Vector (NAV) to be added. Here, as described above, the carrier sense is an example of the arbitration structure for avoiding packet collision and is a configured such that a transmission suppression time is described in the content of a wireless packet and transmission suppression is set in an information processing apparatus receiving the wireless packet. The NAV means the transmission suppression time.

For example, when a reception operation is performed, the transmission processing unit 120 performs a reverse process (for example, packet error detection or analysis and removal of the MAC header) to the process at the time of the transmission operation on a bit string supplied from the modulation and demodulation unit 130. Then, the transmission processing unit 120 supplies various data frames to the data processing unit 110 when it is confirmed that there is no error in the data frames based on the error detection code.

The transmission processing unit 120 performs a process of virtual carrier sense. In this case, when the NAV is set in the header of a received packet and the transmission suppression is applied, the transmission processing unit 120 notifies the control unit 150 that the transmission suppression is applied.

The modulation and demodulation unit 130 performs modulation and demodulation processes under the control of the control unit 150. For example, when a transmission operation is performed, the modulation and demodulation unit 130 performs encoding, interleaving, modulation, and addition of the PLCP header and the PLCP preamble on the bit string input from the transmission processing unit 120 based on coding and modulation schemes set by the control unit 150. Then, the modulation and demodulation unit 130 generates a data symbol string and supplies the data symbol string to the wireless interface unit 140.

For example, when a reception operation is performed, the modulation and demodulation unit 130 performs a reverse process to the process at the time of the transmission operation on the input from the wireless interface unit 140 and supplies the result to the transmission processing unit 120. The modulation and demodulation unit 130 performs the process of the carrier sense. In this case, when reception power equal to or greater than a threshold value is detected or a value of preamble correlation equal to or greater than a predetermined output is detected, the modulation and demodulation unit 130 determines that the wireless state is a busy state and notifies the control unit 150 that the wireless state is the busy state.

The wireless interface unit 140 is an interface that is connected to another information processing apparatus, and transmits and receives various kinds of information. For example, when a transmission operation is performed, the wireless interface unit 140 converts the input from the modulation and demodulation unit 130 into an analog signal, performs amplification, filtering, and frequency up-converting, and causes the antenna 141 to transmit the signal as a wireless signal. For example, when a reception operation is performed, the wireless interface unit 140 performs a reverse process to the process at the time of the transmission operation on an input from the antenna 141 and supplies the result to the modulation and demodulation unit 130.

The control unit 150 controls a reception operation and a transmission operation of each of the data processing unit 110, the transmission processing unit 120, the modulation and demodulation unit 130, and the wireless interface unit 140. For example, the control unit 150 performs delivery of information between the units, setting of communication parameters, and scheduling of packets in the transmission processing unit 120. For example, when the control unit 150 receives notification of the carrier sense result from the modulation and demodulation unit 130 or the transmission processing unit 120, the control unit 150 performs each process regarding setting of the transmission suppression or cancellation of the transmission suppression based on the notification.

For example, the control unit (corresponding to the control unit 150) of the information processing apparatus 200 performs control such that the physical header (for example, the PLCP preamble and the PLCP header) used for the packets transmitted by another information processing apparatus is transmitted to still another information processing apparatus using the wireless communication.

For example, the control unit 150 performs control such that one is selected from a plurality of physical header candidates (for example, the PLCP preamble and the PLCP header) and is used for the packet to be transmitted. Here, the plurality of physical header candidates corresponds to information regarding the plurality of physical headers (for example, the PLCP preamble and the PLCP header) transmitted from the information processing apparatus 200.

For example, the control unit of the information processing apparatus 200 performs control such that a packet detection condition (for example, each detection threshold value of the PLCP preamble) used by another information processing apparatus is transmitted to still another information processing apparatus using the wireless communication.

For example, the control unit 150 performs control such that one of a plurality of packet detection conditions (for example, each detection threshold value of the PLCP preamble) is selected and used for a plurality of packets transmitted from the information processing apparatus 200 using the wireless communication. Here, the plurality of packet detection conditions correspond to the plurality of packet detection conditions transmitted from the information processing apparatus 200.

For example, the control unit 150 performs control such that one of a plurality of reception operations is selected and performed on the plurality of packets transmitted from the information processing apparatus 200 using the wireless communication. The plurality of reception operations will be described in the first to eleventh embodiments of the present technology.

The memory 160 has a role serving as a work region of data processing by the control unit 150 and a function serving as a storage medium retaining various kinds of data. For example, a storage medium such as a non-volatile memory, a magnetic disk, an optical disc, a magneto optical (MO) disc can be used as the memory 160. For example, an Electronically Erasable Programmable Read-Only Memory (EEPROM) or an Erasable Programmable ROM (EPROM) can be used as the non-volatile memory. For example, a hard disk or a disk-type magnetic disk can be used as a magnetic disk. For example, a compact disc (CD), a digital versatile disc decodable (DVD-R), or a Blu-Ray disc (BD: registered trademark) can be used as an optical disc.

In each embodiment of the present technology, an example in which each transmission succeeds when uplink transmission from the information processing apparatus 100 to the information processing apparatus 200 and uplink transmission from the information processing apparatus 102 to the information processing apparatus 201 are performed simultaneously (or approximately simultaneously) will be described. An embodiment of the present technology can also be applied to transmission between information processing apparatuses other than such transmission.

(Communication Example)

FIG. 6 is a sequence chart showing an example of a communication process between the apparatuses included in the communication system 10 according to the first embodiment of the present technology.

In FIG. 6, an example of the communication process when the uplink transmission from the information processing apparatus 100 to the information processing apparatus 200 is performed is shown. The same also applies to a relation between other information processing apparatuses (for example, the information processing apparatuses 102 and 201).

First, a connection process between the information processing apparatuses 100 and 200 is performed (401). The connection process will be described in detail with reference to FIG. 8.

Subsequently, the information processing apparatus 200 performs a physical header parameter decision process (402). The physical header parameter decision process will be described in detail with reference to FIG. 10.

Subsequently, a physical header parameter sharing process between the information processing apparatuses 100 and 200 is performed (403). That is, a process of sharing physical header parameters decided in the physical header parameter decision process between the information processing apparatuses 100 and 200 is performed (403).

Subsequently, the information processing apparatus 200 performs the transmission and reception process (405).

The information processing apparatus 100 performs a use physical header decision process (404). The use physical header decision process will be described in detail with reference to FIG. 16. Subsequently, the information processing apparatus 100 performs transmission and reception process (406).

(Example of Format of Presentation-Layer Protocol Data Unit (PPDU))

FIG. 7 is a diagram showing an example of the format of a PPDU exchanged between the apparatuses included in the communication system 10 according to the first embodiment of the present technology.

The PPDU is configured to include a preamble 301, SIGNAL 302, Extension 303, Service 304, MAC Protocol Data Unit (MPDU) 305, and Frame Check Sequence (FCS) 306.

The preamble 301 indicates portions corresponding to IEEE 802.11 Legacy Short Training Field (L-STF) and Legacy Long Training Field (L-LTF) shown in c of FIG. 7. The preamble 301 is assumed to have a format compatible with the portions.

SIGNAL 302 indicates IEEE 802.11 Legacy SIGNAL (L-SIG) and High Throughput SIGNAL (HT-SIG) fields shown in c of FIG. 7. Further, c of FIG. 7 indicates HT Mixed Mode Format of IEEE 802.11n as an example. HT-SIG may be substituted with a Very High Throughput SIGNAL-A (VHT-SIG-A) field in IEEE 802.11ac and may be substituted with a High Efficiency SIGNAL (HE-SIG) field in IEEE 802.11ax.

Depending on a format, additional fields (HT-STF, HT-LTF, VHT-STF, VHT-LTF, and VHT-SIG-B) can also be added thereafter.

Here, in the first embodiment of the present technology, a "Link Strength Category field" is newly prepared in a part of the field of the SIGNAL 302 which is a PLCP header portion in the physical header. That is, the "Link Strength Category field" is newly provided in a portion reserved in the SIGNAL 302 of the PLCP header portion. Each of the information processing apparatuses (except for the legacy apparatuses) changes the "Link Strength Category field" according to the quality of a link with a destination at the time of transmission.

An example in which 1 is stored in the "Link Strength Category field" is shown in a of FIG. 7. An example in which 0 is stored in the "Link Strength Category field" is shown in b of FIG. 7. The examples in which the value (0 or 1) of two steps is stored in the "Link Strength Category field" in this way are shown in a and b of FIG. 7, but a value of three or more steps may be stored.

In this way, in the first embodiment of the present technology, the portion in which the "Link Strength Category field" is reserved in SIGNAL 302 is provided. Thus, a specific function according to the first embodiment of the present technology can be realized without disturbing reception of the legacy apparatus.

In the first embodiment of the present technology, a physical header of the Link Strength Category field=0 is referred to as a "long-distance physical header." Further, a physical header of the Link Strength Category field=1 is referred to as a "short-distance physical header." The physical header transmitted from the legacy apparatus is assumed to be treated as a "long-distance physical header."

The information processing apparatus (except for the legacy apparatus) receiving a packet having the Link Strength Category field changes a detection threshold value to be applied according to the content (0 or 1) of the Link Strength Category field.

(Example of Connection Process)

FIG. 8 is a sequence chart showing an example of the connection process between the apparatuses included in the communication system 10 according to the first embodiment of the present technology.

In FIG. 8, a process example until connection between the information processing apparatuses 100 and 200 is established is shown. The same also applies to a relation between the information processing apparatuses 102 and 201.

At a time point at which connection is attempted, the quality of a link between the information processing apparatuses 100 and 200 is not yet known. Therefore, to make the connection reliably, the information processing apparatus 100 uses the same preamble detection threshold value and physical header as the legacy apparatus without adjusting the threshold value.

That is, the information processing apparatus 100 sets the same preamble detection threshold value as the value of a legacy operation (an operation of the legacy apparatus) (411). The information processing apparatus 100 sets the physical header so that the physical header has the same format as the legacy operation (an operation of the legacy apparatus) (412).

The information processing apparatus 200 sets the physical header to have the same format as the legacy operation (the operation of the legacy apparatus) (413).

Subsequently, scanning is performed (414), authentication is performed (415), association is performed (416), and 4-way handshake is performed (417).

In this way, when the connection is established, the control unit of the information processing apparatus 200 generates a list (setting information list) of setting information used by each information processing apparatus (for example, the information processing apparatus (subordinate terminal) connected to the information processing apparatus 200). The setting information list is a list in which each detection threshold value of the physical header used by each information processing apparatus and an application level (application condition) of the physical header are combined. The setting information list will be described in detail with reference to FIG. 9.

In an embodiment of the present technology, a set of the detection threshold value of the physical header and the application level of the physical header is referred to as physical header parameters.

The information processing apparatus 200 updates the content of information generated in advance in the respective information included in the setting information list.

(Example of Content of Setting Information List)

FIG. 9 is a diagram schematically showing an example of the content of a setting information list 161 stored in a memory (corresponding to the memory 160 shown in FIG. 5) of the information processing apparatus 200 according to the first embodiment of the present technology.

The setting information list 161 is stored in association with an index 162, a detection threshold value 163, and an application level 164.

In the index 162, a value (0 or 1) indicating far or near is stored.

In the detection threshold value 163, the detection threshold value of the physical header decided through the physical header parameter decision process is stored. The physical header parameter decision process will be described with reference to FIG. 10.

In the application level 164, an application level of the physical header decided through the physical header parameter decision process is stored.

(Example of Operation of Physical Header Parameter Decision Process)

FIG. 10 is a flowchart showing an example of a processing procedure of a physical header parameter decision process by the information processing apparatus 200 according to the first embodiment of the present technology.

First, the control unit of the information processing apparatus 200 temporarily decides the physical header parameters used by the subordinate terminals and the information processing apparatus in an own Basic Service Set (BSS). The control unit of the information processing apparatus 200 temporarily decides a detection threshold value PD_near of the short-distance physical header and a detection threshold value PD_far of the long-distance physical header.

Here, for the detection threshold value PD_far of the long-distance physical header, there is no physical header of the application condition under the long-distance physical header. Therefore, a legacy apparatus setting value PD_default is temporarily set as the detection threshold value.

The legacy apparatus setting value PD_default is a value indicating a reference level of the preamble detection used by the legacy apparatus. In the IEEE 802.11 standard, a value of −82 dBm per the bandwidth of 20 MHz is referred to as a criterion value. A value other than −82 dBm may be used as the legacy apparatus setting value PD_default.

Subsequently, the control unit of the information processing apparatus 200 decides application levels L_near and L_far of the physical headers based on the detection threshold value PD_near of the short-distance physical header and the detection threshold value PD_far of the long-distance physical header. Specifically, the control unit of the information processing apparatus 200 decides the application levels L_near and L_far of the physical headers so that the following expressions 1 and 2 are satisfied. Here, expressions 1 and 2 are descriptions on the assumption of calculation of logarithm (dB).

[Math. 1]

Here, the application levels L_near and L_far of the physical headers are threshold values for selecting the physical headers (the long-distance physical header and the short-distance physical header) to be used based on the communication quality with a destination apparatus. For example, when the information processing apparatus 100 performs transmission, the application levels L_near and L_far of the physical headers are used as the threshold values at the time of selection of the physical headers to be used based on the communication quality with a destination apparatus.

In expression 1, O_near is a margin offset amount in regard to a preamble detection error due to a variation in a reception level. For example, a value in the range of about 10 dBm to about 20 dBm can be used as O_near. A value other than the value in the range of about 10 dBm to about 20 dBm may be used as O_near.

As indicated in expression 2, L_far is set to be infinitesimal since there is no physical header of the application condition under this application level.

Subsequently, the control unit of the information processing apparatus 200 monitors packets (step S701). The control unit of the information processing apparatus 200 acquires the communication quality with each of the subordinate information processing apparatuses in the own BSS and acquires each piece of information regarding the communication quality of the packets from other BSS (OBSS) (step S701).

Here, an example in which a correlation output intensity of the PLCP preamble is used as an index of the communication quality will be described. The correlation output intensity is not a correlator output in which power is normalized, but is assumed to represent an absolute level obtained by multiplying the correlator output by a reception signal power intensity (Received Signal Strength Indicator (RSSI)). That is, the correlation output intensity means a correlator output corrected in antenna input conversion. When a reception history is present in a relatively close time, a record of the correlation output intensity at that time may be appropriated. At the time of the monitoring, the detection threshold value may be lowered temporarily so that sample can be collected more reliably.

A relation between the RSSI and the correlation output intensity (Correlator Output Level (COL)) can be expressed simply by the following expression.

Correlation output intensity COL=RSSI×normalized correlator output

An example of the configuration of the correlator is shown in FIG. 11.

(Example of Configuration of Correlator)

FIG. 11 is a diagram showing an example of the configuration of a correlator provided in the information processing apparatus 200 according to the first embodiment of the present technology. In FIG. 11, an example of the configuration of a general correlator serving as a reference is shown. Here, an operator of (*) shown in FIG. 11 indicates complex conjugate calculation.

Here, for the correlator, in general, there are broadly two configurations according to characteristics of a preamble. For example, there are two configurations, a configuration of autocorrelation detection in which a signal with certain periodicity is generally detected and a configuration of cross-correlation detection in which correlation with a regular pattern is detected. An example of the configuration of the autocorrelation detection is shown in a of FIG. 11 and an example of the configuration of cross-correlation detection is shown in b of FIG. 11.

In FIG. 10, the control unit of the information processing apparatus 200 classifies the information regarding the communication quality according to the "Link Strength Category field" in the physical header used at the time of the reception (step S702).

For example, the control unit of the information processing apparatus 200 sets the minimum correlation output intensity to COL_self_far in the packets in which a BSS identifier (BSSID) is the own BSS, the physical header is the long-distance physical header, and an error does not occur.

The control unit of the information processing apparatus 200 sets the maximum correlation output intensity to COL_other_near in the packets in which a BSS identifier (BSSID) is the other BSS, the physical header is the short-distance physical header, and an error does not occur.

The control unit of the information processing apparatus 200 sets the maximum correlation output intensity to COL_other_far in the packets in which a BSS identifier (BSSID) is the other BSS, the physical header is the long-distance physical header, and an error does not occur. Further, COL in which there is no packet sample of the corresponding condition is assumed to be replaced with PD_default.

Subsequently, the control unit of the information processing apparatus 200 decides the detection threshold value PD_near of the short-distance physical header and the detection threshold value PD_far of the long-distance physical header (step S703). That is, the control unit of the information processing apparatus 200 corrects the temporarily decided detection threshold value PD_near of the short-distance physical header and the temporarily decided detection threshold value PD_far of the long-distance physical header so that relations of expression 3 to expression 5 are satisfied (step S703).

PD_near>COL_other_near

PD_far<COL_self_far

PD_far>COL_other_far

When there is no PD_far for which expression 4 and expression 5 is compatible, PD_far is decided by prioritizing establishment of expression 4.

When the detection threshold values are decided (updated), the control unit of the information processing apparatus 200 corrects the application levels L_near and L_far of the physical headers based on the above-described expression 1 and expression 2 (step S703).

In this way, the detection threshold value PD_near of the short-distance physical header, the detection threshold value PD_far of the long-distance physical header, and the application levels L_near and L_far of the physical headers are decided. The control unit of the information processing apparatus 200 stores the values decided in this way in the setting information list 161 (shown in FIG. 9) and the control unit makes use of the values with reference to the subsequent values. Specifically, the control unit of the information processing apparatus 200 stores PD_far in the detection threshold value 163 corresponding to the index 162 "0" and stores L_far in the application level 164 corresponding to the index 162 "0." The control unit of the information processing apparatus 200 stores PD_near in the detection threshold value 163 corresponding to the index 162 "1" and stores L_near in the application level 164 corresponding to the index 162 "1."

Here, the monitoring of the surrounding packets and the updating of the set values described above may be performed periodically or may be performed aperiodically. For example, the monitoring and the updating may be performed periodically at intervals of a given time or may be performed whenever connection of a new subordinate terminal starts.

(Example of Carrier Sense Detection Range)

FIGS. 12 and 13 are diagrams showing an example of a system configuration of the communication system 10 according to the first embodiment of the present technology.

In FIGS. 12 and 13, an example of the carrier sense detection range of each information processing apparatus set based on the detection threshold value PD_near of the short-distance physical header and the detection threshold value PD_far of the long-distance physical header decided by the information processing apparatus 200 is shown.

In FIG. 12, carrier sense detection ranges 31 to 34 of the information processing apparatuses 100 and 102 are schematically indicated by dotted circles. In FIG. 13, carrier sense detection ranges 41 to 44 of the information processing apparatuses 200 and 201 are schematically indicated by dotted circles.

Specifically, in FIG. 12, the carrier sense detection range 31 indicates a carrier sense detection range of the information processing apparatus 100 set based on the detection threshold value PD_far of the long-distance physical header. The carrier sense detection range 33 indicates a carrier sense detection range of the information processing apparatus 100 set based on the detection threshold value PD_near of the short-distance physical header.

In FIG. 12, the carrier sense detection range 32 indicates a carrier sense detection range of the information processing apparatus 102 set based on the detection threshold value PD_far of the long-distance physical header. The carrier sense detection range 34 indicates a carrier sense detection range of the information processing apparatus 102 set based on the detection threshold value PD_near of the short-distance physical header.

In FIG. 13, the carrier sense detection range 41 indicates a carrier sense detection range of the information processing apparatus 200 set based on the detection threshold value PD_far of the long-distance physical header. The carrier sense detection range 43 indicates a carrier sense detection range of the information processing apparatus 200 set based on the detection threshold value PD_near of the short-distance physical header.

In FIG. 13, the carrier sense detection range 42 indicates a carrier sense detection range of the information processing apparatus 201 set based on the detection threshold value PD_far of the long-distance physical header. The carrier sense detection range 44 indicates a carrier sense detection range of the information processing apparatus 201 set based on the detection threshold value PD_near of the short-distance physical header.

The example of the classification of the two values of the short distance and the long distance has been described above, but classification of three or more values (N values) may be realized. For example, the detection threshold values of the physical headers are set to PD_0, PD_1, . . . , and PD_N in order from the detection threshold value of the long distance and the application levels of the PLCPs are set to L_0, L_1, . . . , and L_N. The offset amounts between the detection threshold values of the physical headers and the application levels of the physical headers are set to O_0, O_1, . . . , and O_N. In this case, the values are decided so that the following relations (expression 6 to expression 9) are satisfied. Here, expression 6 to expression 9 are descriptions on the assumption of calculation of logarithm (dB).
[Math. 2]

When there is no PD_0 for which expression 6 and expression 7 can be compatible even in the case of the classification of three or more values, PD_0 is decided by prioritizing establishment of expression 7.

(Example of Format of Beacon Frame)

FIG. 14 is a diagram showing an example of the format of a beacon frame exchanged between the apparatuses included in the communication system 10 according to the first embodiment of the present technology. Here, an example of the beacon frame transmitted from the information processing apparatus 200 to another information processing apparatus is shown.

In FIG. 14, an example in which an element "Multi Detect Parameter" 311 is newly added to Payload 310 is shown. In "Multi Detect Parameter" 311, an index (0 or 1) indicating far or near is stored in "PLCP Header Index" 313 and 316. The detection threshold value PD_far of the long-distance physical header and the detection threshold value PD_near of the short-distance physical header are stored in "Preamble Detection Threshold" 314 and 317. The application levels of the physical headers are stored in "Apply Level" 315 and 318.

Only generated combinations are provided as combinations of "PLCP Header Index," "Preamble Detection Threshold," and "Apply Level." For example, as shown in FIG. 9, a case in which two sets of information (two sets of index 162 "0" and "1") are stored in the setting information list 161 is assumed. In this case, only two sets are provided as combinations of "PLCP Header Index," "Preamble Detection Threshold," and "Apply Level."

Specifically, the control unit of the information processing apparatus 200 stores content of the setting information list 161 shown in FIG. 9 in the beacon frame and transmits the beacon frame. That is, the control unit of the information processing apparatus 200 stores each piece of information stored in association with the index 162 "0" in a first combination ("PLCP Header Index" 313 to "Apply Level" 315). The control unit of the information processing apparatus 200 stores each piece of information stored in association with the index 162 "1" in a subsequent combination ("PLCP Header Index" 316 to "Apply Level" 318).

The control unit of the information processing apparatus 200 transmits a beacon in which each piece of information indicated in "Multi Detect Parameter" 311 is stored to surrounding information processing apparatuses to make report. The control unit of the information processing apparatus 200 transmits information (for example, the packet detection threshold value (the detection threshold value 163 shown in FIG. 9) regarding the packet detection condition and a selection condition (the application level 164 shown in FIG. 9) for selecting the packet detection threshold value) to the surrounding information processing apparatuses to inform the surrounding information processing apparatuses of the information. The selection condition can be comprehended as a selection condition for selecting one candidate from a plurality of physical header candidates or a selection condition of the physical header corresponding to the packet detection condition.

(Example of Communication of Physical Header Parameter Sharing Process)

FIG. 15 is a sequence chart showing an example of the physical header parameter sharing process between the apparatuses included in the communication system 10 according to the first embodiment of the present technology.

In FIG. 15, an example of a sharing process in which the control unit 150 of the information processing apparatus 100 receives the beacon transmitted from the information processing apparatus 200 and shares the physical header parameters is shown. The same also applies to a case in which another information processing apparatus receives the beacon transmitted from the information processing apparatus 200. For example, the control unit of the information processing apparatus 200 can notify the subordinate terminals of the physical header parameters using the beacon frame shown in FIG. 14.

First, the control unit of the information processing apparatus 200 stores the set of the detection threshold value of each physical header, the application level of each physical header, and the index of each physical header in the beacon (421). Then, the control unit of the information processing apparatus 200 transmits the beacon to the subordinate information processing apparatuses (422 and 423).

When the beacon from the control unit of the information processing apparatus 200 is received (423), the control unit 150 of the information processing apparatus 100 acquires the content of "Multi Detect Parameter" 311 (shown in FIG. 14) included in the beacon and retains the content (424).

When the content of "Multi Detect Parameter" 311 included in a beacon subsequent to the beacon is changed, the control unit 150 of the information processing apparatus 100 adopts and retains new information after the change. That is, the old information is updated.

When the content of "Multi Detect Parameter" 311 is already acquired and retained, the control unit 150 of the information processing apparatus 100 updates the retained content based on the newly received beacon (424).

The example in which the control unit of the information processing apparatus 200 notifies each information processing apparatus of the physical header parameters using the beacon has been described in FIG. 15, but each information processing apparatus may be notified of the physical header parameters using a mechanism other than the beacon. For example, the control unit of the information processing apparatus 200 may set determination of the information processing apparatus or an information acquisition request from a subordinate terminal as a trigger and perform notification using a data frame or a management frame of unicast to the subordinate terminal as a trigger. In this case, the control unit 150 of the information processing apparatus 100 acquires and retains the content of "Multi Detect Parameter" included in the frame of unicast in the same way.

(Example of Operation of Use Physical Header Decision Process)

FIG. 16 is a flowchart showing an example of a processing procedure of a use physical header decision process (transmission physical header selection process) by the information processing apparatus 100 according to the first embodiment of the present technology.

First, the control unit 150 of the information processing apparatus 100 monitors the packets received from destinations connected to the information processing apparatus and acquires the RSSI for each destination (step S711). The RSSI (monitoring result) acquired in this way is set to RSSI_peer.

When measurement values of the packets received from the destinations connected with the information processing apparatus are retained, the control unit 150 of the information processing apparatus 100 may read the measurement values and acquire the RSSI of each destination (step S711).

Here, in the case of the information processing apparatus (for example, the information processing apparatus 100) connected to the master station (for example, the information processing apparatus 200), the destination is basically only the master station. In this case, the reception level of the previous beacon may be used as the monitoring result.

Subsequently, the control unit 150 of the information processing apparatus 100 compares the acquired RSSI_peer to the application level L_near of the physical header and decides the index of the physical header used for the transmission by the information processing apparatus based on the comparison result (step S712). Further, the application level L_near of the physical header includes the beacon transmitted from the information processing apparatus 200.

For example, when the acquired RSSI_peer is greater than the application level L_near of the physical header, the control unit 150 of the information processing apparatus 100 decides 1 (for a short distance) as the index of the physical header used for the transmission by the information processing apparatus (step S712). Conversely, when the acquired RSSI_peer is equal to or less than the application level L_near of the physical header, the control unit 150 of the information processing apparatus 100 decides 0 (for a long distance) as the index of the physical header used for the transmission by the information processing apparatus (step S712).

When the index of the physical header used for the transmission by the information processing apparatus is already decided and a new index is decided, the already decided index is updated to the new index (step S712).

In FIG. 16, the example in which the use physical header is decided based on the classification of the two values of the short distance and the long distance has been described above, but the use physical header may be decided based on classification of three or more values (N values). For example, the application levels of the PLCPs are set to L_0, L_1, . . . , and L_N in order from the value of the long distance. In this case, n satisfying the following relation expression (expression 10) is selected as the index of the physical header used for the transmission. Here, expression 10 is description on the assumption of calculation of logarithm (dB).

[Math. 3]

Here, "n=0 to N" is assumed.

In FIG. 16, the operation example of the slave station side in the case of the uplink transmission from the slave station side to the master station side has been described. However, in the case of downlink transmission, the same operation may be performed on the master station side.

In FIG. 16, the example in which the RSSI is used has been described. However, the correlation output intensity COL may be used instead of the RSSI.

(Example of Operation of Transmission and Reception Process)

FIG. 17 is a flowchart showing an example of a processing procedure of the transmission and reception process by the information processing apparatus 100 according to the first embodiment of the present technology. In FIG. 17, the information processing apparatus 100 has been described, but the same can also apply to another information processing apparatus (for example, the information processing apparatus 200). That is, the transmission and reception process is the same process on both of the master station side and the terminal side.

The control unit 150 of the information processing apparatus 100 performs a packet detection determination process for a time other than a time during transmission or during reception (step S730). The packet detection determination process will be described in detail with reference to FIG. 18.

Subsequently, the control unit 150 of the information processing apparatus 100 determines whether a determination result obtained through the packet detection determination process is "detection" (step S721). When the determination result obtained through the packet detection determination process is "detection" (step S721), the control unit 150 of the information processing apparatus 100 performs the reception process of continuing the reception without interruption (step S722). Then, the control unit 150 of the information processing apparatus 100 returns the state to a waiting state after the reception is completed. When the received packet is destined for the information processing apparatus and makes request for an instant response, the control unit 150 of the information processing apparatus 100 adds the physical header including the same "Link Strength Category" field as a target packet to transmit the "Link Strength Category" field. That is, a portion in which information regarding the detection threshold value in the SIGNAL field is stored is set to be the same and information decided by the information processing apparatus is stored in another portion (for example, Modulation and Coding Scheme (MCS), length).

When the determination result obtained through the packet detection determination process is not "detection" (step S721), the control unit 150 of the information processing apparatus 100 determines whether the determination result obtained through the packet detection determination process is "non-detection" (step S723). When the determination result obtained through the packet detection determination process is "non-detection" (step S723), the control unit 150 of the information processing apparatus 100 determines whether there is a packet to be transmitted (step S724).

When there is the packet to be transmitted, the control unit 150 of the information processing apparatus 100 determines whether the non-detection determination state continues for a time equal to or greater than a time of a backoff and a frame interval (Inter Frame Space (IFS)) defined in order of Carrier Sense Multiple Access with Collision Avoidance (CSMA/CA) (step S725).

When the non-detection determination state continues for a time equal to or greater than the time of the backoff and the IFS (step S725), the control unit 150 of the information processing apparatus 100 can perform the transmission, and thus perform the transmission process (step S726). In the transmission process, the control unit 150 of the information processing apparatus 100 transmits the packet using the physical header with the format of the PPDU shown in FIG. 7, for example, based on the index of the physical header decided through the transmission physical header decision process shown in FIG. 16.

Specifically, when 1 (for the short distance) is decided as the index through the transmission physical header decision process, the control unit 150 of the information processing apparatus 100 stores 1 in the "Link Strength Category field" and transmits the "Link Strength Category field" (step S726). Conversely, when 0 (for the long distance) is decided as the index through the transmission physical header decision process, the control unit 150 of the information processing apparatus 100 stores 0 in the "Link Strength Category field" and transmits the "Link Strength Category field" (step S726).

For example, the control unit 150 of the information processing apparatus 100 selects, as modulation to be used for a data portion, a modulation and channel coding scheme by which a destination apparatus can perform reception at a high probability according to a detection threshold value corresponding to the decided physical header and performs transmission using the selected modulation and channel coding scheme. For example, the control unit 150 of the information processing apparatus 100 may select a modulation and channel coding scheme (Modulation and Coding Scheme (MCS)) by which a destination apparatus can perform reception at a high probability according to a detection threshold value corresponding to the decided physical header and perform transmission. When there is no packet to be transmitted, the control unit returns the state to a waiting state.

When the determination result obtained through the packet detection determination process is not "non-detection" (the determination result is "energy-only detection") (step S723), the control unit 150 of the information processing apparatus 100 basically treats the wireless state as a busy state and suppress transmission from the information processing apparatus (step S727). Here, only when a packet destined for the information processing apparatus is received and a response is made immediately after the reception (step S728), the control unit 150 of the information processing apparatus 100 performs the transmission of its response packet (step S729).

FIG. 18 is a flowchart showing a packet detection determination process (the processing procedure of step S730 shown in FIG. 17) in the transmission and reception process by the information processing apparatus 100 according to the first embodiment of the present technology.

First, the control unit 150 of the information processing apparatus 100 performs RSSI measurement on a signal input via the antenna 141 and retains the RSSI requested through the measurement (step S731).

Subsequently, the control unit 150 of the information processing apparatus 100 performs correlation calculation of a preamble pattern and makes a request of correlator output (step S732). The correlator output means the above-described correlation output intensity COL. That is, the correlator output is not a normalized correlator output level, but is a correlator output converted by reflecting reception power.

Subsequently, the control unit 150 of the information processing apparatus 100 compares the value of the correlator output to a temporary detection threshold value and determines whether the value of the correlator output is greater than the temporary detection threshold value (step S733). Here, the temporary detection is detection performed to determine whether a SIGNAL field is read prior to the detection determination. The temporary detection threshold value is set to a value equal to or less than both of PD_near and PD_far described above. The temporary detection threshold value may be set to be PD_default described above.

When the value of the correlator output is greater than the temporary detection threshold value (step S733), the control unit 150 of the information processing apparatus 100 determines that the detection state is a temporary detection state (step S734). Subsequently, the control unit 150 of the information processing apparatus 100 reads the "Link Strength Category field" in the subsequent SIGNAL field in the physical header. As described above, information indicating the detection threshold value to be applied is stored in the "Link Strength Category field".

Here, the control unit 150 of the information processing apparatus 100 retains the content of "Preamble Detection Threshold" shared in the physical header parameter sharing process shown in FIG. 15. The control unit 150 of the information processing apparatus 100 decides the detection threshold value to be applied (application detection threshold value) based on the content of "Preamble Detection Threshold" and the content of the "Link Strength Category field" (step S735).

For example, when the Link Strength Category=0, the control unit 150 of the information processing apparatus 100 decides PD_far as the application detection threshold value. On the other hand, when the Link Strength Category=1, the control unit 150 of the information processing apparatus 100 decides PD_near as the application detection threshold value. Then, the control unit 150 of the information processing apparatus 100 uses the decided application detection threshold value (PD_far or PD_near) when the transmission and reception process is performed.

Subsequently, the control unit 150 of the information processing apparatus 100 compares the measured and stored RSSI to the decided application detection threshold value and determines whether the RSSI is greater than the application detection threshold value (PD_far or PD_near) (step S736). When the RSSI is greater than the application detection threshold value (step S736), the control unit 150 of the information processing apparatus 100 determines the packet detection determination result as "detection" (step S737).

Here, only when other conditions are satisfied, the packet detection determination result may be determined as "detection." For example, an error detection code which includes the "Link Strength Category field" as a target may be provided in a reserved field remaining in the SIGNAL field. Further, a condition in which legitimacy of the content of the "Link Strength Category field" has been confirmed by an error detection code included by setting the "Link Strength Category field" as a target may be set as an additional determination condition.

Here, an error detection code which includes the "Link Strength Category field" as a target may be inserted into a reserved field remaining in the Service field. Further, a condition in which legitimacy of the content of the "Link Strength Category field" has been confirmed by an error detection code included by setting the "Link Strength Category field" as a target may be set as an additional determination condition.

When the RSSI is equal to or less than the application detection threshold value (step S736), the control unit 150 of the information processing apparatus 100 stops the reception (step S738). Subsequently, the control unit 150 of the information processing apparatus 100 compares the RSSI to an energy detection threshold value ED and determines whether the RSSI is greater than the energy detection threshold value ED (step S739). Here, the energy detection threshold value ED can be set to be, for example, −62 dBm per bandwidth of 20 MHz.

When the RSSI is greater than the energy detection threshold value ED (step S739), the control unit 150 of the information processing apparatus 100 determines the packet detection determination result as "energy-only detection" (step S740).

When the RSSI is equal to or less than the energy detection threshold value ED (step S739), the control unit 150 of the information processing apparatus 100 determines the packet detection determination result as "non-detection" (step S741).

Each of the above-described comparison processes may be performed using the above-described correlation output intensity COL instead of the RSSI.

In the first embodiment of the present technology, the master station and the slave station can perform the transmission and reception simultaneously (or approximately simultaneously) so that the wireless resources can be reused.

For example, when the slave station (for example, the information processing apparatus 100) performs the transmission to the master station (for example, the information processing apparatus 200), a case in which the slave station (for example, the information processing apparatus 102) on the OBSS side starts transmission earlier than the transmission is assumed.

Even in this case, the control unit 150 of the information processing apparatus 100 determines the detection according to the physical header using the detection threshold value PD_near or PD_far of the physical header. For example, as shown in FIG. 12, the carrier sense detection ranges 31 and 33 of the information processing apparatus 100 are set. Thus, even while the information processing apparatus 102 performs the transmission, the control unit 150 of the information processing apparatus 100 can treat the signal as non-detection, and thus can perform the transmission to the information processing apparatus 200.

However, when the information processing apparatus 200 receives a signal transmitted by the information processing apparatus 102 earlier despite the fact that the information processing apparatus 100 can perform the transmission, the information processing apparatus 200 may not receive the signal transmitted from the information processing apparatus 100. Thus, in the first embodiment of the present technology, as shown in FIG. 13, the carrier sense detection ranges 41 and 43 of the information processing apparatus 200 are set. Thus, since the information processing apparatus 200 does not detect the transmission of the information processing apparatus 102, reception from the information processing apparatus 100 can be awaited.

Here, when the information processing apparatus 200 increases the detection threshold value uniformly, there is a concern that a packet from the information processing apparatus 101 may not be detected. Thus, since the transmission from the information processing apparatus 101 (the legacy apparatus) located at a long distance is detected by the long-distance physical header, the long-distance detection threshold value is applied. Thus, the information processing apparatus 200 can smoothly accept the reception from each information processing apparatus.

Here, when the IEEE 802.11 standard is assumed, a detection threshold value of the L-STF portion can be set as the "detection threshold value" in the first embodiment of the present technology. However, a detection threshold value of the L-LTF portion may be used instead of the detection threshold value of the L-STF portion or a detection threshold value common to both of the L-STF portion and the L-LTF portion may be used. Extension may be realized so that both of the L-STF portion and the L-LTF portion are designated as physical header parameters by independently changing the detection threshold values of the L-STF portion and the L-LTF portion.

The physical header parameters of the information processing apparatus may be decided based on capability which can be used by other information processing apparatuses.

2. Second Embodiment

In the first embodiment of the present technology, the example in which the transmission suppression is cancelled temporarily even when the packet detection determination result is "energy-only detection" and the transmission suppression is set has been described. That is, the example in which only when the packet destined for the information processing apparatus is received and the response immediately after the reception is requested despite the case in which the transmission suppression is set, the response packet is transmitted and the transmission suppression is thus cancelled temporarily has been described.

In a second embodiment of the present technology, an example in which no transmission is performed when a packet detection determination result is "energy-only detection" and transmission suppression is set will be described. The configurations of information processing apparatuses according to the second embodiment of the present technology are substantially the same as those of the information processing apparatuses 100 to 103, 200, and 201 shown in FIG. 1 and the like. Therefore, the same reference numerals as those according to the first embodiment of the present technology are given to common portions to those according to the first embodiment of the present technology, and the description thereof will be omitted partially.

Each process and each format according to the second embodiment of the present technology are also common portions to those according to the first embodiment of the present technology. Therefore, the same reference numerals as those according to the first embodiment of the present technology are given to common portions to those according to the first embodiment of the present technology, and the description thereof will be omitted partially.

(Example of Operation of Transmission and Reception Process)

FIG. 19 is a flowchart showing an example of a processing procedure of the transmission and reception process by the information processing apparatus 100 according to the second embodiment of the present technology. In FIG. 19, a part of the transmission and reception process shown in FIG. 17 is modified. Therefore, the same reference numerals as those in FIG. 17 are given to common portions to the transmission and reception process shown in FIG. 17 and the description thereof will be omitted partially.

When the determination result obtained through the packet detection determination process is "energy-only detection" (step S723), the control unit 150 of the information processing apparatus 100 basically treats the wireless state as a busy state and suppresses transmission from the information processing apparatus (step S727). When the wireless state is treated as the busy state in this way, all of the transmission is suppressed in the second embodiment of the present technology.

In this way, in the second embodiment of the present technology, all of the transmission is suppressed when the determination result obtained through the packet detection determination process is "energy-only detection." Thus, it is possible to further improve reliability of the operation of the transmission and reception process.

3. Third Embodiment

In the first embodiment of the present technology, the example in which the Link Strength Category field is provided in the SIGNAL field of the IEEE 802.11 standard has been described.

In a third embodiment of the present technology, an example in which the Link Strength Category field is provided in the Service field of the IEEE 802.11 standard will be described. The configurations of information processing apparatuses according to the third embodiment of the present technology are substantially the same as those of the information processing apparatuses 100 to 103, 200, and 201 shown in FIG. 1 and the like. Therefore, the same reference numerals as those according to the first embodiment of the present technology are given to common portions to those according to the first embodiment of the present technology, and the description thereof will be omitted partially.

Each process and each format according to the third embodiment of the present technology are also common portions to those according to the first embodiment of the present technology. Therefore, the same reference numerals as those according to the first embodiment of the present technology are given to common portions to those according to the first embodiment of the present technology, and the description thereof will be omitted partially.

(Example of Format of PPDU)

FIG. 20 is a diagram showing an example of the format of the PPDU exchanged between the apparatuses included in the communication system 10 according to the third embodiment of the present technology.

Here, the example shown in FIG. 20 is the same as the example shown in FIG. 7 except that the Link Strength Category field is provided in the Service field instead of being provided in the SIGNAL field. Therefore, the same reference numerals as those in FIG. 7 are given to common portions to those in FIG. 7, and the description thereof will be omitted partially.

The PPDU is configured to include a preamble 301, SIGNAL 307, Extension 303, Service 308, MPDU 305, and FCS 306.

Here, in the third embodiment of the present technology, the "Link Strength Category field" is newly provided in a part of the field of the Service 308 of the physical header. That is, the "Link Strength Category field" is newly provided in a portion treated to be reserved in the Service 308 of the physical header. Each of the information processing apparatuses (except for the legacy apparatuses) changes the "Link Strength Category field" according to the quality of a link with a destination at the time of transmission.

In this way, in the third embodiment of the present technology, the "Link Strength Category field" is provided in a portion treated to be reserved in the Service 308. Thus, as in the first embodiment of the present technology, a specific function can be realized without disturbing reception of the legacy apparatus.

(Example of Operation of Transmission and Reception Process)

By replacing the "SIGNAL field" with the "Service field" and performs the same process as the transmission and reception process shown in FIGS. 17 and 18 in the transmission and reception process (step S735) shown in FIG. 18, it is possible to realize the third embodiment of the present technology.

Here, an error detection code which includes the "Link Strength Category field" as a target may be inserted into a reserved field remaining in the Service field. Further, a condition in which legitimacy of the content of the "Link Strength Category field" has been confirmed by an error detection code which includes the "Link Strength Category field" as a target may be set as an additional determination condition.

In this way, in the third embodiment of the present technology, the Link Strength Category field is provided in the Service field of the IEEE 802.11 standard. Thus, further more information can be stored than in the first embodiment of the present technology. For example, even when the mode of the PLCP is set with multiple values, the information can be appropriately stored.

4. Fourth Embodiment

In the first to third embodiments of the present technology, the examples in which the detection threshold value of the PLCP is changed based on the content of the field of the physical header have been described.

In a fourth embodiment of the present technology, an example in which a plurality of preamble sequences with different detection threshold values is used on a transmission side and a preamble correlation detector applied by an RSSI is switched on a reception side will be described. Thus, the reception side can receive only desired packets. The configurations of information processing apparatuses according to the fourth embodiment of the present technology are substantially the same as those of the information processing apparatuses 100 to 103, 200, and 201 shown in FIG. 1 and the like. Therefore, the same reference numerals as those according to the first embodiment of the present technology are given to common portions to those according to the first embodiment of the present technology, and the description thereof will be omitted partially.

Each process and each format according to the fourth embodiment of the present technology are also common portions to those according to the first embodiment of the present technology. Therefore, the same reference numerals as those according to the first embodiment of the present technology are given to common portions to those according to the first embodiment of the present technology, and the description thereof will be omitted partially.

(Example of Format of PPDU)

FIG. 21 is a diagram showing an example of the format of the PPDU exchanged between the apparatuses included in the communication system 10 according to the fourth embodiment of the present technology.

Here, the example shown in FIG. 21 is the same as the example shown in FIG. 7 except that the plurality of preamble sequences are defined instead of providing the Link Strength Category field is provided in the SIGNAL field. Therefore, the same reference numerals as those in FIG. 7 are given to common portions to those in FIG. 7, and the description thereof will be omitted partially.

The PPDU is configured to include a preamble 311, SIGNAL 312, Extension 303, Service 304, MPDU 305, and FCS 306.

Here, in the fourth embodiment of the present technology, the plurality of sequences of preambles 311 are defined. For example, as shown in a of FIG. 21, a sequence called "Preamble #1" is defined in the preamble 311. As shown in b of FIG. 21, a sequence called "Preamble #0" is defined. Each of the information processing apparatuses (except for legacy apparatuses) changes a sequence to be used according to the quality of the link with a destination at the time of transmission. In FIG. 21, an example in which two types of preambles are prepared has been described, but three or more types of preambles may be prepared.

In the fourth embodiment of the present technology, a physical header using the sequence called "Preamble #0" in the preamble 311 is referred to as a "long-distance physical header." A physical header using the sequence called "Preamble #1" in the preamble 311 is referred to as a "short-distance physical header." The preamble sequence are generated by different rules and a mutual correlation therebetween is low. The preamble sequence #0 is assumed to be the same sequence as a preamble used by a legacy apparatus.

Each of the information processing apparatuses (except for the legacy apparatuses) receiving packets with such physical headers changes a correlator to be applied (and a threshold value to be detected and determined) according to the magnitude of the RSSI of the signal.

Here, when the IEEE 802.11 standard is assumed, a "different preamble" is assumed to mean that at least one of the L-STF and the L-LTF is different.

(Example of Operation of Transmission and Reception Process)

FIG. 22 is a flowchart showing a packet detection determination process (the processing procedure of step S730 shown in FIG. 17) in the transmission and reception process by the information processing apparatus 100 according to the fourth embodiment of the present technology.

First, the control unit 150 of the information processing apparatus 100 performs RSSI measurement on a signal input via the antenna 141 and retains the RSSI obtained through the measurement (step S751).

Subsequently, the control unit 150 of the information processing apparatus 100 compares the measured RSSI to the application levels (L_far and L_near) of the retained physical headers and decides the index of the physical header to be applied to the detection (step S752). For example, the index of the physical header to be applied to the detection can be decided as in the selection method of selecting the transmission physical header of the information processing apparatus.

For example, the control unit 150 of the information processing apparatus 100 compares the measured RSSI to the value of L_near. When the measured RSSI is greater than L_near, the control unit 150 of the information processing apparatus 100 decides 1 (for a short distance) as the index of the physical header used to detect the correlation of the information processing apparatus. When the measured RSSI is equal to or less than L_near, the control unit 150 of the information processing apparatus 100 decides 0 (for a long distance) as the index of the physical header used to detect the correlation of the information processing apparatus.

In the decision order, it is assumed that there is no difference in transmission power between the salve station and the master station. Here, even when there is a difference in the transmission power between the slave station and the master station and information regarding a difference in the transmission power is retained in advance, the determination can be performed based on information regarding the difference in the retained transmission power after appropriate correction is applied.

Subsequently, the control unit 150 of the information processing apparatus 100 performs correlation calculation of the physical header of the decided index using correlators corresponding to the preamble sequence generated by the different rules, as described above (step S753). Here, the correlator output means the correlation output intensity COL, as in the first embodiment of the present technology. That is, the correlator output is not a normalized correlator output level, but is a correlator output converted by reflecting reception power.

Subsequently, the control unit 150 of the information processing apparatus 100 compares the correlator output of the selected correlator to the detection threshold value of the physical header in the decided index and determines whether the value of the correlator output is greater than the detection threshold value (step S754).

When the value of the correlator output is greater than the detection threshold value (step S754), the control unit 150 of the information processing apparatus 100 determines a packet detection determination result as "detection" (step S755).

Conversely, when the value of the correlator output is equal to or less than the detection threshold value (step S754), the control unit 150 of the information processing apparatus 100 compares the measured RSSI to the energy detection threshold value ED (step S756). Then, the control unit 150 of the information processing apparatus 100 determines whether the RSSI is greater than the energy detection threshold value ED (step S756).

When the RSSI is greater than the energy detection threshold value ED (step S756), the control unit 150 of the information processing apparatus 100 determines the packet detection determination result as "energy-only detection" (step S757).

When the RSSI is equal to or less than the energy detection threshold value ED (step S756), the control unit 150 of the information processing apparatus 100 determines the packet detection determination result as "non-detection" (step S758).

Here, when the IEEE 802.11 standard is assumed, a detection threshold value of the L-STF portion can be set as the "detection threshold value" in the fourth embodiment of the present technology. However, a detection threshold value of the L-LTF portion may be used instead of the detection threshold value of the L-STF portion or a detection threshold value common to both of the L-STF portion and the L-LTF portion may be used. Extension may be realized so that both of the L-STF portion and the L-LTF portion are designated as physical header parameters by independently changing the detection threshold values of the L-STF portion and the L-LTF portion.

5. Fifth Embodiment

A fifth embodiment of the present technology is a modification example of the fourth embodiment of the present technology and describes an example in which a master station side selects a physical header to be used by a subordinate information processing apparatus. An example in which a reception side normally operates correlators of preamble sequence which are candidates in parallel.

The configurations of information processing apparatuses according to the fifth embodiment of the present technology are substantially the same as those of the information processing apparatuses 100 to 103, 200, and 201 shown in FIG. 1 and the like. Therefore, the same reference numerals as those according to the first to fourth embodiments of the present technology are given to common portions to those according to the first to fourth embodiments of the present technology, and the description thereof will be omitted partially.

Each process and each format according to the fifth embodiment of the present technology are also common portions to those according to the first to fourth embodiments of the present technology. Therefore, the same reference numerals as those according to the first to fourth embodiments of the present technology are given to common portions to those according to the first to fourth embodiments of the present technology, and the description thereof will be omitted partially.

(Example of Format of Beacon Frame)

FIG. 23 is a diagram showing an example of the format of a beacon frame exchanged between the apparatuses included in the communication system 10 according to the fifth embodiment of the present technology. Since FIG. 23 is a modification example of FIG. 14, the same reference numerals as those in FIG. 14 are given to common portions to those in FIG. 14, and the description thereof will be omitted partially.

In FIG. 23, an example in which elements called "Multi Detect Assignment" 321 along with "Multi Detect Parameter" 311 are newly added to Payload 320 is shown.

In "Multi Detect Assignment" 321, information for specifying the subordinate information processing apparatus is stored in "Association ID" 323 and 325. In FIG. 23, an example in which Association ID is stored as information for specifying the information processing apparatus is shown, but another information capable of specifying the information processing apparatus may be stored. For example, a MAC address may be stored.

The index (0 or 1) of the physical header used by the information processing apparatus is stored in "PLCP Header Index" 324 and 326. Such combinations are arrayed and stored in regard to all of the subordinate information processing apparatuses (except for the legacy apparatuses).

The control unit of the information processing apparatus 200 transmits a beacon in which information indicating each of "Multi Detect Parameter" 311 and "Multi Detect Assignment" 321 is stored to surrounding information processing apparatuses to make report.

(Example of Communication of Physical Header Parameter Sharing Process)

FIG. 24 is a sequence chart showing an example of a connection process between the apparatuses included in the communication system 10 according to the fifth embodiment of the present technology.

Since FIG. 24 is a modification example of FIG. 15, the description of common portions to those in FIG. 15 will be omitted partially. That is, in FIG. 24, an example in which the physical header parameters are included in the beacon to be transmitted and each of the subordinate information processing apparatuses also include information for designating the physical header used thereby in the beacon and transmits the beacon is shown.

First, the control unit of the information processing apparatus 200 stores a set of the detection threshold value of each physical header, the application level of each physical header, and the index of each physical header in "Multi Detect Parameter" 311 (shown in FIG. 23) of the beacon (431).

The control unit of the information processing apparatus 200 stores the set of information for designating the physical header used by each subordinate information processing apparatus in "Multi Detect Assignment" 321 (shown in FIG. 23) of the beacon (432).

Here, a case in which the content of the "Multi Detect Assignment" field is stored will be described. The control unit of the information processing apparatus 200 is assumed to confirm whether a generation function and a correlation detection function for the preamble sequence designated by capability of each subordinate information processing apparatus are supported, and then store only the corresponding preamble sequence. When the physical header used by each subordinate information processing apparatus corresponding to the specific function is selected, information regarding link quality between the master station and each of the subordinate slave stations is determined to be used. Therefore, a packet received from a destination connected to the information processing apparatus is monitored (or a retained measurement value is read) and the RSSI of each destination is acquired and used. The above-described correlation output intensity COL may be used instead of the RSSI.

Subsequently, the control unit of the information processing apparatus 200 transmits the beacon to the subordinate information processing apparatuses (433 and 434).

When the beacon from the information processing apparatus 200 is received (434), the control unit 150 of the information processing apparatus 100 acquires and retains content included in the beacon (435). That is, the control unit 150 of the information processing apparatus 100 acquires and retains the content of "Multi Detect Parameter" 311 and "Multi Detect Assignment" 321 (shown in FIG. 23) included in the beacon (435).

Then, the control unit 150 of the information processing apparatus 100 uses the corresponding physical header according to the index of the physical header designated with the beacon by the master station (the information processing apparatus 200). That is, the control unit 150 of the information processing apparatus 100 does not perform autonomous determination.

(Example of Operation of Transmission and Reception Process)

FIG. 25 is a flowchart showing a packet detection determination process (the processing procedure of step S730 shown in FIG. 17) in the transmission and reception process by the information processing apparatus 100 according to the fifth embodiment of the present technology.

In FIG. 25, an example in which each master station and each slave station corresponding to a specific function operate all of the correlators of the PLCP preamble supported by the information processing apparatus in parallel is shown.

First, the control unit 150 of the information processing apparatus 100 performs RSSI measurement on a signal input via the antenna 141 and retains the RSSI obtained through the measurement (step S761).

Subsequently, the control unit 150 of the information processing apparatus 100 inputs the input signal to each correlator and performs correlation calculation (step S762). That is, the control unit 150 of the information processing apparatus 100 calculates the correlation of the preambles simultaneously with the correlators (step S762).

Here, as each detection threshold value for determining the detection based on each correlator output, each physical header detection threshold value designated by the master station is used in the physical header parameter sharing process. Further, the correlator output means the correlation output intensity COL, as in the first embodiment of the present technology. That is, the correlator output is not a normalized correlator output level, but is a correlator output converted by reflecting reception power.

Subsequently, the control unit 150 of the information processing apparatus 100 determines whether one correlator output of any of the plurality correlators is greater or not than the corresponding detection threshold value (step S763).

When the correlator output of any of the plurality of correlators is greater than the corresponding detection threshold value (step S763), the control unit 150 of the information processing apparatus 100 determines a packet detection determination result as "detection" (step S764).

When the correlator outputs of all of the plurality of correlators are not greater than the corresponding detection threshold values (step S763), the control unit 150 of the information processing apparatus 100 compares the measured RSSI to the energy detection threshold value ED (step S765). Then, the control unit 150 of the information processing apparatus 100 determines whether the RSSI is greater than the energy detection threshold value ED (step S765).

When the RSSI is greater than the energy detection threshold value ED (step S756), the control unit 150 of the information processing apparatus 100 determines the packet detection determination result as "energy-only detection" (step S766).

When the RSSI is equal to or less than the energy detection threshold value ED (step S765), the control unit 150 of the information processing apparatus 100 determines the packet detection determination result as "non-detection" (step S767).

6. Sixth Embodiment

A sixth embodiment of the present technology is a modification example of the fourth embodiment of the present technology. An example in which the plurality of PLCP preambles for distinction are generated by processing part of the original sequence rather than as completely different sequence will be described. Thus, the configurations of the plurality of correlators on the reception side can be simplified. By setting the preamble sequence of a processing origin to a sequence of a format for a legacy apparatus, the information processing apparatus not corresponding to a specific function can also detect the preamble depending on a condition, and thus part of backward compatibility can remain.

The configurations of information processing apparatuses according to the sixth embodiment of the present technology are substantially the same as those of the information processing apparatuses 100 to 103, 200, and 201 shown in FIG. 1 and the like. Therefore, the same reference numerals as those according to the first to fourth embodiments of the present technology are given to common portions to those according to the first to fourth embodiments of the present technology, and the description thereof will be omitted partially.

Each process and each format according to the sixth embodiment of the present technology are also common portions to those according to the first to fourth embodiments of the present technology. Therefore, the same reference numerals as those according to the first to fourth embodiments of the present technology are given to common portions to those according to the first to fourth embodiments of the present technology, and the description thereof will be omitted partially.

(Example of Format of PPDU)

The format of the PPDU according to the sixth embodiment of the present technology is the same as the example shown in FIG. 21.

That is, in the sixth embodiment of the present technology, the plurality of sequences of preambles 311 (shown in FIG. 21) are defined. For example, as shown in a of FIG. 21, a sequence called "Preamble #1" is defined in the preamble 311. As shown in b of FIG. 21, a sequence called "Preamble #0" is defined. Each of the information processing apparatuses (except for legacy apparatuses) changes a sequence to be used according to the quality of the link with a destination at the time of transmission. In FIG. 21, an example in which two types of preambles are prepared has been described, but three or more types of preambles may be prepared.

In the sixth embodiment of the present technology, a physical header using the sequence called "Preamble #0" in the preamble 311 is referred to as a "long-distance physical header." A physical header using the sequence called "Preamble #1" in the preamble 311 is referred to as a "short-distance physical header." The preamble sequence #0 is assumed to be the same sequence as a preamble used by a legacy apparatus.

Here, a method of generating the preamble sequence other than Preamble #0 is different between the sixth embodiment of the present technology and the fourth embodiment of the present technology. Specifically, in the sixth embodiment of the present technology, a working process of performing positive or negative inversion on part of the content using Preamble #0 as a base is applied to the sequence other than Preamble #0. The working process is not limited to the positive or negative inversion. For example, another calculation such as a process of thinning part of the content and setting the part to 0 may be performed as long as the working is performed using a certain sequence as a base.

Here, when the IEEE 802.11 standard is assumed, "different preamble sequence" is assumed to mean a sequence in which the above-described working process is applied to at least one of the L-STF and the L-LTF and thus a difference is made.

Each of the information processing apparatuses (except for the legacy apparatuses) receiving packets with such physical headers changes the correlator calculation (or the packet detection determination threshold value) to be applied according to the magnitude of the RSSI of the signal.

(Example of Operation of Physical Header Parameter Decision Process)

A physical header parameter decision process in the sixth embodiment of the present technology is substantially the same as that in the fourth embodiment of the present technology. However, in the sixth embodiment of the present technology, extension may be added to a relation expression of a decision criterion of the detection threshold value of each physical header as follows.

The above-described expression 3 and expression 6 may be replaced by introducing a threshold value offset in consideration of deterioration caused due to the working such as the positive or negative inversion applied to the preamble sequence. For example, when an expected output value of the original correlator with respect to the input of the preamble of which part is subjected to the positive or negative inversion is A times, expression 3 can be changed to, for example, the following expression 11 and expression 6 can be changed to, for example, the following expression 12. Here, expression 11 and expression 12 are description on the assumption of calculation of logarithm (dB).

$$PD\_near > COL\_other\_near + A\_near$$

$$PD\_n > COL\_other\_n + A\_n$$

Here, "n=0 to N" is assumed.

(Example of Operation of Transmission and Reception Process)

FIG. 26 is a flowchart showing a packet detection determination process (the processing procedure of step S730 shown in FIG. 17) in the transmission and reception process by the information processing apparatus 100 according to the sixth embodiment of the present technology.

First, the control unit 150 of the information processing apparatus 100 performs RSSI measurement on a signal input via the antenna 141 and retains the RSSI requested through the measurement (step S771).

Subsequently, the control unit 150 of the information processing apparatus 100 compares the measured RSSI to the application levels (L_far and L_near) of the retained physical headers and decides the index of the physical header to be applied to the detection (step S772). For example, the index of the physical header to be applied to the detection can be decided as in the selection method of selecting the transmission physical header of the information processing apparatus.

For example, the control unit 150 of the information processing apparatus 100 compares the measured RSSI to the value of L_near. When the measured RSSI is greater than L_near, the control unit 150 of the information processing apparatus 100 decides 1 (for a short distance) as the index of the physical header used to detect the correlation of the information processing apparatus. When the measured RSSI is equal to or less than L_near, the control unit 150 of the information processing apparatus 100 decides 0 (for a long distance) as the index of the physical header used to detect the correlation of the information processing apparatus.

The decision order is set on the premise that there is no difference in transmission power between the salve station and the master station. Here, even when there is a difference in the transmission power between the slave station and the master station and the information regarding the difference in the transmission power is retained in advance, the determination can be performed based on the information regarding the difference in the retained transmission power after appropriate correction is applied.

Subsequently, the control unit 150 of the information processing apparatus 100 switches internal calculation of the correlator in correspondence with the preamble sequence of the physical header of the decided index and performs correlation calculation (step S773). Here, the switching of the internal calculation is the same process as the process corresponding to "the positive or negative inversion of the part of the content" which is the above-described method of generating the PLCP preamble portion.

(Example of Configuration of Correlator)

FIG. 27 is a diagram showing an example of the configuration of the correlator provided in the information processing apparatus 100 according to the sixth embodiment of the present technology. Further, a of FIG. 27 is a modification example of a of FIG. 11 and b of FIG. 27 is a modification example of b of FIG. 11. FIG. 27 shows an example of the configuration of the correlator in which calculation of code inversion based on a changeover signal determined by the RSSI is added. By realizing the configuration in this way, a correlator of a different preamble can be easily configured.

For example, by correctly coordinating the input PLCP preamble with the calculation of the correlator, a large correlator output can be produced. However, when the calculation varies, the correlator output decreases. Therefore, the packet to be detected can be accordingly selected. The definition of the "correlator output" herein is also the same as the definition of the "correlator output" described above.

For example, the calculation of the correlator may be switched in correspondence with the preamble sequence of the physical header of the decided index or the detection threshold value may be switched without changing the calculation. Further, both of the calculation and the detection threshold value may be switched. Accordingly, it is possible to realize the process of selecting the packet to be detected according to a situation. In FIG. 26, an example in which both of the calculation and the detection threshold value are switched is shown.

In FIG. 26, the control unit 150 of the information processing apparatus 100 switches the calculation of the correlator and the detection threshold value in correspondence with the preamble sequence of the physical header of the decided index (step S773). That is, the correlator calculation and the detection threshold value are set based on the decided index (step S773).

Subsequently, the control unit 150 of the information processing apparatus 100 compares the correlator output to the corresponding detection threshold value and determines whether the value of the correlator output is greater than the detection threshold value (step S774).

When the value of the correlator output is greater than the detection threshold value (step S774), the control unit 150 of the information processing apparatus 100 determines a packet detection determination result as "detection" (step S775).

Conversely, when the value of the correlator output is equal to or less than the detection threshold value (step S774), the control unit 150 of the information processing apparatus 100 compares the measured RSSI to the energy detection threshold value ED (step S776). Then, the control unit 150 of the information processing apparatus 100 determines whether the RSSI is greater than the energy detection threshold value ED (step S776).

When the RSSI is greater than the energy detection threshold value ED (step S776), the control unit 150 of the information processing apparatus 100 determines the packet detection determination result as "energy-only detection" (step S777).

When the RSSI is equal to or less than the energy detection threshold value ED (step S776), the control unit 150 of the information processing apparatus 100 determines the packet detection determination result as "non-detection" (step S778).

7. Seventh Embodiment

In the first to sixth embodiments of the present technology, in a star topology configured by a master station and slave stations subordinate to the master station, a communication example between the master station and the slave stations has been described. In the communication example, a transmission destination of the subordinate slave stations is confined to the master station. Here, the first to sixth embodiments of the present technology can also be applied to direct communication between the subordinate slave stations.

Accordingly, in a seventh embodiment of the present technology, an example in which direct communication between the subordinate slave stations (for example, communication between information processing apparatuses 101 and 104 shown in FIG. 28) is performed will be described.

(Example of Configuration of Communication System)

FIG. 28 is a diagram showing an example of a system configuration of a communication system 50 according to the seventh embodiment of the present technology.

FIG. 28 is a modification example of FIG. 1 and is different from FIG. 1 in that the information processing apparatus 104 is added. The configuration of information processing apparatus 104 is substantially the same as those of the information processing apparatuses 100 to 103, 200, and 201 shown in FIG. 1 and the like. Therefore, the same reference numerals as those according to the first to sixth embodiments of the present technology are given to common portions to those according to the first to sixth embodiments of the present technology, and the description thereof will be omitted partially.

The communication system 50 is configured to include the information processing apparatuses 100 to 104, 200, and 201.

The information processing apparatus 104 is an information processing apparatus corresponding to the information processing apparatuses 100 to 103 and is, for example, a portable information processing apparatus having a wireless communication function.

Thus, in the seventh embodiment of the present technology, in a star topology configured by a master station and slave stations subordinate to the master station, the example in which direct communication between the subordinate slave stations (for example, communication between the information processing apparatuses 101 and 104) is performed will be described.

(Communication Example)

FIG. 29 is a sequence chart showing an example of a communication process between the apparatuses included in the communication system 50 according to the seventh embodiment of the present technology.

In FIG. 29, an example of the communication process in which the direct transmission is performed between the information processing apparatuses 100 and 104 is shown. The same also applied to a relation between other slave stations.

Here, a setup process for the direct communication basically conforms to a Tunneling Direct Link Setup (TDLS) function of the IEEE 802.11 standard. In FIG. 29, the description will be made assuming a state in which the information processing apparatuses 100 and 104 are already connected to the information processing apparatus 200 and perform the operation described in the first embodiment of the present technology.

First, a direct link connection process is performed among the information processing apparatuses 100, 104, and 200 (441). That is, each of the information processing apparatuses 100 and 104 execute an establishment protocol of the direct link via an access point (the information processing apparatus 200) (441). Thus, a direct link searching process can be performed without collapse of the protocol. Since the direct link connection process is the same as in standard definition, the detailed description thereof will be omitted herein.

Subsequently, the control unit of the information processing apparatus 200 performs the physical header parameter decision process (442). In this way, in the seventh embodiment of the present technology, the physical header parameters used for the direct link between the subordinate slave stations are decided by the master station (the information processing apparatus 200). Therefore, the slave stations do not perform the physical header parameter decision process. The physical header parameter decision process performed by the master station is the same as that of the first embodiment of the present technology.

Subsequently, the physical header parameter sharing process is performed among the information processing apparatuses 100, 104, and 200 (443). In this way, in the seventh embodiment of the present technology, the physical header parameters used for the direct link between the subordinate slave stations are also decided by the master station (the information processing apparatus 200). Therefore, the physical header parameter sharing process is not performed between the slave stations performing the direct link. The physical header parameter sharing process between the master station and the slave stations is the same as that of the first embodiment of the present technology.

Subsequently, each of the information processing apparatuses 100 and 104 performs the use physical header decision process (444 and 446). Here, the physical header for a partner during the direct link connection is decided independently of the physical header for the master station according to the communication quality of the link with the partner. A criterion or the like for the decision is the same as that of the first embodiment of the present technology. That is, the use physical header decision process between the slave stations is the same as that of the first embodiment of the present technology.

Subsequently, each of the information processing apparatuses 100 and 104 performs the transmission and reception process (445 and 447). The transmission and reception process is the same as that of the first embodiment of the present technology except that transmission and reception are performed between the slave stations instead of the transmission and reception between the master station and the slave station. The format of the PPDU according to the seventh embodiment of the present technology is the same as that of the first embodiment of the present technology.

8. Eighth Embodiment

In the seventh embodiment of the present technology, the example in which the master station decides the physical header parameters used for the direct link has been described. However, the slave station (the slave station performing the direct link) may decide the physical header parameters used for the direct link.

Accordingly, in an eighth embodiment of the present technology, an example in which the slave station (the slave station performing the direct link) decides the physical header parameters used for the direct link is will be described.

A system configuration according to the eighth embodiment of the present technology is the same as that according to the seventh embodiment of the present technology. Therefore, the same reference numerals as those according to the seventh embodiment of the present technology are given to common portions to those according to the seventh embodiment of the present technology, and the description thereof will be omitted partially.

(Communication Example) FIG. 30 is a sequence chart showing an example of a communication process between the apparatuses included in the communication system 50 according to the eighth embodiment of the present technology.

FIG. 30 is a modification example of FIG. 29 and there are common portions to those of FIG. 29. Therefore, the description of the common portions to those of FIG. 29 will be omitted partially.

First, a direct link connection process is performed among the information processing apparatuses 100, 104, and 200 (451). The direct link connection process is the same as that of the seventh embodiment of the present technology.

Subsequently, each of the information processing apparatuses 100 and 104 performs the physical header parameter decision process (452 and 453). In this way, in the eighth embodiment of the present technology, the slave stations (the information processing apparatuses 100 and 104) which have a connection destination other than the master station autonomously decides the physical header parameters for the direct link. The physical header parameter decision process can be substantially the same as the process performed by the master station (the information processing apparatus 200) according to the first embodiment of the present technology. However, there is a difference in that sample targets of COL_self_near and COL_self_far are confined to the slave stations (the information processing apparatuses) directly connected to the information processing apparatus despite the same BSSID.

Subsequently, the physical header parameter sharing process is performed between the information processing apparatuses 100 and 104 (454). In this way, each of the information processing apparatuses 100 and 104 performing the direct link periodically exchanges the physical header parameters for the direct link decided through the physical header parameter decision process in the direct link. Then, each of the information processing apparatuses 100 and 104 comprehends an operation which the direct link partner expects. A frame used for the exchange may be set as a data frame or a management frame.

Subsequently, each of the information processing apparatuses 100 and 104 performs the use physical header decision process (455 and 457). In this way, each of the information processing apparatuses 100 and 104 independently decides the physical header for each partner based on the parameters notified of by the direct link partner apart from the parameters for the master station. A criterion or the like for the decision is the same as that of the first embodiment of the present technology.

Subsequently, each of the information processing apparatuses 100 and 104 performs the transmission and reception process (456 and 458). The transmission and reception process is the same as that of the seventh embodiment of the present technology.

9. Ninth Embodiment

In the first embodiment of the present technology, the example in which the Link Strength Category field is provided in the SIGNAL field of the IEEE 802.11 standard has been described.

In a ninth embodiment of the present technology, an example in which a field storing information regarding an identifier of the BSS other than the Link Strength Category field is added in the SIGNAL field of the IEEE 802.11 standard will be described. In this way, by storing the information regarding the identifier of the BSS, it is possible to further improve packet selection accuracy. The configurations of information processing apparatuses according to the ninth embodiment of the present technology are substantially the same as those of the information processing apparatuses 100 to 103, 200, and 201 shown in FIG. 1 and the like. Therefore, the same reference numerals as those according to the first embodiment of the present technology are given to common portions to those according to the first embodiment of the present technology, and the description thereof will be omitted partially.

Each process and each format according to the ninth embodiment of the present technology are also common portions to those according to the first embodiment of the present technology. Therefore, the same reference numerals as those according to the first embodiment of the present technology are given to common portions to those according to the first embodiment of the present technology, and the description thereof will be omitted partially.

(Example of Format of PPDU)

FIG. 31 is a diagram showing an example of the format of the PPDU exchanged between the apparatuses included in the communication system 10 according to the ninth embodiment of the present technology.

Here, the example shown in FIG. 31 is the same as the example shown in FIG. 7 except that a BSS COLOR field is provided in the SIGNAL field. Therefore, the same reference numerals as those in FIG. 7 are given to common portions to those in FIG. 7, and the description thereof will be omitted partially.

The PPDU is configured to include a preamble 301, SIGNAL 331, Extension 303, Service 304, MPDU 305, and FCS 306.

In the ninth embodiment of the present technology, a "Link Strength Category" field and a "BSS COLOR" field storing information regarding the identifier of the BSS (COLOR information) are provided in parts of the SIGNAL field of the physical header. In FIG. 31, the "Link Strength Category" field is indicated by Link Strength Category and the "BSS COLOR" field is indicated by COLOR.

Here, the COLOR information (BSS COLOR information) is information reported in advance from a connected partner apparatus (for example, the master station) and is information (for example, a numerical value) capable of identifying a Basic Service Set (BSS) to which the information processing apparatus belongs. That is, the COLOR information (BSS COLOR information) is an example of an identifier for identifying a network. A BSSID is stored as the same information in a MAC header. However, the COLOR information can be expressed in a physical layer (PLCP layer) in a form simplified further than the BSSID.

An example in which the information processing apparatus (the master station or the slave station) transmitting the physical header belongs to the BSS in which "1" is set as the COLOR information (that is, COLOR=1) is shown in a and b of FIG. 31.

In this way, in the ninth embodiment of the present technology, the "Link Strength Category" field and the "COLOR" field are provided in portions treated to be reserved in the SIGNAL 311. Thus, a specific function according to the ninth embodiment of the present technology can be realized without disturbing reception of the legacy apparatus.

In the ninth embodiment of the present technology, the physical header of Link Strength Category=0 is referred to as a "long-distance physical header." The physical header of Link Strength Category=1 is referred to as a "short-distance physical header." The physical header transmitted from the legacy apparatus is assumed to be treated as the "long-distance physical header."

The information processing apparatus (except for the legacy apparatus) receiving the packet including at least one of the Link Strength Category field and the COLOR field can acquire the content of each of these fields. The information processing apparatus can change the reception operation and the detection threshold value to be applied based on the content of each of these fields.

The connection process is the same as that of the first embodiment of the present technology. The physical header parameter decision process is also substantially the same as that of the first embodiment of the present technology. Here, the COLOR information is information which can be acquired in the physical layer. Therefore, unlike the BSSID information, the COLOR information can be used without waiting for collation of the FCS (present in the end of the PPDU) in the PPDU. Accordingly, when the physical header parameter decision process is performed and the master station collects information regarding the communication quality of the packet from another BSS (OBSS), classification can be performed using the COLOR information rather than the BSS ID.

The order of the physical header parameter sharing process is the same as that of the first embodiment of the present technology. However, in the ninth embodiment of the present technology, information regarding "COLOR" (the BSS identifier in the physical layer) and "TxPower (transmission power of the master station)" is delivered additionally as well as "Multi Detect Parameter." An example of the format of a frame used in this case is shown in FIG. 32.

(Example of Format of Beacon Frame)

FIG. 32 is a diagram showing an example of the format of a beacon frame exchanged between the apparatuses included in the communication system 10 according to the ninth embodiment of the present technology. Since FIG. 32 is a modification example of FIG. 14, the same reference numerals as those in FIG. 14 are given to common portions to those in FIG. 14, and the description thereof will be omitted partially.

In FIG. 32, an example in which elements called "COLOR Info" 341 and "TxPower Info" 342 along with "Multi Detect Parameter" 311 are newly added to Payload 340 is shown.

The BSS identifier of the physical layer is stored in "COLOR Info" 341. The BSS identifier corresponds to the BSS identifier stored in the "BSS COLOR" field shown in FIG. 31.

Information regarding transmission power of the information processing process (for example, the master station) transmitting the beacon is stored in "TxPower Info" 342.

For example, the control unit of the information processing process 200 transmits the beacon in which respective pieces of information regarding "Multi Detect Parameter" 311, "COLOR Info" 341, and "TxPower Info" 342 are stored to the surrounding information processing apparatuses to make report.

The information processing apparatus receiving the report by the beacon acquires the respective pieces of information stored in "Multi Detect Parameter" 311, "COLOR Info" 341, and "TxPower Info" 342 from the beacon and retains the information. That is, the information processing process retains each of the content of the transmission power of "Multi Detect Parameter," the BSS identifier in the physical layer, and the communication partner (for example, the master station).

When the information included in the subsequent beacon is changed after the retention of the content of the beacon, the information included in the recent beacon (recent information) is adopted and retained.

The master station may be configured to notify the subordinate terminals of the content of each of "Multi Detect Parameter," the BSS identifier in the physical layer, and the transmission power of the information processing apparatus using a signal other than the beacon transmission. For example, the master station may notify the subordinate terminals of a data frame or a management frame of unicast by setting determination by the information processing apparatus or an information acquisition request from the subordinate terminal as a trigger.

(Example of Backoff Process)

FIG. 33 is a diagram showing the flow of a backoff process in the IEEE 802.11 standard. The horizontal axis illustrated in FIG. 33 is a time axis. Information processing apparatus states (BUSY 500 to BUSY 502, IFSs, and Tx 503) are schematically shown as rectangles above the horizontal axis. Numerical values indicating the number of backoff slots (backoff counter) are shown below the horizontal axis. A timing of a transmission request 504 from an upper layer and a timing of random backoff time generation 505 are schematically shown by rectangles and arrows.

For example, a waiting time of the IFS occurs every time a carrier sense state becomes BUSY and subsequently transitions to an IDLE state. For example, the waiting time of the IFS occurs when the carrier sense state transitions to the IDLE state after BUSY 500 to BUSY 502.

As indicated by the numerical values below the horizontal axis shown in FIG. 33, the backoff counter remains stopped during the reception of the physical header.

(Example of Backoff Process when Reception Cancelation is Performed)

FIG. 34 is a diagram showing the flow of the backoff process by the information processing apparatus 100 according to the ninth embodiment of the present technology. The horizontal axis shown in FIG. 34, the information processing apparatus state (BUSY 510 to BUSY 512 and IFS) on the upper side of the horizontal axis, and numerical values indicating the number of backoff slots (backoff counter) on the lower side of the horizontal axis are the same as those of FIG. 33.

In FIG. 34, an example in which two information processing apparatuses 521 and 522 located at distant locations from the information processing apparatus 100 transmit packets is shown. The horizontal axis for the information processing apparatuses 521 and 522 and the information processing apparatus states (PLCPs 513 and 514 and PSDU) on the upper side of the horizontal axis are the same as those in FIG. 33.

In FIG. 34, an example in which, when the information processing apparatus 100 receives the packet transmitted from each of the information processing apparatuses 521 and 522, the reception is terminated based on the PLCPs 513 and 514 included in the packets is shown (515 and 516). Thus, the periods of BUSY 511 and BUSY 512 can be shortened.

However, for example, in an environment in which information processing apparatuses are dense and traffic is congested, it is assumed that the backoff counter is not reduced even when a process of terminating the reception from the information processing apparatuses at distant locations and transitioning the carrier sense state to an IDLE state is performed. For example, as shown in FIG. 34, even when the reception of the packet from each of the information processing apparatuses 521 and 522 is terminated (515 and 516), the backoff counter remains at "8" and is not reduced from "8." In this way, even when the reception of the frames determined to be negligible is cancelled, the IFS is added after the transition from BUSY to IDLE. Therefore, the backoff counter is not reduced between the IFSs. In this way, until the backoff counter becomes 0, the information processing apparatus 100 may not perform the transmission. Thus, even when the reception of the negligible packet is terminated in a dense environment (congested environment), there is a concern that transmission opportunities may not increase. Accordingly, it is important to improve the effect of obtaining the transmission opportunities of the information processing apparatus 100. An example in which the transmission opportunities of the information processing apparatus 100 are increased is shown in FIG. 35.

(Example of Backoff Process when Backoff Counter is Subtracted without Inputting IFS)

FIG. 35 is a diagram showing the flow of the backoff process by the information processing apparatus 100 according to the ninth embodiment of the present technology. Since FIG. 35 is an example corresponding to FIG. 34, the same reference numerals are given to common portions to those in FIG. 34 for the description.

In FIG. 35, as in FIG. 34, an example in which, when the information processing apparatus 100 receives the packet transmitted from each of the information processing apparatuses 521 and 522, the reception is terminated based on the PLCPs 513 and 514 included in the packets is shown (515 and 516). In FIG. 35, the reception is terminated (reception cancellation) and the backoff counter is decreased by transitioning the carrier sense state to the IDLE state for only a time (elapsed time) related to the reception. In FIG. 35, immediately after the reception is terminated (reception cancellation), the waiting for the IFS is not performed (that is, the IFS is not input) and the backoff counter is subtracted.

For example, as shown in FIG. 35, when the reception of the packet from the information processing apparatus 521 is terminated (515), a time length from a start time of the physical header to a current time is calculated. A time slot converted value of the length (time length) is subtracted instantly from the backoff counter. For example, "4(=8−4)" is calculated as the time length from the start time of the physical header to the current time. The value "4" is subtracted from the backoff counter "8" and the backoff counter is assumed to be "4." By also cancelling the application of the IFS preceding the subsequent carrier sense, subtraction of decreasing of the backoff counter starts immediately.

In this way, by cancelling the application of the IFS and subtracting the backoff counter corresponding to the physical header time, it is possible to effectively obtain a transmission opportunity.

Here, for example, when enhanced distributed channel access (EDCA) is used, a plurality of backoff counters operate in some cases. Accordingly, when the plurality of backoff counters operate, this process is performed on all of the counters.

In this way, the control unit 150 of the information processing apparatus 100 can perform control without generating a waiting time corresponding to the IFS after the reception of the packet is terminated. In this case, after the reception of the packet is terminated, the control unit 150 can convert the time length from a time at which the carrier sense transitions to BUSY at the time of the reception of the packet to a reception termination time into a slot time and subtract the slot time from the backoff counter.

Here, in the above-described subtraction process, it is also assumed that the backoff counter after the subtraction becomes a negative value. In this case, the counter can be set to 0. That is, the control unit 150 of the information processing apparatus 100 can treat the result as 0 when the result after the subtraction becomes a negative value.

As another variation, when the backoff counter after the subtraction becomes a negative value, the absolute value of the negative value may be turned to be a positive value so that the positive value is used. For example, when a counter value before the subtraction is 1 and the time slot converted value of the time length at BUSY is 2, a value "−1 (=1−2)" after the subtraction is turned and the counter value can be set to 1. Thus, when there is another information processing apparatus under the same condition in which a counter value before subtraction is 2, a case in which the count becomes 0 simultaneously and collision occurs can be reduced. However, when the counter value is turned, the result is prohibited from being turned to be greater than the counter value before the subtraction. That is, when the result after the subtraction is a negative value, the control unit 150 of the information processing apparatus 100 can turn the negative value into a positive value so that the value after the subtraction is not greater than the backoff counter before the subtraction.

As another variation, when the backoff counter after the subtraction becomes a negative value, a random number within a range between 0 and a value equal to or less than the backoff counter value before the subtraction may be generated and this value may be set to as the value after the subtraction. That is, random backoff may be performed in the width of the original value of the backoff counter before Busy.

In this example, the carrier sense of the physical layer has been described. However, when the transmission suppression is applied by the virtual carrier sense and the carrier sense state is a BUSY state, the above-described process at the time of the reception termination can be configured not to be performed.

(Example of Operation of use Physical Header Decision Process)

FIG. 36 is a flowchart showing an example of a processing procedure of a use physical header decision process (transmission physical header selection process) by the information processing apparatus 100 according to the ninth embodiment of the present technology. The use physical header decision process is basically the same as that of the first embodiment of the present technology, but is different in that RSSI_peer is corrected based on TxPower notified of by a partner.

First, the control unit 150 of the information processing apparatus 100 monitors the packets received from destinations connected to the information processing apparatus and acquires the RSSI for each destination (step S781). The RSSI (monitoring result) acquired in this way is set to RSSI_peer.

When measurement values of the packets received from the destinations connected with the information processing apparatus are retained, the control unit 150 of the information processing apparatus 100 may read the measurement values and acquire the RSSI of each destination (step S781).

Here, in the case of the information processing apparatus (for example, the information processing apparatus 100) connected to the master station (for example, the information processing apparatus 200), the destination is basically only the master station. In this case, the reception level of the previous beacon may be used as the monitoring result.

Subsequently, the control unit 150 of the information processing apparatus 100 corrects the acquired RSSI_peer in consideration of a transmission power difference (step S782). For example, "TxPower" information (stored in "TxPower Info" 342 shown in FIG. 32) notified of by the master station in the physical header parameter sharing process is set to TP_peer. Transmission power used for the transmission from the information processing apparatus 100 to the master station is set to TP_self. In this case, corrected RSSI_adjusted can be obtained by the following expression 13. Here, expression 13 is description on the assumption of calculation of logarithm (dB).

$$\text{RSSI\_adjusted} = \text{RSSI\_peer} + (\text{TP\_self} - \text{TP\_peer}) \quad \text{expression 13}$$

Here, RSSI_adjusted indicates an estimated value of the RSSI expected when the master station side receives a packet transmitted from the information processing apparatus 100. However, when information corresponding to TP_peer may not be obtained, RSSI_adjusted may be substituted with RSSI_peer.

Subsequently, the control unit 150 of the information processing apparatus 100 compares the corrected RSSI_adjusted to the application level L_near of the physical header and decides the index of the physical header used for the transmission by the information processing apparatus based on the comparison result (step S783). The application level L_near of the physical header is included in the beacon transmitted from the information processing apparatus 200.

For example, when the corrected RSSI_adjusted is greater than the application level L_near of the physical header, the control unit 150 of the information processing apparatus 100 decides 1 (for a short distance) as the index of the physical header used for the transmission by the information processing apparatus (step S783). Conversely, when the corrected RSSI_adjusted is equal to or less than the application level L_near of the physical header, the control unit 150 of the information processing apparatus 100 decides 0 (for a long distance) as the index of the physical header used for the transmission by the information processing apparatus (step S783).

When the index of the physical header used for the transmission by the information processing apparatus is already decided and the new index is decided, the already decided index is updated to a new index (step S783).

In FIG. 36, the example in which the use physical header is decided based on the classification of the two values of the short distance and the long distance has been described above, but the use physical header may be decided based on classification of three or more values (N values). For example, the application levels of the physical headers are set to L_0, L_1, . . . , and L_N in order from the value of the long distance. In this case, n satisfying the following relation expression (expression 14) is selected as the index of the physical header used for the transmission. Here, expression 14 is description on the assumption of calculation of logarithm (dB). [Math. 4]

Here, "n=0 to N" is assumed.

In FIG. 36, the operation example of the slave station side in the case of the uplink transmission from the slave station side to the master station side has been described. However, in the case of downlink transmission, the same operation may be performed on the master station side. The processing content of the master station side in this case is the same as the processing content shown in FIG. 36. However, when a plurality of connection partners are present, classification of the monitoring results of the received packets is managed for each a transmission source of the packets and RSSI_adjusted is calculated separated for each link.

In FIG. 36, the example in which the RSSI is used has been described. However, the correlation output intensity COL may be used instead of the RSSI.

(Example of Operation of Transmission and Reception Process)

FIG. 37 is a flowchart showing an example of a processing procedure of the transmission and reception process by the information processing apparatus 100 according to the ninth embodiment of the present technology. In FIG. 37, the information processing apparatus 100 has been described, but the same can also apply to another information processing apparatus (for example, the information processing apparatus 200). That is, the transmission and reception process is the same process on both of the master station side and the terminal side.

The control unit 150 of the information processing apparatus 100 performs a packet detection and reception determination process for a time other than a time during transmission or during reception (step S800). The packet detection and reception determination process will be described in detail with reference to FIG. 39.

Subsequently, the control unit 150 of the information processing apparatus 100 determines whether there is a packet to be transmitted (step S791). When there is no packet to be transmitted (step S791), the operation of the transmission and reception process ends.

When there is the packet to be transmitted (step S791), the control unit 150 of the information processing apparatus 100 determines whether the information processing apparatus 100 acquires a transmission right (step S792).

Here, the state in which the transmission right is acquired is assumed to mean, for example, a state in which the backoff counter decreased according to a time in which the carrier sense result is IDLE becomes 0.

When the information processing apparatus 100 acquires the transmission right (step S792), the control unit 150 of the information processing apparatus 100 transmits the packet (step S794). When the information processing apparatus 100 does not acquire the transmission right (step S792), the control unit 150 of the information processing apparatus 100 determines whether the packet to be transmitted is an immediate response to the packet received from the communication partner (step S793).

A packet which is the immediate response to the packet received from the communication partner is, for example, a CTS frame, an ACK frame, or a Block Ack frame.

When the packet to be transmitted is not the immediate response to the packet received from the communication partner (step S793), the packet is not transmitted and the operation of the transmission and reception process ends. When the packet to be transmitted is the immediate response to the packet received from the communication partner (step S793), the control unit 150 of the information processing apparatus 100 transmits the packet (step S794). In this way, the packet which is the immediate response to the packet received from the communication partner can be transmitted irrespective of the carrier sense state.

In this way, the information processing apparatus 100 transmits the packet when there is the packet to be transmitted and the transmission right is acquired and when the packet to be transmitted is the immediate response to the packet from the communication partner.

In this case, the control unit 150 of the information processing apparatus 100 performs the transmission using the physical header with the format shown in a orb of FIG. 31 based on the index of the physical header decided in the use physical header decision process when the packet is transmitted.

For example, the control unit 150 of the information processing apparatus 100 selects, as modulation to be used for a data portion, a modulation and channel coding scheme by which a destination apparatus can perform reception at a high probability according to a detection threshold value corresponding to the decided physical header and performs transmission using the selected modulation and channel coding scheme. For example, the control unit 150 of the information processing apparatus 100 may select a modulation and channel coding scheme (Modulation and Coding Scheme (MCS)) by which a destination apparatus can perform reception at a high probability according to a detection threshold value corresponding to the decided physical header and perform transmission.

(Example of Operation of Packet Detection and Reception Determination Process)

FIG. 38 is a diagram showing a relation example (process classification table) between a physical header and a process by the information processing apparatus 100 according to the ninth embodiment of the present technology. The description of FIG. 38 will be made in detail with reference to FIG. 39.

FIG. 39 is a flowchart showing a packet detection and reception determination process in the transmission and reception process (the processing procedure of step S800 shown in FIG. 37) by the information processing apparatus 100 according to the ninth embodiment of the present technology.

First, the control unit 150 of the information processing apparatus 100 performs RSSI measurement on a signal input via the antenna 141 and retains the RSSI requested through the measurement (step S801). Subsequently, the control unit 150 of the information processing apparatus 100 performs correlation calculation of a preamble pattern and makes a request of correlator output (step S801). The correlator output means the above-described correlation output intensity COL. That is, the correlator output is not a normalized correlator output level, but is a correlator output converted by reflecting reception power.

In this way, each of the master station and the slave station corresponding to each function in the ninth embodiment of the present technology monitors the RSSI measurement and the correlator output on the signal input via the antenna during a waiting state (step S801).

Subsequently, the control unit 150 of the information processing apparatus 100 performs the correlation calculation of the pattern and compares the output (correlator output) to the temporary detection threshold value (step S802). Here, the temporary detection threshold value is a detection threshold value for reading the SIGNAL field prior to the determination process. For example, a value equal to or less than both of PD_near and PD_far can be used as the temporary detection threshold value. For example, PD_default may be used as the temporary detection threshold value.

When the value of the correlator output is equal to or less than the temporary detection threshold value (step S802), the control unit 150 of the information processing apparatus 100 compares the measured RSSI to the energy detection threshold value ED (step S803). Then, the control unit 150 of the information processing apparatus 100 determines whether the RSSI is greater than the energy detection threshold value ED (step S803). The energy detection threshold value ED can be set to be the same as the above-described value.

When the RSSI is greater than the energy detection threshold value ED (step S803), the control unit 150 of the information processing apparatus 100 retains the carrier sense BUSY state (step S804) and ends the operation of the packet detection and reception determination process. Conversely, when the RSSI is equal to or less than the energy detection threshold value ED (step S803), the control unit 150 of the information processing apparatus 100 transitions the carrier sense state to the carrier sense IDLE state (step S805) and ends the operation of the packet detection and reception determination process.

When the value of the correlator output is greater than the temporary detection threshold value (step S802), the control unit 150 of the information processing apparatus 100 determines that detection state is the temporary detection state and transitions the carrier sense state to the carrier sense BUSY state (step S806). Subsequently, the control unit 150 of the information processing apparatus 100 decodes the subsequent SIGNAL field in the physical header and reads information or the like of the SIGNAL field (step S807). Specifically, each of the "Link Strength Category" field, the "COLOR" field, and a Cyclic Redundancy Check (CRC) of the physical header is read. As described above, information indicating a detection threshold value to be applied is stored in the "Link Strength Category" field.

The control unit 150 of the information processing apparatus 100 collates each piece of read information and the process classification table shown in FIG. 38 and decides a subsequent process (step S807).

Specifically, the control unit 150 of the information processing apparatus 100 calculates the CRC of the physical header and confirms whether there is an error in the physical header. Here, when there is an error in the physical header, legitimacy of the value of the field may not be confirmed. Therefore, as shown in FIG. 38, when there is an error in the physical header, the subsequent process is decided to be "reception termination (ERROR)." Conversely, when there is no error in the CRC of the physical header, the process is decided based on the content of each of the "Link Strength Category" field and the "COLOR" field.

Here, the control unit 150 of the information processing apparatus 100 decides the detection threshold value to be applied based on "Preamble Detection Threshold" shared in the above-described physical header parameter sharing process. Specifically, in the case of Link Strength Category=0, the detection threshold value PD_far is used. In the case of Link Strength Category=1, the detection threshold value PD_near is used. Here, when the physical header in which the Link Strength Category field is not present is temporarily detected, a value (for example, PD_far) with the lowest level can be used as the detection threshold value.

Subsequently, the control unit 150 of the information processing apparatus 100 compares the decided detection threshold value to the value of the correlator output. Then, when the value of the correlator output is smaller than the decided detection threshold value, the subsequent process is determined to be "reception termination (IDLE)" as shown in the upper part of FIG. 38. However, as shown in the upper part of FIG. 38, when the COLOR field is present and the value of the COLOR field is the same as the value of the BSS to which the information processing apparatus belongs, the subsequent process is exceptionally determined to be "reception." Thus, it is possible to avoid a case in which detection of the packet that is supposed to be received fails due to the change in the reception level.

When the value of the correlator output is equal to or greater than the decided detection threshold value, the subsequent process is decided to be "reception" as shown in the lower part of FIG. 38. However, as shown in the lower part of FIG. 38, when the COLOR field is present and the value of the COLOR field is different from the value of the BSS to which the information processing apparatus belongs, the subsequent process is exceptionally decided to be "reception termination (BUSY)." Thus, it is possible to avoid a case in which detection of a desired packet fails due to reception of the packet which is not supposed to be received.

In this way, the control unit 150 of the information processing apparatus 100 decides one of "reception," "reception termination (IDLE)," "reception termination (BUSY)," and "reception termination (ERROR)" as the subsequent process (step S807).

Here, for example, a packet is assumed to arrive at a weak level when a long-distance detection threshold value is used in a case of a device in the own BSS. For this reason, when the threshold value (the long-distance detection threshold value) to be compared is not coordinated with the detection level, the packet can be estimated to be a packet from the other BSS. In this case, the reception can be terminated. For example, when the long-distance detection threshold value is used and the RSSI is very large, the reception can be terminated.

Accordingly, here, when the COLOR field is not present in the process classification table illustrated in FIG. 38 and the value of the correlator output is equal to or greater than the decided detection threshold value (a threshold value to be applied), a modification example when a subsequent process is decided to be "reception" is indicated. For example, in this case, when the value of the correlator output is considerably larger than the threshold value to be applied (for example, when the value of the correlator output is larger by a given value or more), a subsequent process can be set to be "reception termination (BUSY)" or "reception termination (IDLE)."

For example, a case in which "Link Strength Category" in the PLCP header does not give the detection threshold value with the highest level and a case in which the value of the correlator output is considerably larger than the decided detection threshold value (the threshold value to be applied) are assumed. For example, when the use physical header is decided based on the classification of two values of the short distance and the long distance, the long-distance detection threshold value is a value by which the detection threshold value with the highest level is not given. In this case, when the value of the correlator output is considerably larger than the threshold value to be applied, the threshold value to be applied and the value of the correlator output are considered to be not coordinated greatly. This state can be inferred as a case in which the packet transmitted from another BSS is detected. Accordingly, in this case, since it is not necessary to perform the reception until all of the packets are received, the reception can be terminated.

For example, when the use physical header is decided based on classification of three values, the detection threshold values are assumed to be a first detection threshold value, a second detection threshold value, and a third detection threshold value in descending order of the detection threshold values. In this case, the second detection threshold value or the third detection threshold value is a value by which the detection threshold value with the highest level is not given. In this case, for example, when the threshold value to be applied is the third detection threshold value and the value of the correlator output exceeds the second detection threshold value, the threshold value to be applied and the value of the correlator output can be determined to be not coordinated greatly. Similarly, for example, when the threshold value to be applied is the second detection threshold value and the value of the correlator output exceeds the first detection threshold value, the threshold value to be applied and the value of the correlator output can be determined to be not coordinated greatly. This state can be inferred as a case in which the packet transmitted from another BSS is detected, as in the above-described case of the two values, and thus the reception can be terminated. In particular, when the threshold value to be applied is the third detection threshold value and the value of the correlator output exceeds the first detection threshold value, a possibility that the packet transmitted from another BSS has been detected is considered to be high.

For example, in a similar way, even in a case in which the use physical header is decided based on classification of four or more values, the reception can be terminated when the packet transmitted from another BSS is estimated to be detected.

Further, "reception termination (IDLE)" or "reception termination (BUSY)" can be decided based on a comparison result obtained by comparing the threshold value to the value of the correlator output. For example, a case in which the value of the correlator output is greater than the decided detection threshold value (the threshold value to be applied) by a given value (for example, 20 or more dB) is set as a non-coordination treatment target. When the value of the correlator output also exceeds a threshold value higher than "Link Strength Category" in the PLCP header by one stage as the non-coordination treatment, "reception termination (BUSY)" can be set. For example, when the use physical header is decided based on the classification of the two values of the short distance and the long distance, a threshold value higher by one stage is a short-distance detection threshold value. Further, when the value of the correlator output does not exceed the threshold value higher than "Link Strength Category" in the PLCP header by one stage as the non-coordination treatment, "reception termination (IDLE)" can be set. For example, when the use physical header is decided based on the classification of the two values of the short distance and the long distance and the value of the correlator output is a value between the short-distance detection threshold value and the long-distance detection threshold value, "reception termination (IDLE)" can be set.

Even when the COLOR information is not present in the SIGNAL field, the process classification may be "reception termination (IDLE)" or "reception termination (BUSY)" according to the intensity of the correlator output and the content of the SIGNAL field. For example, when the format described in the SIGNAL field does not correspond to that of the information processing apparatus, the process classification is normally set to "reception termination (BUSY)." Exceptionally, when the format described in the SIGNAL field does not correspond to the information processing apparatus and the intensity of the correlator output is equal to or less than a predetermined level, the process classification may be set to "reception termination (IDLE)."

When "reception" is decided as the subsequent process (step S808), the control unit 150 of the information processing apparatus 100 continues the reception of the temporarily detected packet to the last (step S809). When the received packet is destined for the information processing apparatus and requires an instant response, a physical header having the same "Link Strength Category" field as a target packet is added and transmitted. That is, a portion in which the information regarding the detection threshold value in the SIGNAL field is stored is set to be the same and information decided by the information processing apparatus is stored in another portion (for example, the MCS, length).

When "reception termination (BUSY)" is decided as the subsequent process (step S808), the control unit 150 of the information processing apparatus 100 terminates the reception of the temporarily detected packet at a physical header end time point and returns the state to the waiting state (step S810). Here, the carrier sense state is treated as BUSY up to the end time point of the packet (step S811). A frame interval (Inter Frame Space (IFS)) before implementation of subsequent transmission is set to Arbitration IFS (AIFS) or Distributed coordination function IFS (DIFS).

When "reception termination (IDLE)" is decided as the subsequent process (step S808), the control unit 150 of the information processing apparatus 100 terminates the reception of the temporarily detected packet at a physical header end time point and returns the state to the waiting state (step S812). Steps S807 to S812 are an example of a first order.

Subsequently, the control unit 150 of the information processing apparatus 100 compares the measured RSSI to the energy detection threshold value ED (step S813). Then, when the measured RSSI is greater than the energy detection threshold value ED (step S813), the control unit 150 of the information processing apparatus 100 maintains the carrier sense state as the BUSY state (step S814). The frame interval (IFS) before implementation of subsequent transmission is set to AIFS or DIFS.

When the measured RSSI is equal to or less than the energy detection threshold value ED (step S813), the control unit 150 of the information processing apparatus 100 causes the carrier sense state to transition to the IDLE state (step S815).

In this way, when the carrier sense state transitions to the IDLE state (steps S815 and S816), the frame interval (IFS) before implementation of subsequent transmission is set to AIFS (step S819). Accordingly, the carrier sense is treated as IDLE retroactively up to the preamble start time (or the physical header start time) of the packet of which the reception is terminated and a process of invalidating the detection is performed (step S820).

Specifically, as in the example shown in FIG. 35, a time length (a time length from the packet detection determination time point by preamble or the start time of the physical header to the current time) in which a physical carrier sense result is BUSY is calculated. Then, a time slot converted value of the time length is subtracted instantly from the backoff counter. By also cancelling the application of the IFS preceding the subsequent carrier sense, subtraction of the backoff counter starts immediately (step S820). Further, when the backoff counter after the subtraction becomes a negative value, for example, the value of a random number generated within a range between 0 and a value equal to or less than the backoff counter value before the subtraction, which is set to 0 and of which the negative value is returned into a positive value so that the absolute value of the negative value is used, as described above, can be set to be the value after the subtraction.

When "reception termination (ERROR)" is decided as the subsequent process (step S808), the control unit 150 of the information processing apparatus 100 terminates the reception of the temporarily detected packet at the physical header end time point and returns the state to the waiting state (step S812).

Subsequently, the control unit 150 of the information processing apparatus 100 compares the measured RSSI to the energy detection threshold value ED (step S813). When the measured RSSI is greater than the energy detection threshold value ED (step S813), the control unit 150 of the information processing apparatus 100 maintains the carrier sense state as the BUSY state (step S814). The packet is treated as a packet for which an error occurs and the frame interval (IFS) before implementation of subsequent transmission is set to Extended IFS (EIFS).

When the measured RSSI is equal to or less than the energy detection threshold value ED (step S813), the control unit 150 of the information processing apparatus 100 causes the carrier sense state to transition to the IDLE state (step S815).

Since "reception termination (ERROR)" is decided as the subsequent process (step S816), the frame interval (IFS) before implementation of subsequent transmission is set to EIFS (step S817). Then, the control unit 150 of the information processing apparatus 100 determines whether the correlator output intensity is less than a minimum detection threshold value (step S818). That is, it is determined whether the correlator output intensity is less than the minimum detection threshold value in "Preamble Detection Threshold" shared in the above-described PLCP header parameter sharing process (step S818).

When the correlator output intensity is less than the minimum detection threshold value (step S818), the process proceeds to step S820. That is, the control unit 150 of the information processing apparatus 100 performs a process of treating the carrier sense as IDLE retroactively up to the preamble start time (or the physical header start time) of the terminated packet and invalidating the detection (step S820). Steps S807, S808, S812, S813, and S815 to S820 are an example of a second order.

In this way, it is possible to further effectively obtain the transmission opportunity by terminating the reception and transitioning the carrier sense state to the IDLE state.

Here, when the IEEE 802.11 standard is assumed, the detection threshold value of the L-STF portion can be set as the "detection threshold value" in the ninth embodiment of the present technology. The detection threshold value of the L-LTF portion may be set instead of the detection threshold value of the L-STF portion, or a detection threshold value common to both of the L-STF portion and the L-LTF portion may be set. By changing the detection threshold values of the L-STF portion and the L-LTF portion independently, extension may be realized so that both of the detection threshold values are designated as the physical header parameters.

In this way, the control unit 150 of the information processing apparatus 100 performs control such that the reception of the packet is terminated halfway according to a first condition. In this case, the control unit 150 of the information processing apparatus 100 can operate in the idle state of the carrier sense during a time from the reception start of the packet to the reception termination of the packet according to a second condition.

For example, a condition that the COLOR information designated in the physical header of the received packet is different from the COLOR information of a network to which the information processing apparatus 100 belongs can be set as the first condition. For example, a condition that the preamble correlator output level of the packet during the reception in antenna input conversion is less than the packet detection threshold value elicited from information described in the physical header of the packet can be set as the first condition. In this case, the control unit 150 can perform the elicitation based on matching of the index described in the physical header of the packet and a table of the threshold value shared in advance.

For example, a condition that a CRC calculation result obtained setting the physical header portion of the received packet as a target is identical to a CRC described in the physical header can be set as the first condition.

For example, a condition that the reception power of the packet during the reception is less than an energy detection threshold value decided in advance can be set as the second condition. For example, a condition that the transmission suppression by the virtual carrier sense is not applied at a time point at which the reception termination of the packet is performed can be set as the second condition.

For example, a condition regarding a CRC calculation result obtained setting the physical header portion of the packet as a target and a preamble correlator output level in the antenna input conversion can be set as the second condition. For example, a condition that the CRC calculation result is not identical to the CRC information described in the physical header and the preamble correlator output level is less than the minimum value among the packet detection threshold values to be applied can be set as the second condition. In this case, the control unit 150 of the information processing apparatus 100 can determine necessity and non-necessity of an operation using the second condition.

For example, when the second condition is not satisfied after the packet reception termination, the control unit 150 of the information processing apparatus 100 may prohibit the transmission from the information processing apparatus 100 during packet transmission duration. However, in this case, when a frame destined for the information processing apparatus 100 and requesting a response is received, the control unit 150 may transmit the response to the frame.

For example, the first condition may be included in the second condition.

For example, when the packet detection condition is satisfied (for example, the value of the correlator output is equal to or greater than the decided detection threshold value), the control unit 150 of the information processing apparatus 100 decides a subsequent process as "reception." However, when the COLOR information is present in the COLOR field and the COLOR information is different from the COLOR information of the network to which the information processing apparatus 100 belongs, the subsequent process is decided as "reception termination (IDLE)." That is, the reception of the packet is terminated and the state returns to the waiting state.

For example, when the packet detection condition is not satisfied (for example, the value of the correlator output is less than the decided detection threshold value), the control unit 150 decides the subsequent process as "reception termination (IDLE)." However, when the COLOR information is present in the COLOR field and the COLOR information is identical to the COLOR information of the network to which the information processing apparatus 100 belongs, the subsequent process is decided as "reception." That is, the process of receiving the packet continues.

10. Tenth Embodiment

In the fourth embodiment of the present technology, the example in which the plurality of preamble sequences are defined has been described. In a tenth embodiment of the present technology, an example in which a plurality of preamble sequences are defined as in the fourth embodiment of the present technology and COLOR information is used together so that selection accuracy is further improved will be described. The configurations of information processing apparatuses according to the tenth embodiment of the present technology are substantially the same as those of the information processing apparatuses 100 to 103, 200, and 201 shown in FIG. 1 and the like. Therefore, the same reference numerals as those according to the first embodiment of the present technology are given to common portions to those according to the first embodiment of the present technology, and the description thereof will be omitted partially.

The tenth embodiment of the present technology is a modification example of the fourth embodiment of the present technology. Therefore, each process and each format according to the tenth embodiment of the present technology are also common portions to those according to the fourth embodiment of the present technology. Therefore, the same reference numerals as those according to the fourth embodiment of the present technology are given to common portions to those according to the fourth embodiment of the present technology, and the description thereof will be omitted partially.

(Example of Format of PPDU)

FIG. 40 is a diagram showing an example of the format of the PPDU exchanged between the apparatuses included in the communication system 10 according to the tenth embodiment of the present technology.

Here, the example shown in FIG. 40 is the same as the example shown in FIG. 21 except that a BSS COLOR field is provided in the SIGNAL field. Therefore, the same reference numerals as those in FIG. 21 are given to common portions to those in FIG. 21, and the description thereof will be omitted partially.

The PPDU is configured to include a preamble 311, SIGNAL 351, Extension 303, Service 304, MPDU 305, and FCS 306.

Here, in the tenth embodiment of the present technology, the "BSS COLOR" field storing information (COLOR information) regarding an identifier of the BSS is provided in a part of the SINGAL field of the physical header. In FIG. 40, the "BSS COLOR" field is indicated as COLOR. BSS COLOR information is the same as the information described in the ninth embodiment of the present technology.

In a and b of FIG. 40, an example which the information processing apparatus (the master station or the slave station) transmitting the physical header belongs to the BSS in which "1" is set as the COLOR information (that is, COLOR=1) is shown.

In this way, in the tenth embodiment of the present technology, the "COLOR" field is provided in a portion treated to be reserved in the SIGNAL 311.

The connection process is the same as that of the first embodiment of the present technology. The orders of the physical header parameter decision process, the physical header parameter sharing process, and the use physical header decision process are the same as those of the ninth embodiment of the present technology.

The transmission and reception process is the same as that of the ninth embodiment of the present technology except for the packet detection and reception determination process (the processing procedure of step S800 shown in FIG. 37). Accordingly, the packet detection and reception determination process will be described with reference to FIGS. 41 and 42.

(Example of Operation of Packet Detection and Reception Determination Process)

FIG. 41 is a diagram showing a relation example (process classification table) between a physical header and a process by the information processing apparatus 100 according to the tenth embodiment of the present technology. The description of FIG. 41 will be made in detail with reference to FIG. 42.

FIG. 42 is a flowchart showing a packet detection and reception determination process in the transmission and reception process (the processing procedure of step S800 shown in FIG. 37) by the information processing apparatus 100 according to the tenth embodiment of the present technology.

First, the control unit 150 of the information processing apparatus 100 performs RSSI measurement on a signal input via the antenna 141 and retains the RSSI requested through the measurement (step S821).

Subsequently, the control unit 150 of the information processing apparatus 100 compares the measured RSSI to the retained application level (L_far and L_near) of each physical header and decides the index of the physical header to be applied to the detection (step S822). For example, as in the selection method of selecting the transmission physical header of the information processing apparatus, the index of the physical header to be applied to the detection can be decided.

For example, the control unit 150 of the information processing apparatus 100 compares the measured RSSI to the value of L_near. When the measured RSSI is greater than L_near, the control unit 150 of the information processing apparatus 100 decides 1 (for a short distance) as the index of the physical header used to detect the correlation of the information processing apparatus. When the measured RSSI is equal to or less than L_near, the control unit 150 of the information processing apparatus 100 decides 0 (for a long distance) as the index of the physical header used to detect the correlation of the information processing apparatus.

Subsequently, the control unit 150 of the information processing apparatus 100 performs correlation calculation of the physical header of the decided index using correlators corresponding to the preamble sequence generated by the different rules, as described above (step S823). Here, the correlator output means the correlation output intensity COL, as in the first embodiment of the present technology. That is, the correlator output is not a normalized correlator output level, but is a correlator output converted by reflecting reception power.

Subsequently, the control unit 150 of the information processing apparatus 100 compares the correlator output of the selected correlator to the detection threshold value of the physical header in the decided index and determines whether the value of the correlator output is greater than the detection threshold value (step S824).

When the value of the correlator output is greater than the detection threshold value (step S824), the control unit 150 of the information processing apparatus 100 decodes the subsequent SIGNAL field in the physical header and reads information or the like in the SIGNAL field (S825). Specifically, each of the "COLOR" field and the CRS of the physical header is read. The control unit 150 of the information processing apparatus 100 decides one of "reception," "reception termination (IDLE)," "reception termination (BUSY)," and "reception termination (ERROR)" as the subsequent process (step S825).

Specifically, the control unit 150 of the information processing apparatus 100 calculates the CRC of the physical header and confirms whether there is an error in the physical header. Here, when there is an error in the physical header, legitimacy of the value of the field may not be confirmed. Therefore, as shown in FIG. 41, when there is an error in the physical header, the subsequent process is decided as "reception termination (ERROR)."

When there is no error in the CRC of the physical header, the process is decided based on the content of the "COLOR" field. That is, when there is no error in the CRC of the physical header, the subsequent process is basically decided as "reception." However, as shown in FIG. 41, when the COLOR field is present and the value of the COLOR field is different from the value of the BSS to which the information processing apparatus belongs, the subsequent process is exceptionally decided as "reception termination (BUSY)." Thus, it is possible to avoid a case in which detection of a desired packet fails due to reception of the packet which is not supposed to be received.

The processing procedure (step S827) when "reception" is decided as the subsequent process corresponds to the processing procedure (step S809) shown in FIG. 39. The processing procedures (steps S828 and S829) when "reception termination (BUSY)" is decided as the subsequent process correspond to the processing procedures (steps S810 and S811) shown in FIG. 39. The processing procedures (steps S830 to S832) when "reception termination (IDLE)" or "reception termination (ERROR)" is decided as the subsequent process correspond to the processing procedures (steps S813 to S815) shown in FIG. 39.

When the value of the correlator output is equal to or less than the detection threshold value (step S824), the process proceeds to step S830. That is, when the value of the correlator output is equal to or less than the detection threshold value (step S824), the subsequent process is not performed and the non-detection state of preamble remains.

11. Eleventh Embodiment

In the ninth embodiment of the present technology, the example in which the physical header parameter decision process is performed has been described. In an eleventh embodiment of the present technology, an example in which the physical header parameter decision process is omitted will be described.

The configurations of information processing apparatuses according to the eleventh embodiment of the present technology are substantially the same as those of the information processing apparatuses 100 to 103, 200, and 201 shown in FIG. 1 and the like. Therefore, the same reference numerals as those according to the first embodiment of the present technology are given to common portions to those according to the first embodiment of the present technology, and the description thereof will be omitted partially.

The eleventh embodiment of the present technology is a modification example of the ninth embodiment of the present technology. Therefore, each process and each format according to the eleventh embodiment of the present technology are also common portions to those according to the ninth embodiment of the present technology. Therefore, the same reference numerals as those according to the ninth embodiment of the present technology are given to common portions to those according to the ninth embodiment of the present technology, and the description thereof will be omitted partially.

(Example of Format of PPDU)

FIG. 43 is a diagram showing an example of the format of the PPDU exchanged between the apparatuses included in the communication system 10 according to the eleventh embodiment of the present technology.

Here, the example shown in FIG. 43 is the same as the example shown in FIG. 31 except that "Requested Detection Level" is provided in the SIGNAL field instead of "Link Strength Category." Therefore, the same reference numerals as those in FIG. 31 are given to common portions to those in FIG. 31, and the description thereof will be omitted partially.

The PPDU is configured to include a preamble 301, SIGNAL 361, Extension 303, Service 304, MPDU 305, and FCS 306.

Here, in the eleventh embodiment of the present technology, a "Requested Detection Level" field and a "BBS COLOR" field storing the COLOR information are provided in parts of the SIGNAL field of the physical header.

In this way, the information processing apparatus can directly designate a signal level desired to be used for detection determination in a destination at the time of transmission by providing the "Requested Detection Level" field in the SIGNAL field of the physical header. Here, a unit and a quantization method for the signal level are assumed to be shared with the destination.

Each information processing apparatus changes the content of the "Requested Detection Level" field according to the quality of a link with the destination.

In this way, in the eleventh embodiment of the present technology, the "Requested Detection Level" field and the "COLOR" field are provided in portions treated to be reserved in the SIGNAL 361. Thus, a specific function according to the eleventh embodiment of the present technology can be realized without disturbing reception of the legacy apparatus.

The information processing apparatus (except for the legacy apparatus) receiving a packet including the "Requested Detection Level" field can acquire the content of the "Requested Detection Level" field. The information processing apparatus can directly use the content of the "Requested Detection Level" field as a detection threshold value to be applied.

The connection process is the same as that of the first embodiment of the present technology. The physical header parameter decision process can be omitted, as described above.

In the eleventh embodiment of the present technology, the exchange of information regarding the detection application threshold value between the master station and the slave station can be omitted. Therefore, the physical header parameter sharing process can be omitted. However, in the eleventh embodiment of the present technology, information regarding the "COLOR" (the BSS identifier in the physical layer) and "TxPower" (transmission power of the master station) is additionally delivered. An example of a frame format used in this case is shown in FIG. 44.

(Example of Format of Beacon Frame)

FIG. 44 is a diagram showing an example of the format of a beacon frame exchanged between the apparatuses included in the communication system 10 according to the eleventh embodiment of the present technology. Since FIG. 44 is a modification example of FIG. 32, the same reference numerals as those in FIG. 32 are given to common portions to those in FIG. 32, and the description thereof will be omitted partially.

In FIG. 44, an example in which "Multi Detect Parameter" 311 is omitted in Payload 340 shown in FIG. 32 is shown. Further, "COLOR Info" 371 and "TxPower Info" 372 correspond to "COLOR Info" 341 and "TxPower Info" 342 shown in FIG. 32.

For example, the control unit of the information processing apparatus 200 transmits a beacon in which each piece of information is stored in "COLOR Info" 371 and "TxPower Info" 372 to surrounding information processing apparatuses to make report.

The information processing apparatus receiving the report by the beacon acquires each piece of information stored in "COLOR Info" 371 and "TxPower Info" 372 from the beacon and retains the information. That is, the information processing apparatus retains the content of each of the BSS identifier in the physical layer and the transmission power of the communication partner (for example, the master station).

When the information included in the subsequent beacon is changed after the retention of the content of the beacon, the information included in the recent beacon (recent information) is adopted and retained.

The master station may be configured to notify of the content of each of the BSS identifier in the physical layer and the transmission power of the information processing apparatus using a signal other than the beacon transmission. For example, the master station may perform the notification with a data frame or a management frame of unicast to the subordinate terminals by setting determination by the information processing apparatus or an information acquisition request from the subordinate terminal as a trigger.

(Example of Operation of use Physical Header Decision Process)

FIG. 45 is a flowchart showing an example of a processing procedure of a use physical header decision process (transmission physical header selection process) by the information processing apparatus 100 according to the eleventh embodiment of the present technology.

First, the control unit 150 of the information processing apparatus 100 monitors the packets received from destinations connected to the information processing apparatus and acquires the RSSI for each destination (step S841). The RSSI (monitoring result (the RSSI measurement result of each destination)) acquired in this way is set to RSSI_peer. In the eleventh embodiment of the present technology, the RSSI information from the master station to which the information processing apparatus 100 is connected can be set to RSSI_peer.

When measurement values of the packets received from the destinations connected with the information processing apparatus are retained, the control unit 150 of the information processing apparatus 100 may read the measurement values and acquire the RSSI of each destination (step S841).

Here, in the case of the information processing apparatus (for example, the information processing apparatus 100) connected to the master station (for example, the information processing apparatus 200), the destination is basically only the master station. In this case, the reception level of the previous beacon may be used as the monitoring result.

Subsequently, the control unit 150 of the information processing apparatus 100 corrects the acquired RSSI_peer in consideration of a transmission power difference (step S842). For example, "TxPower" information (stored in "TxPower Info" 372 shown in FIG. 44) notified of by the master station by the beacon is set to TP_peer. Transmission power used for the transmission from the information processing apparatus 100 to the master station is set to TP_self. In this case, corrected RSSI_adjusted can be obtained by the following expression 13 (which is the same as expression 13 in the ninth embodiment of the present technology).

$$RSSI\_adjusted=RSSI\_peer+(TP\_self-TP\_peer) \quad \text{expression 13}$$

Here, RSSI_adjusted indicates an estimated value of the RSSI expected when the master station side receives a packet transmitted from the information processing apparatus 100. However, when information corresponding to TP_peer may not be obtained, RSSI_adjusted may be substituted with RSSI_peer.

Subsequently, the control unit 150 of the information processing apparatus 100 converts RSSI_adjusted into an application desired detection level L_req using the following expression 15. Here, expression 15 is description on the assumption of calculation of logarithm (dB).
L_req=RSSI_adjusted+O Here, O is an offset amount of a margin with respect to a preamble detection error caused due to a change in the reception level. For example, O can be set to be in the range of about −10 dB to about −20 dB.

The value of the application desired detection level L_req obtained in this way is quantized in predetermined units shared in advance and is stored in the "Requested Detection Level" field 361 (a portion of "xx" shown in FIG. 43).

In FIG. 45, the example in which the RSSI is used is shown, but the correlation output intensity COL may be used instead of the RSSI.

(Example of Operation of Transmission and Reception Process)

The transmission and reception process is substantially the same as that of the ninth embodiment of the present technology and is different only in the process classification table of the physical header after the temporary detection.

Accordingly, an example of the process classification table used in the eleventh embodiment of the present technology is shown in FIG. 46.

FIG. 46 is a diagram showing a relation example (process classification table) between a physical header and a process by the information processing apparatus 100 according to the eleventh embodiment of the present technology.

In the ninth embodiment of the present technology, an example in which an application detection threshold value is acquired from a threshold value list retained in advance using "Link Strength Category" has been described. On the other hand, in the eleventh embodiment of the present technology, a detection threshold value to be applied is directly described in the "Requested Detection Level" field. Therefore, in the eleventh embodiment of the present technology, the detection threshold value (the application desired detection level L_req) described in the "Requested Detection Level" field can be used without change.

In this way, the detection threshold value to be applied in the process classification table in the eleventh embodiment of the present technology is different from that of the process classification table (shown in FIG. 38) in the ninth embodiment of the present technology. Since the other processes are the same as those of the ninth embodiment of the present technology, the description thereof will be omitted herein.

12. Twelfth Embodiment

In the first embodiment of the present technology, the example in which the Link Strength Category field is provided in the SIGNAL field of the IEEE 802.11 standard has been described.

In a twelfth embodiment of the present technology, an example in which the Link Strength Category field is not provided in the SIGNAL field of the IEEE 802.11 standard but a field in which the information regarding the identifier of the BSS is stored is provided will be described.

In the twelfth embodiment of the present technology, an example in which the packet is selected with only the identifier of the BSS will be described. Further, the configuration of the information processing apparatus according to the twelfth embodiment of the present technology is substantially the same as the information processing apparatuses 100 to 103, 200, and 201 illustrated in FIG. 1 and the like. Therefore, the same reference numerals as those according to the first embodiment of the present technology are given to common portions to those according to the first embodiment of the present technology, and the description thereof will be partially omitted.

Some process and some format according to the twelfth embodiment of the present technology are also common to those of the first embodiment of the present technology. Therefore, the same reference numerals as those according to the first embodiment of the present technology are given to common portions to those according to the first embodiment of the present technology, and the description thereof will be partially omitted.

(Example of Format of PPDU)

FIG. 47 is a diagram showing an example of the format of a PPDU exchanged between the apparatuses included in the communication system 10 according to a twelfth embodiment of the present technology.

Here, the example illustrated in FIG. 47 is the same as the example illustrated in FIG. 7 except that a BSS COLOR field is provided in the SIGNAL field instead of the Link Strength Category field. Accordingly, the same reference numerals as those in FIG. 7 are given to common portions to those in FIG. 7, and the description thereof will be partially omitted.

The PPDU includes Preamble 301, SIGNAL 381, Extension 303, Service 304, MPDU 305, and FCS 306.

In the twelfth embodiment of the present technology, the "BSS COLOR" field in which information (COLOR information) regarding the identifier of the BSS is stored is provided in a part of the SIGNAL field of the physical header. In FIG. 47, the "BSS COLOR" field is indicated as COLOR.

An example in which the information processing apparatus (the master station or the slave station) transmitting the physical header belongs to the BSS in which "1" is set as the COLOR information (that is, COLOR=1) is illustrated in a of FIG. 47. Here, b of FIG. 47 corresponds to c of FIG. 7.

Thus, in the twelfth embodiment of the present technology, the "COLOR" field is provided in the SIGNAL 311. When a portion treated to be reserved is present in the SIGNAL field of a known format, the COLOR field is stored in this portion, so that a specific function in the twelfth embodiment of the present technology can be realized without disturbing reception of the legacy apparatus. When the format of the SIGNAL field is newly defined, the COLOR information is stored in this portion.

The information processing apparatus (except for the legacy apparatus) receiving the packet including the COLOR field can acquire the content of the COLOR field. Then, the information processing apparatus can change the reception operation and the detection threshold value to be applied based on the content of the COLOR field.

(Example of Connection Process)

The connection process is the same as that of the first embodiment of the present technology.

(Example of Operation of Physical Header Parameter Decision Process)

FIG. 48 is a flowchart showing an example of a processing procedure of a physical header parameter decision process by the information processing apparatus 200 according to the twelfth embodiment of the present technology.

When connection is established, the control unit of the information processing apparatus 200 generates the physical header parameters (for example, each detection threshold value of the physical header) used by the information processing apparatus and the subordinate terminals in the own BSS (updates the physical header parameters when the physical header parameters are already present). A difference in the physical header in the twelfth embodiment of the present technology specifically means a difference in which the BSS identifier information (the COLOR information) in the physical header matches or does not match the information belonging to the information processing apparatus.

First, the control unit of the information processing apparatus 200 monitors the packets (step S841). Further, the control unit of the information processing apparatus 200 acquires information regarding communication quality with each subordinate information processing apparatus in the own BSS and information regarding communication quality of the packets from another BSS (OBSS) (step S841).

Here, an example in which the RSSI or the correlation output intensity of the PLCP preamble is used as an index of the communication quality will be described. The correlation output intensity is not a correlator output in which power is normalized, but is assumed to represent an absolute level obtained by multiplying the correlator output by a Received Signal Strength Indicator (RSSI). That is, the correlation output intensity means a correlator output corrected in antenna input conversion. When a reception history is present in a relatively close time, a record of the correlation output intensity at that time may be appropriated. At the time of the monitoring, the detection threshold value may be lowered temporarily so that sample can be collected more reliably.

Subsequently, the control unit of the information processing apparatus 200 classifies the communication quality of the packet received from each subordinate information processing apparatus of the own BSS and the communication quality of the packet received from the other BSS (OBSS) (step S842). Further, the control unit of the information processing apparatus 200 extracts a minimum correlation output intensity regarding the own BSS and a maximum correlation output intensity regarding the OBSS (step S842).

Here, the minimum correlation output intensity regarding the own BSS means a minimum correlation output intensity of the packet of which the BSS identifier (the BSSID in the MAC header or the BSS COLOR information in the physical header) is the same as that of the BSS to which the own information processing apparatus belongs, and is assumed to be COL_self. Further, the maximum correlation output intensity regarding the OBSS means a maximum correlation output intensity of the packet of which the BSS identifier (the BSSID in the MAC header or the BSS COLOR information in the physical header) is different from that of the BSS to which the own information processing apparatus belongs, and is assumed to be COL_other.

COL in which there is no packet sample of a corresponding condition is assumed to be substituted with PD_default. Here, PD_default indicates a reference level of the preamble detection used by the legacy apparatus. In the IEEE 802.11 standard, a value of −82 dBm for the bandwidth of 20 MHz is referred to as a criterion value.

Subsequently, the control unit of the information processing apparatus 200 decides a detection threshold value PD_self for the physical header indicating the own BSS and a detection threshold value PD_other for the physical header indicating the OBSS based on each of the extracted correlation output intensities (step S843). For example, the detection threshold value PD_self and the detection threshold value PD_other can be decided within a range in which the relation of the following expressions 16, 17, and 18 is established. The decision of PD_self may be omitted. In this case, PD_self is replaced with PD_default.

PD_self<COL_self

PD_other>COL_other

PD_other<COL_self

In this case, when PD_other simultaneously satisfying expression 17 and 18 is not present, expression 18 is prioritized.

PD_other may be individually decided for each subordinate information processing apparatus. An index of the information processing apparatus is assumed to be n and PD_other to be used by an n-th subordinate information processing apparatus is assumed to be PD_other(n). The control unit of the information processing apparatus 200 classifies the packet transmitted from each subordinate information processing apparatus in the own BSS for each transmission source in the above-described monitoring result. When each minimum correlation output intensity obtained from the packet from the n-th subordinate information processing apparatus is assumed to be COL_self(n), PD_other(n) is decided so that the following expression 19 is satisfied.

PD_other(n)<COL_self(n)

Even when PD_other(n) is individually set, PD_other(n) may not necessarily be designated for all of the subordinate apparatuses. In this case, common PD_other to be used by the apparatuses in which PD_other(n) is not individually designated is additionally decided.

Here, an example of a carrier sense detection range of each information processing apparatus set based on the detection threshold value PD_self and the detection threshold value PD_other(n) will be described. Here, the examples of the carrier sense detection ranges of the information processing apparatuses 100, 102, 200, and 201 will be described with reference to FIGS. 12 and 13.

As described above, in FIG. 12, the carrier sense detection ranges 31 to 34 of the information processing apparatuses 100 and 102 are schematically indicated by dotted circles. In FIG. 13, the carrier sense detection ranges 41 to 44 of the information processing apparatuses 200 and 201 are schematically indicated by dotted circles.

For example, in FIG. 12, the carrier sense detection range 31 corresponds to the carrier sense detection range of the information processing apparatus 100 set based on the detection threshold value PD_self for the physical header indicating the own BSS of the information processing apparatus 100. Further, the carrier sense detection range 33 corresponds to the carrier sense detection range of the information processing apparatus 100 set based on the detection threshold value PD_other(n) for the physical header indicating the OBSS of the information processing apparatus 100.

In FIG. 12, the carrier sense detection range 32 indicates the carrier sense detection range of the information processing apparatus 102 set based on the detection threshold value PD_self for the physical header indicating the own BSS of the information processing apparatus 102. Further, the carrier sense detection range 34 corresponds to the carrier sense detection range of the information processing apparatus 102 set based on the detection threshold value PD_other(n) for the physical header indicating the OBSS of the information processing apparatus 102.

In FIG. 13, the carrier sense detection range 41 corresponds to the carrier sense detection range of the information processing apparatus 200 set based on the detection threshold value PD_self for the physical header indicating the own BSS of the information processing apparatus 200. Further, the carrier sense detection range 43 corresponds to the carrier sense detection range of the information processing apparatus 200 set based on the detection threshold value PD_other(n) for the physical header indicating the OBSS of the information processing apparatus 200.

In FIG. 13, the carrier sense detection range 42 indicates the carrier sense detection range of the information processing apparatus 201 set based on the detection threshold value PD_self for the physical header indicating the own BSS of the information processing apparatus 201. Further, the carrier sense detection range 44 corresponds to the carrier sense detection range of the information processing apparatus 201 set based on the detection threshold value PD_other(n) for the physical header indicating the OBSS of the information processing apparatus 201.

The monitoring and the decision of the set values illustrated in FIG. 48 may be performed for each given time or may be performed whenever connection of a new subordinate apparatus is detected, and the set values may be updated in order.

(Example of Physical Header Parameter Sharing Process)

The procedure of the physical header parameter sharing process is the same as that according to the first embodiment of the present technology. However, in the twelfth embodiment of the present technology, the physical header parameters are the detection threshold values (the detection threshold value PD_self of the own BSS physical header and the OBSS physical header detection threshold value PD_other) of each physical header. An example of a frame format used in this case is illustrated in FIG. 49.

(Example of Format of Beacon Frame)

FIG. 49 is a diagram showing an example of the format of a beacon frame exchanged between the apparatuses included in the communication system 10 according to the twelfth embodiment of the present technology. Since FIG. 49 is a modification example of FIG. 14, the description of common portions to those of FIG. 14 will be partially omitted.

In FIG. 49, an example in which an element "Multi Detect Parameter" 391 and the "COLOR Info" 392 are newly added to Payload 390 is shown.

In the "Multi Detect Parameter" 391, three fields 393 to 395 are provided.

In the Preamble Detection Threshold for Packets of This BSS 393, the detection threshold value PD_self of the own BSS physical header is stored. In the Preamble Detection Threshold for Packets of OBSS 394, the detection threshold value PD_other of the OBSS physical header is stored. However, it is necessary to store the detection threshold value PD_other of the OBSS physical header, but the detection threshold value of the own BSS physical header may not be stored. Thus, when the detection threshold value of the own BSS physical header is not stored, each information processing apparatus can replace the detection threshold value in a manner that PD_self=PD_default. When PD_other is individually decided for each subordinate information processing apparatus in the above-described physical header parameter decision process (that is, when each PD_other(n) is decided), all of the information regarding PD_other(n) is stored in this field along with information specifying the corresponding subordinate apparatus. When PD_other(n) is not designated for all of the subordinate apparatuses, information regarding PD_other used commonly by the undesignated apparatuses is also stored.

In the Allow No Color Filtering 395, information indicating whether to permit the reception termination is stored for the packet that does not include the BSS COLOR. For example, whether to permit the reception termination can be set according to an apparatus connected to the information processing apparatus 200. For example, when no apparatus (for example, a legacy apparatus) that may not add the COLOR information is subordinated by the information processing apparatus 100, the control unit of the information processing apparatus 200 can perform the setting such that the reception termination is permitted.

When the information stored in the Allow No Color Filtering 395 can be replaced with another field, the information may be substituted with the other field. In this way, when the information is replaced with the other field, the information to be stored in the Allow No Color Filtering 395 may not be stored in the "Multi Detection Parameter."

The BSS identifier in the physical layer is stored in the "COLOR Info" 392. The BSS identifier corresponds to the BSS identifier stored in the "BSS COLOR" field illustrated in FIG. 47.

For example, the control unit of the information processing apparatus 200 transmits the beacon in which each piece of information is stored in the "Multi Detect Parameter" 391 and the "COLOR Info" 392 to the surrounding information processing apparatuses as an announcement.

The information processing apparatus receiving the announcement by the beacon acquires each piece of information stored in the "Multi Detect Parameter" 391 and the "COLOR Info" 392 from the beacon to retain each piece of information. That is, the information processing apparatus retains the content of each of the "Multi Detect Parameter" and the BSS identifier in the physical layer. Here, when PD_other to be used by the information processing apparatus is individually designated, PD_other(n) corresponding to the own information processing apparatus is assumed to be retained as the value of PD_other. When PD_other is not individually designated, the value of PD_other used commonly by the subordinate apparatuses is retained.

When the content of the beacon is retained and information included in a subsequent beacon is then changed, information (latest information) included in the latest beacon is adopted and retained.

The master station may notify of the content of each of the "Multi Detect Parameter" and the BSS identifier in the physical layer using a signal other than the transmission of the beacon. For example, the master station may perform the notification with a unicast data frame or management frame for the subordinate terminal using the determination by the information processing apparatus or an information acquisition request from the subordinate terminal as a trigger.

(Example of use Physical Header Decision Process)

In the twelfth embodiment of the present technology, the BSS COLOR information used in the own BSS is added to the physical header. The PLCP header is not changed according to a link state. Further, the use physical header decision process is performed similarly in both of an uplink and a downlink.

(Example of Transmission and Reception Process)

The procedure of a transmission and reception process according to the twelfth embodiment of the present technology is the same as that of the ninth embodiment of the present technology (the transmission and reception process illustrated in FIG. 37). For example, both of the master station side and the slave station side can similarly perform the transmission and reception process illustrated in FIG. 37. For example, both of the master station side and the slave station side are assumed to perform the packet detection and reception determination process basically for a time other than the duration of the transmission and reception.

(Example of Operation of Packet Detection and Reception Determination Process)

The packet detection and reception determination process according to the twelfth embodiment of the present technology is basically the same as that according to the ninth embodiment of the present technology (the example of the operation illustrated in FIG. 39). However, the process classification table to be referred to is different.

FIG. 50 is a diagram showing a relation example (process classification table) between a physical header and a process performed by the information processing apparatus 100 according to the twelfth embodiment of the present technology. FIG. 50 will be described in detail with reference to FIG. 39.

As illustrated in FIG. 39, each of the master station and the slave station corresponding to each function in the twelfth embodiment of the present technology monitors the measurement of the RSSI and the correlator output in regard to a signal input via the antenna during a waiting state (step S801).

Subsequently, the control unit 150 of the information processing apparatus 100 performs the correlation calculation of the preamble pattern and compares the output (the correlator output) to the temporary detection threshold value (step S802). Here, the temporary detection threshold value is a detection threshold value for reading the SIGNAL field prior to the determination process. For example, a value equal to or less than both of PD_self and PD_other can be used as the temporary detection threshold value. For example, PD_default may be used as the temporary detection threshold value.

The "correlator output" mentioned herein means the above-described correlation output intensity COL and is a correlator output that is converted by reflecting reception power rather than the normalized correlator output level.

When the value of the correlator output is greater than the temporary detection threshold value (step S802), the control unit 150 of the information processing apparatus 100 determines that detection state is the temporary detection state and transitions the carrier sense state to the carrier sense BUSY state (step S806). Subsequently, the control unit 150 of the information processing apparatus 100 decodes the subsequent SIGNAL field in the physical header and reads information or the like in the SIGNAL field (step S807). Specifically, each of the "COLOR" field and the CRC of the physical header is read.

The control unit 150 of the information processing apparatus 100 collates each piece of read information and the process classification table shown in FIG. 50 and decides a subsequent process (step S807).

Specifically, the control unit 150 of the information processing apparatus 100 calculates the CRC of the physical header and confirms whether there is an error in the physical header. Here, when there is an error in the physical header, legitimacy of the value of the field may not be confirmed. Therefore, as shown in FIG. 50, when there is an error in the physical header, the subsequent process is decided to be "reception termination (ERROR)." Conversely, when there is no error in the CRC of the physical header, the process is decided based on the content of each of the "COLOR" field and each piece of information shared in the physical header parameter sharing process.

Specifically, when the COLOR information in the physical header is identical to the COLOR information of the own BSS, a subsequent process is decided to be "reception."

When the COLOR information in the physical header is different from the COLOR information of the own BSS, the control unit 150 of the information processing apparatus 100 compares the decided detection threshold value to the value of the correlator output.

When the COLOR information in the physical header is different from the COLOR information of the own BSS and the value of the correlator output is lower with reference to the detection threshold value PD_other for the physical header indicating the OBSS, the subsequent process is set to be "reception termination (IDLE)."

When the COLOR information in the physical header is different from the COLOR information of the own BSS and the value of the correlator output is higher with reference to the detection threshold value PD_other for the physical header indicating the OBSS, the subsequent process is set to be "reception termination (BUSY)."

When the value of the correlator output is lower with reference to the detection threshold value PD_other, the value of the correlator output is meant to be equal to or less than the detection threshold value PD_other or to be less than the detection threshold value PD_other. When the value of the correlator output is higher with reference to the detection threshold value PD_other, the value of the correlator output is meant to be equal to or greater than the detection threshold value PD_other or to be greater than the detection threshold value PD_other. However, when the case in which the value of the correlator output is lower with reference to the detection threshold value PD_other is assumed to be the case in which the value of the correlator output is equal to or less than the detection threshold value PD_other, the case in which the value of the correlator output is higher with reference to the detection threshold value PD_other is assumed to be the case in which the value of the correlator output is greater than the detection threshold value PD_other. Similarly, when the case in which the value of the correlator output is lower with reference to the detection threshold value PD_other is assumed to be the case in which the value of the correlator output is less than the detection threshold value PD_other, the case in which the value of the correlator output is higher with reference to the detection threshold value PD_other is assumed to be the case in which the value of the correlator output is equal to or greater than the detection threshold value PD_other.

When the COLOR information in the physical header is not present, the subsequent process is basically assumed to be "reception." Exceptionally, the same determination as that of the above-described COLOR difference is performed only when the reception termination of the packet in which the COLOR information is not included is permitted in the BSS. Whether the reception termination is permitted can be determined based on the information stored in the Allow No Color Filtering 395 illustrated in FIG. 49.

Since the other processes are the same as those according to the ninth embodiment of the present technology, the description thereof will be omitted herein.

As described above, for example, a condition that the preamble correlator output level of the packet during the reception in antenna input conversion is less than the packet detection threshold value elicited from information described in the physical header of the packet can be set as a first condition. In this case, the control unit 150 can perform the elicitation through conversion based on the value described in the physical header of the packet and information regarding the quantization and the unit shared in advance.

In the embodiments of the present technology, the communication systems including the access points (the information processing apparatuses 200 and 201) has been described as the example, but an embodiment of the present technology can also be applied to a communication system not including an access point. The communication system not including the access point is, for example, a mesh network or an ad-hoc network.

For example, when the quality of a link with another information processing apparatus not connected to the information processing apparatus is confirmed, a packet detection condition (the detection threshold value of the PLCP) for which a condition is most relaxed may be used a period of time in which a response is expected.

Here, when the number of slave stations increases in a CSMACA network, a situation in which excessive transmission suppression may occur and transmission efficiency of the entire system may deteriorate in the carrier sense scheme may occur. Accordingly, there is a method of increasing transmission opportunities by increasing detection threshold value of the carrier sense. However, when a terminal on the reception side receives an unrelated packet earlier despite an increase in the transmission opportunities on a transmission side, reception opportunities may lost. Therefore, it is necessary for a reception side to appropriately increase the detection threshold value.

However, for an information processing apparatus (for example, an access point) for which a plurality of connection partners asynchronously transmitting packets to the information processing apparatus are simultaneously present, it is assumed that it is difficult to optimally set the detection threshold value in advance. For example, when the threshold value is normally set to be high, a service area may be narrowed, and thus there is a concern that communication may not be appropriately performed with some of the plurality of connection partners.

Accordingly, in an embodiment of the present technology, a plurality of physical headers used properly according to attenuation with a destination are defined and different detection threshold values corresponding to the physical headers are prepared. Thus, it is possible to appropriately change a detection operation according to a communication partner. That is, according to an embodiment of the present technology, it is possible to avoid excessive transmission suppression as necessary, increase both of transmission opportunities and reception opportunities, and thus improve use efficiency of radio resources. In other words, radio resources can be efficiently used for channel access of wireless transmission.

13. Application Example

The technology according to the disclosure can be applied to various products. For example, the information processing apparatuses 100 to 104, 200, and 201 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the information processing apparatuses 100 to 104, 200, and 201 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the information processing apparatuses 100 to 104, 200, and 201 may be wireless communication modules mounted in such terminals (for example, integrated circuit modules configured by one die).

On the other hand, for example, the information processing apparatuses 200 and 201 may be realized as a wireless LAN access point (also referred to as a wireless base station) which has a router function or does not have a router function. The information processing apparatuses 200 and 201 may be realized as a mobile wireless LAN router. The information processing apparatuses 200 and 201 may also be a wireless communication module (for example, an integrated circuit module configured with one die) mounted on the device.

13-1. First Application Example

FIG. 51 is a block diagram showing an example of a schematic configuration of a smartphone 900 to which an embodiment of the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct. Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 51. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 51 via power supply lines partially indicated by dashed lines in the drawing. The auxiliary controller 919 causes, for example, minimum necessary functions of the smartphone 900 to be operated in a sleep mode.

In the smparthone 900 shown in FIG. 51, the control unit 150 described with reference to FIG. 5 may be mounted on the wireless communication interface 913. At least some of the functions may be mounted on the processor 901 or the auxiliary controller 919. For example, power consumption of the battery 918 can be reduced through efficient use of wireless resources by the grouping.

Note that the smartphone 900 may operate as a wireless access point (software AP) as the processor 901 executes the function of an access point at an application level. In addition, the wireless communication interface 913 may have the function of a wireless access point.

13-2. Second Application Example

FIG. 52 is a block diagram showing an example of a schematic configuration of a car navigation device 920 to which an embodiment of the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not shown to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 52. In this case, the antenna switch 934 may be omitted from the configuration of the car navigation device 920.

The battery 938 supplies electric power to each of the blocks of the car navigation device 920 shown in FIG. 52 via power supply lines partially indicated by dashed lines in the drawing. In addition, the battery 938 accumulates electric power supplied from the vehicle.

In the car navigation device 920 shown in FIG. 52, the control unit 150 described with reference to FIG. 5 may be mounted in the wireless communication interface 933. At least some of the functions may be mounted on the processor 921.

The wireless communication interface 933 may operate as the above-described information processing apparatus 100 to supply wireless connection to a terminal owned by a user boarding a vehicle.

An embodiment of the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

13-3. Third Application Example

FIG. 53 is a block diagram showing an example of a schematic configuration of a wireless access point 950 to which an embodiment of the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 53, the control unit 150 described with reference to FIG. 5 may be mounted in the wireless communication interface 963. At least some of the functions may be mounted on the controller 951.

The above-described embodiments are examples for embodying the present technology, and matters in the embodiments each have a corresponding relationship with subject matter in the claims. Likewise, the matters in the embodiments and the subject matter in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a sequence of sequences or may be handled as a program for causing a computer to execute the sequence of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
An information processing apparatus including:
a control unit configured to perform control in a manner that one physical header is selected from a plurality of physical header candidates and is used for a packet to be transmitted.

(2)
The information processing apparatus according to (1), wherein the physical header is a PLCP preamble, and
wherein the control unit selects one PLCP preamble sequence from a plurality of PLCP preamble sequences and is used for the packet.

(3)
The information processing apparatus according to (2), wherein the plurality of PLCP preamble sequences are generated by different rules.

(4)
The information processing apparatus according to (2) or (3), wherein the plurality of PLCP preamble sequences include a first PLCP preamble sequence generated by a predetermined rule and a second PLCP preamble sequence generated by thinning part of content of the first PLCP preamble sequence or performing positive or negative inversion.

(5)
The information processing apparatus according to (1), wherein the control unit sets pieces of information stored in a specific field disposed after a PLCP preamble as the physical header candidates, selects one piece of information from the pieces of information, and stores the selected information in the specific field in the packet.

(6)
The information processing apparatus according to (5), wherein the control unit stores, in the specific field, an identifier for identifying a network to which the information processing apparatus belongs.

(7)
The information processing apparatus according to any one of (1) to (6), wherein the control unit sets pieces of information for setting a packet detection condition for detecting the packet as the physical header candidates, and selects information for which the condition is most relaxed from the pieces of information and uses the selected information for the packet until a connection process with an information processing apparatus which is a destination of the packet is completed.

(8)
The information processing apparatus according to any one of (1) to (7), wherein the control unit selects one physical header from the plurality of physical header candidates on the basis of capability usable by an information processing apparatus which is a destination of the packet.

(9)
The information processing apparatus according to any one of (1) to (7), wherein the control unit selects one physical header from the plurality of physical header candidates on the basis of communication quality of communication with an information processing apparatus which is a destination of the packet.

(10)
The information processing apparatus according to any one of (1) to (7), wherein the control unit selects one physical header from the plurality of physical header candidates on the basis of report information transmitted from another information processing apparatus.

(11)

The information processing apparatus according to any one of (1) to (7), wherein the control unit selects one physical header from the plurality of physical header candidates on the basis of notification information transmitted from another information processing apparatus to the information processing apparatus.

(12)

The information processing apparatus according to (1) to (11), wherein at least one of the plurality of physical header candidates has a format in conformity to an IEEE 802.11a standard, an IEEE 802.11b standard, an IEEE 802.11g standard, an IEEE 802.11n standard, or an IEEE 802.11ac standard.

(13)

The information processing apparatus according to any one of (1) to (12), wherein the control unit selects and uses modulation and channel coding by which an information processing apparatus which is a destination of the packet is able to perform reception at a high probability on the basis of a detection threshold value corresponding to the selected physical header candidate.

(14)

The information processing apparatus according to any one of (1) to (13), wherein the control unit decides a selection condition for selecting one physical header from the plurality of physical header candidates and a packet detection condition corresponding to each physical header, on the basis of communication quality of communication with another information processing apparatus.

(15)

The information processing apparatus according to (14), wherein the control unit performs control in a manner that the selection condition and the packet detection condition are transmitted to the another information processing apparatus using wireless communication.

(16)

The information processing apparatus according to (14), wherein the control unit decides the selection condition based on capability usable by the another information processing apparatus and capability usable by the information processing apparatus.

(17)

The information processing apparatus according to any one of (1) to (13), wherein the control unit decides a selection condition for selecting one physical header from the plurality of physical header candidates on the basis of communication quality of communication with another information processing apparatus.

(18)

The information processing apparatus according to (15), wherein the control unit includes the selection condition and the packet detection condition in report information and transmits the report information to the another information processing apparatus.

(19)

The information processing apparatus according to (15), wherein the control unit includes the selection condition and the packet detection condition in transmission signals separately transmitted to the another information processing apparatus and transmits the transmission signals.

(20)

An information processing method including:
selecting one physical header from a plurality of physical header candidates and using the physical header for a packet to be transmitted.

(21)

An electronic device comprising: circuitry configured to perform control in a manner that a Physical Layer Convergence Protocol (PLCP) header format is selected from a plurality of PLCP header formats; and append the selected PLCP header to a physical layer packet for transmission.

(22)

The electronic device of (21), wherein the PLCP header format includes a PLCP preamble, and the circuitry is configured to select one PLCP preamble sequence from a plurality of PLCP preamble sequences.

(23)

The electronic device of (22), wherein the plurality of PLCP preamble sequences are generated by different rules.

(24)

The electronic device of any of (22) to (23), wherein the plurality of PLCP preamble sequences include a first PLCP preamble sequence generated by a predetermined rule and a second PLCP preamble sequence generated by thinning at least part of content of the first PLCP preamble sequence or performing positive or negative inversion on at least a part of the first PLCP preamble sequence.

(25)

The electronic device of any of (21) to (24), wherein the circuitry is configured to: select one piece of information from a set of pieces of information to be included in a field disposed after a PLCP preamble in the PLCP header format; and include the selected information in the field for transmission of the packet.

(26)

The electronic device of (25), wherein the circuitry is configured to include, in the field, an identifier for identifying a network to which the electronic device belongs.

(27)

The electronic device of any of (21) to (26), wherein the circuitry is configured to: identify pieces of information for setting a packet detection condition for detecting the packet as the plurality of PLCP header formats; select information for which a threshold for detecting the packet is the lowest from the pieces of information; and control transmitting the packet including the selected information until a connection process with another electronic device that is a destination of the packet is completed.

(28)

The electronic device of any of (21) to (27), wherein the circuitry is configured to select the PLCP header format from the plurality of PLCP header formats based on a capability of another electronic device that is a destination of the packet.

(29)

The electronic device of any of (21) to (28), wherein the circuitry is configured to select the PLCP header format from the plurality of PLCP header formats based on a quality of communication with another electronic device that is a destination of the packet.

(30)

The electronic device of any of (21) to (29), wherein the circuitry is configured to select the PLCP header format from the plurality of PLCP header formats based on report information transmitted from another electronic device.

(31)

The electronic device of any of (21) to (30), wherein the circuitry is configured to select the PLCP header format from the plurality of PLCP header formats based on notification information transmitted from another electronic device to the electronic device.

(32)

The electronic device of any of (21) to (31), wherein at least one of the plurality of plurality of PLCP header formats has a format in conformity to an IEEE 802.11a standard, an IEEE 802.11b standard, an IEEE 802.11g standard, an IEEE 802.11n standard, or an IEEE 802.11ac standard.

(33)

The electronic device of any of (21) to (32), wherein the circuitry is configured to select and apply modulation and channel coding by which another electronic device that is a destination of the packet is able to perform reception at a high probability based on a detection threshold value corresponding to the selected PLCP header.

(34)

The electronic device of any of (21) to (33), wherein the circuitry is configured to determine a selection condition for selecting the PLCP header format from the plurality of PLCP header formats and a packet detection condition corresponding to each PLCP header based on a quality of communication with another electronic device.

(35)

The electronic device of (34), wherein the circuitry is configured to control transmitting the selection condition and the packet detection condition to the another electronic device via wireless communication.

(36)

The electronic device of any of (21) to (34), wherein the circuitry is configured to determine the selection condition based on a capability of the another electronic device and a capability of the electronic device.

(37)

The electronic device of any of (21) to (36), wherein the circuitry is configured to determine a selection condition for selecting the PLCP header format from the plurality of PLCP header formats based on a quality of communication with another electronic device.

(38)

The electronic device of (35), wherein the circuitry is configured to include the selection condition and the packet detection condition in report information and transmit the report information to the another information processing apparatus.

(39)

The electronic device of (35), wherein the circuitry is configured to control transmitting the selection condition and the packet detection condition in separate transmission signals to the another electronic device.

(40)

A method including: selecting a Physical Layer Convergence Protocol (PLCP) header format from a plurality of PLCP header formats; and appending the selected PLCP header to a physical layer packet for transmission.

The invention claimed is:

1. An information processing apparatus comprising: circuitry configured to:
set a first COLOR information for identifying a first network to which the information processing apparatus belongs in a SIGNAL field of a first Physical Layer Convergence Protocol (PLCP) header of the IEEE 802.11 standard;
transmit a first packet including the first COLOR information to a first device belonging to the first network;
detect a portion of a second packet and enter a carrier sense busy state, the portion including only a subpart of the second packet that includes a second PLCP header and a second COLOR information included in the second PLCP header of the second packet;
determine whether the detected portion of the second packet is received from the first network or from a second network based on the second COLOR information in the second packet;
in response to the second packet being determined to be from the first network, detect a remaining portion of the second packet; and
in response to the second packet being determined to be from the second network and a detected strength of a signal including the second packet is lower than a detection threshold, cancel reception of signals and enter a carrier sense idle state; and
in response to the second packet being determined to be from the second network and the detected strength of the signal is greater than or equal to the detection threshold, cancel reception of signals and retain the carrier sense busy state.

2. The information processing apparatus of claim 1, wherein the first PLCP header includes a PLCP preamble sequence, the circuitry is further configured to select the PLCP preamble sequence from a plurality of PLCP preamble sequences.

3. The information processing apparatus of claim 2, wherein the plurality of PLCP preamble sequences are generated by different rules.

4. The information processing apparatus of claim 2, wherein the plurality of PLCP preamble sequences include a first PLCP preamble sequence generated by a predetermined rule and a second PLCP preamble sequence generated by thinning or performing positive or negative inversion on at least a part of the first PLCP preamble sequence.

5. The information processing apparatus of claim 1, wherein the circuitry is further configured to:
select one piece of information from a set of pieces of information to be included in the SIGNAL field disposed after a PLCP preamble sequence in the first PLCP header; and
include the selected one piece of information in the SIGNAL field for transmission of the first packet.

6. The information processing apparatus of claim 1, wherein the circuitry is further configured to:
identify pieces of information for setting a packet detection condition for detecting a packet;
select information for which the detection threshold is the lowest from the pieces of information; and
control transmitting the first packet including the selected information until a connection process with another information processing apparatus that is a destination of the first packet is completed.

7. The information processing apparatus of claim 1, wherein the circuitry is further configured to select the first PLCP header from the a plurality of physical header formats based on a capability of another information processing apparatus that is a destination of a packet.

8. The information processing apparatus of claim 1, wherein the circuitry is further configured to select the first PLCP header from a plurality of physical header formats based on a quality of communication with another information processing apparatus that is a destination of a packet.

9. The information processing apparatus of claim 1, wherein the circuitry is further configured to select the first PLCP header from the a plurality of physical header formats based on report information transmitted from another information processing apparatus.

10. The information processing apparatus of claim 1, wherein the circuitry is configured to
select the first PLCP header from the a plurality of physical header formats based on notification information transmitted from another information processing apparatus to the information processing apparatus.

11. The information processing apparatus of claim 1, wherein at least one of a plurality of physical header formats of the first PLCP header has a format in conformity to the
IEEE 802.11a standard,
IEEE 802.11b standard,
IEEE 802.11g standard,
IEEE 802.11n standard, or
IEEE 802.11ac standard.

12. The information processing apparatus of claim 1, wherein the circuitry is further configured to select and apply modulation and channel coding by which another information processing apparatus that is a destination of a packet is able to receive the packet based on a value of a detection threshold corresponding to the first PLCP header.

13. The information processing apparatus of claim 1, wherein the circuitry is further configured to determine a selection condition for selecting the first PLCP header from a plurality of physical header formats and a packet detection condition corresponding to the first PLCP header based on a quality of communication with another information processing apparatus.

14. The information processing apparatus of claim 13, wherein the circuitry is further configured to control transmitting the selection condition and the packet detection condition to the other information processing apparatus via a wireless communication.

15. The information processing apparatus of claim 14, wherein the circuitry is further configured to include the selection condition and the packet detection condition in report information and transmit the report information to the other information processing apparatus.

16. The information processing apparatus of claim 14, wherein the circuitry is further configured to control transmitting the selection condition and the packet detection condition in separate transmission signals to the other information processing apparatus.

17. The information processing apparatus of claim 13, wherein the circuitry is further configured to determine the selection condition based on a first capability of the other information processing apparatus and a second capability of the information processing apparatus.

18. The information processing apparatus of claim 1, wherein the circuitry is further configured to determine a selection condition for selecting the first PLCP header from a plurality of physical header formats based on a quality of communication with another information processing apparatus.

19. A method comprising:
setting a first COLOR information for identifying a first network to which the information processing apparatus belongs in a SIGNAL field of a first Physical Layer Convergence Protocol (PLCP) header of the IEEE 802.11 standard;
transmitting a first packet including the first COLOR information to a first device belonging to the first network;
detecting a portion of a second packet and entering a carrier sense busy state, the portion including only a subpart of the second packet that includes a second PLCP header and a second COLOR information included in the second PLCP header of the second packet;
determining whether the detected portion of the second packet is received from the first network or from a second network based on the second COLOR information in the second packet;
in response to the second packet being determined to be from the first network, detecting a remaining portion of the second packet; and
in response to the second packet being determined to be from the second network and a detected strength of a signal including the second packet is lower than a detection threshold, canceling reception of signals and enter a carrier sense idle state; and
in response to the second packet being determined to be from the second network and the detected strength of the signal is greater than or equal to the detection threshold, canceling reception of signals and retaining the carrier sense busy state.

* * * * *